United States Patent
Gollier et al.

(10) Patent No.: US 11,648,623 B2
(45) Date of Patent: May 16, 2023

(54) SYSTEMS AND METHODS FOR PROCESSING TRANSPARENT MATERIALS USING ADJUSTABLE LASER BEAM FOCAL LINES

(71) Applicant: Corning Incorporated, Corning, NY (US)

(72) Inventors: Jacques Gollier, Redmond, WA (US); Garrett Andrew Piech, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 181 days.

(21) Appl. No.: 15/325,905

(22) PCT Filed: Jul. 14, 2015

(86) PCT No.: PCT/US2015/040259
§ 371 (c)(1),
(2) Date: Jan. 12, 2017

(87) PCT Pub. No.: WO2016/010954
PCT Pub. Date: Jan. 21, 2016

(65) Prior Publication Data
US 2017/0189991 A1    Jul. 6, 2017

Related U.S. Application Data

(60) Provisional application No. 62/024,122, filed on Jul. 14, 2014.

(51) Int. Cl.
*B23K 26/00*    (2014.01)
*B23K 26/067*    (2006.01)
(Continued)

(52) U.S. Cl.
CPC ...... *B23K 26/0006* (2013.01); *B23K 26/0613* (2013.01); *B23K 26/0648* (2013.01);
(Continued)

(58) Field of Classification Search
CPC .. G02B 27/095; G02B 27/0977; G02B 5/001; G02B 7/10; G02B 27/0927;
(Continued)

(56) References Cited

U.S. PATENT DOCUMENTS

| 1,529,243 A | 3/1925 | Drake et al. |
| 1,626,396 A | 4/1927 | Drake |

(Continued)

FOREIGN PATENT DOCUMENTS

| CN | 1259924 A | 7/2000 |
| CN | 2388062 Y | 7/2000 |

(Continued)

OTHER PUBLICATIONS

Arimoto, R. et al.; Imaging properties of axicon in a scanning optical system; Applied Optics; Nov. 1, 1991; pp. 6653-6657; vol. 31, No. 31; Optical Society of America.

(Continued)

*Primary Examiner* — Eric S Stapleton
(74) *Attorney, Agent, or Firm* — Svetlana Z. Short; Robert L. Carlson

(57) ABSTRACT

A system for and a method of processing a transparent material, such as glass, using an adjustable laser beam line focus are disclosed. The system for processing a transparent material includes a laser source operable to emit a pulsed laser beam, and an optical assembly (6') disposed within an optical path of the pulsed laser beam. The optical assembly (6') is configured to transform the pulsed laser beam into a laser beam focal line having an adjustable length and an adjustable diameter. At least a portion of the laser beam focal (Continued)

line is operable to be positioned within a bulk of the transparent material such that the laser beam focal line produces a material modification along the laser beam focal line. Method of laser processing a transparent material by adjusting at least one of the length of the laser beam focal line and the diameter of the laser beam focal line is also disclosed.

9 Claims, 21 Drawing Sheets

(51) Int. Cl.
B23K 26/073 (2006.01)
C03B 33/02 (2006.01)
G02B 5/00 (2006.01)
G02B 27/09 (2006.01)
B23K 26/06 (2014.01)
G02B 7/10 (2021.01)
B23K 103/00 (2006.01)
G02B 7/14 (2021.01)

(52) U.S. Cl.
CPC ...... *B23K 26/0676* (2013.01); *B23K 26/0732* (2013.01); *B23K 26/0734* (2013.01); *B23K 26/0738* (2013.01); *C03B 33/0222* (2013.01); *G02B 5/001* (2013.01); *G02B 7/10* (2013.01); *G02B 27/095* (2013.01); *G02B 27/0911* (2013.01); *G02B 27/0927* (2013.01); *G02B 27/0977* (2013.01); *B23K 2103/54* (2018.08); *G02B 7/14* (2013.01)

(58) Field of Classification Search
CPC ...... G02B 27/0911; G02B 15/14; G02B 7/14; B23K 26/0006; B23K 26/0613; B23K 26/0676; B23K 26/0732; B23K 26/0738; B23K 26/0734; B23K 26/0648; B23K 2103/54; C03B 33/0222
USPC .................................................. 219/121.75
See application file for complete search history.

(56) References Cited

U.S. PATENT DOCUMENTS

| | | | | |
|---|---|---|---|---|
| 1,790,397 | A * | 1/1931 | Woods et al. ............ | C03B 9/12 65/67 |
| 2,682,134 | A * | 6/1954 | Stookey .................... | C03C 4/02 359/591 |
| 2,749,794 | A * | 6/1956 | O'Leary .................... | C03C 4/02 359/599 |
| 2,754,956 | A | 7/1956 | Sommer | |
| 3,647,410 | A * | 3/1972 | Heaton .................... | B29C 49/38 65/184 |
| 3,673,900 | A | 7/1972 | Jendrisak et al. | |
| 3,695,497 | A * | 10/1972 | Dear .................... | B28D 5/0011 225/2 |
| 3,695,498 | A * | 10/1972 | Dear .................... | C03B 33/091 225/1 |
| 3,729,302 | A * | 4/1973 | Heaton .................... | C03B 9/12 65/105 |
| 3,775,084 | A * | 11/1973 | Heaton .................... | C03B 9/12 65/264 |
| 3,947,093 | A | 3/1976 | Goshima et al. | |
| 4,076,159 | A | 2/1978 | Farragher | |
| 4,226,607 | A * | 10/1980 | Domken ................ | A61J 1/065 65/105 |
| 4,441,008 | A * | 4/1984 | Chan .................... | B23K 26/38 219/121.71 |
| 4,546,231 | A * | 10/1985 | Gresser ................ | B28D 1/221 219/121.72 |
| 4,618,056 | A | 10/1986 | Cutshall | |
| 4,623,776 | A * | 11/1986 | Buchroeder ........ | B23K 26/0734 219/121.67 |
| 4,642,439 | A * | 2/1987 | Miller ................ | B23K 26/0734 219/121.72 |
| 4,646,308 | A * | 2/1987 | Kafka .................... | H01S 3/0057 372/22 |
| 4,764,930 | A * | 8/1988 | Bille ........................ | A61F 9/008 372/12 |
| 4,891,054 | A * | 1/1990 | Bricker .................... | C03B 21/02 65/105 |
| 4,907,586 | A * | 3/1990 | Bille ........................ | A61F 9/008 606/5 |
| 4,918,751 | A * | 4/1990 | Pessot .................... | H01S 3/0057 359/325 |
| 4,929,065 | A * | 5/1990 | Hagerty ................ | C03B 23/203 359/653 |
| 4,951,457 | A | 8/1990 | Deal | |
| 4,997,250 | A * | 3/1991 | Ortiz, Jr. ................ | B23K 26/06 219/121.75 |
| 5,035,918 | A * | 7/1991 | Vyas ...................... | C25D 5/022 205/125 |
| 5,040,182 | A * | 8/1991 | Spinelli ................ | H01S 3/1109 372/18 |
| 5,104,210 | A * | 4/1992 | Tokas ...................... | G02B 5/00 359/296 |
| 5,104,523 | A | 4/1992 | Masaharu et al. | |
| 5,108,857 | A * | 4/1992 | Kitayama ................ | G02B 1/00 430/4 |
| 5,112,722 | A * | 5/1992 | Tsujino .................... | G02B 1/04 430/290 |
| 5,114,834 | A * | 5/1992 | Nachshon ................ | B23Q 7/003 216/48 |
| 5,221,034 | A | 6/1993 | Bando | |
| 5,256,853 | A * | 10/1993 | McIntyre ............ | B23K 26/0734 219/121.68 |
| 5,265,107 | A * | 11/1993 | Delfyett, Jr. .......... | G02F 1/3523 359/245 |
| 5,326,956 | A | 7/1994 | Lunney | |
| 5,400,350 | A * | 3/1995 | Galvanauskas ........ | H01S 3/0057 372/102 |
| 5,410,567 | A | 4/1995 | Brundage et al. | |
| 5,418,803 | A | 5/1995 | Zhiglinsky et al. | |
| 5,434,875 | A * | 7/1995 | Rieger ...................... | H01S 3/07 372/12 |
| 5,436,925 | A * | 7/1995 | Lin ...................... | H01S 3/06791 372/11 |
| 5,475,197 | A * | 12/1995 | Wrobel ................ | A61F 9/00804 219/121.61 |
| 5,521,352 | A | 5/1996 | Lawson | |
| 5,541,774 | A | 7/1996 | Blankenbecler | |
| 5,553,093 | A * | 9/1996 | Ramaswamy ........ | H01S 3/0943 372/100 |
| 5,574,597 | A * | 11/1996 | Kataoka ................ | G02B 5/1871 359/569 |
| 5,578,229 | A | 11/1996 | Barnekov et al. | |
| 5,586,138 | A * | 12/1996 | Yokoyama ............ | H01S 5/065 372/18 |
| 5,656,186 | A * | 8/1997 | Mourou ................ | A61B 18/20 219/121.69 |
| 5,676,866 | A * | 10/1997 | in den Baumen ..... | B23K 26/04 219/121.77 |
| 5,684,642 | A * | 11/1997 | Zumoto ................ | B23K 26/032 359/739 |
| 5,692,703 | A | 12/1997 | Murphy et al. | |
| 5,696,782 | A * | 12/1997 | Harter ................ | H01S 3/06708 372/102 |
| 5,715,346 | A | 2/1998 | Liu | |
| 5,736,061 | A | 4/1998 | Fukada et al. | |
| 5,736,709 | A * | 4/1998 | Neiheisel ................ | B08B 7/0042 219/121.61 |
| 5,776,220 | A * | 7/1998 | Allaire ................ | B23K 26/0736 65/112 |
| 5,781,684 | A | 7/1998 | Liu | |
| 5,796,112 | A * | 8/1998 | Ichie .................... | G02B 5/001 250/458.1 |
| 5,854,490 | A | 12/1998 | Ooaeh et al. | |

(56) References Cited

U.S. PATENT DOCUMENTS

| | | | |
|---|---|---|---|
| 5,854,751 A | 12/1998 | Di et al. | |
| 5,878,866 A | 3/1999 | Lisec | |
| 5,968,441 A | 10/1999 | Seki | |
| 6,003,418 A | 12/1999 | Bezama et al. | |
| 6,016,223 A * | 1/2000 | Suzuki | G02B 27/09 359/558 |
| 6,016,324 A * | 1/2000 | Rieger | H01S 3/117 372/10 |
| 6,033,583 A * | 3/2000 | Musket | C03C 15/00 216/56 |
| 6,038,055 A * | 3/2000 | Hansch | H01S 3/082 359/264 |
| 6,055,829 A * | 5/2000 | Witzmann | C03B 33/0955 216/65 |
| 6,078,599 A * | 6/2000 | Everage | G03F 7/70333 372/20 |
| 6,137,632 A * | 10/2000 | Bernacki | B82Y 10/00 359/618 |
| 6,156,030 A * | 12/2000 | Neev | A61B 18/20 606/10 |
| 6,160,835 A * | 12/2000 | Kwon | B23K 26/06 219/121.68 |
| 6,185,051 B1 * | 2/2001 | Chen | B82Y 10/00 359/364 |
| 6,186,384 B1 * | 2/2001 | Sawada | C03B 33/091 225/2 |
| 6,191,880 B1 * | 2/2001 | Schuster | G02B 5/3083 359/237 |
| 6,210,401 B1 * | 4/2001 | Lai | A61F 9/00804 351/209 |
| 6,256,328 B1 * | 7/2001 | Delfyett | H01S 5/065 372/18 |
| 6,259,058 B1 | 7/2001 | Hoekstra | |
| 6,259,151 B1 * | 7/2001 | Morrison | H01C 17/242 257/537 |
| 6,259,512 B1 * | 7/2001 | Mizouchi | G03F 7/70075 355/53 |
| 6,272,156 B1 * | 8/2001 | Reed | H01S 3/0057 372/102 |
| 6,301,932 B1 * | 10/2001 | Allen | C03B 9/12 65/106 |
| 6,308,055 B1 | 10/2001 | Welland et al. | |
| 6,322,958 B1 * | 11/2001 | Hayashi | B23K 26/0736 430/495.1 |
| 6,339,208 B1 * | 1/2002 | Rockstroh | B23K 26/03 219/121.71 |
| 6,373,565 B1 * | 4/2002 | Kafka | G01N 21/9501 356/237.4 |
| 6,381,391 B1 * | 4/2002 | Islam | G02B 6/29376 372/6 |
| 6,396,856 B1 * | 5/2002 | Sucha | G01P 3/806 372/25 |
| 6,407,360 B1 * | 6/2002 | Choo | B23K 26/046 219/121.67 |
| 6,438,996 B1 * | 8/2002 | Cuvelier | C03B 33/0955 65/105 |
| 6,445,491 B2 * | 9/2002 | Sucha | G01N 21/4795 359/326 |
| 6,449,301 B1 * | 9/2002 | Wu | H01S 3/1118 372/102 |
| 6,461,223 B1 | 10/2002 | Bando | |
| 6,484,052 B1 * | 11/2002 | Visuri | A61M 37/0092 604/20 |
| 6,489,589 B1 * | 12/2002 | Alexander | A61C 1/0046 219/121.69 |
| 6,501,576 B1 | 12/2002 | Seacombe | |
| 6,501,578 B1 * | 12/2002 | Bernstein | H04B 10/1121 398/130 |
| 6,520,057 B1 | 2/2003 | Steadman | |
| 6,552,301 B2 * | 4/2003 | Herman | C03B 29/02 219/121.71 |
| 6,573,026 B1 * | 6/2003 | Aitken | C03C 23/0025 385/123 |
| 6,592,703 B1 * | 7/2003 | Habeck | C03B 33/078 156/257 |
| 6,635,849 B1 * | 10/2003 | Okawa | B23K 26/043 219/121.7 |
| 6,635,850 B2 * | 10/2003 | Amako | B23K 26/067 219/121.69 |
| 6,720,519 B2 * | 4/2004 | Liu | B23K 26/04 219/121.61 |
| 6,729,151 B1 | 5/2004 | Thompson | |
| 6,729,161 B1 * | 5/2004 | Miura | B01J 19/121 359/326 |
| 6,737,345 B1 | 5/2004 | Lin et al. | |
| 6,744,009 B1 * | 6/2004 | Xuan | B28D 1/221 219/121.67 |
| 6,787,732 B1 * | 9/2004 | Xuan | B23K 26/0823 219/121.67 |
| 6,791,935 B2 * | 9/2004 | Hatano | B82Y 10/00 369/112.24 |
| 6,800,237 B1 * | 10/2004 | Yamamoto | B23K 26/067 264/400 |
| 6,800,831 B1 * | 10/2004 | Hoetzel | B23K 26/146 219/121.67 |
| 6,856,379 B2 * | 2/2005 | Schuster | G02B 5/3083 355/71 |
| 6,885,502 B2 * | 4/2005 | Schuster | G02B 5/3083 355/71 |
| 6,958,094 B2 * | 10/2005 | Ohmi | B23K 26/12 117/92 |
| 6,992,026 B2 * | 1/2006 | Fukuyo | B23K 26/03 438/797 |
| 7,009,138 B2 * | 3/2006 | Amako | B23K 1/0056 219/121.64 |
| 7,061,583 B2 | 6/2006 | Mulkens et al. | |
| 7,102,118 B2 * | 9/2006 | Acker | B23K 26/0604 250/216 |
| 7,196,841 B2 * | 3/2007 | Melzer | G02B 26/0816 250/492.2 |
| 7,259,354 B2 | 8/2007 | Pailthorp et al. | |
| 7,353,829 B1 * | 4/2008 | Wachter | A61K 41/008 128/898 |
| 7,402,773 B2 * | 7/2008 | Nomaru | B23K 26/0648 219/121.73 |
| 7,408,616 B2 * | 8/2008 | Gruner | G03F 7/70108 355/53 |
| 7,408,622 B2 * | 8/2008 | Fiolka | G03F 7/70566 355/53 |
| 7,511,886 B2 * | 3/2009 | Schultz | G02B 27/09 355/71 |
| 7,535,634 B1 * | 5/2009 | Savchenkov | G02B 6/262 359/346 |
| 7,633,033 B2 * | 12/2009 | Thomas | B23K 26/03 219/121.62 |
| 7,642,483 B2 * | 1/2010 | You | C03B 33/093 219/121.68 |
| 7,649,153 B2 * | 1/2010 | Haight | A61B 18/26 219/121.69 |
| 7,726,532 B2 * | 6/2010 | Gonoe | B23K 26/0736 225/1 |
| 7,794,904 B2 * | 9/2010 | Brueck | G03F 7/70408 359/486.01 |
| 7,800,734 B2 * | 9/2010 | Komatsuda | G02B 27/0927 355/52 |
| 7,901,967 B2 | 3/2011 | Komura et al. | |
| 7,920,337 B2 * | 4/2011 | Perchak | G02B 5/001 359/709 |
| 7,978,408 B2 * | 7/2011 | Sawabe | G02B 5/001 359/485.01 |
| 8,035,803 B2 * | 10/2011 | Fiolka | G03B 27/54 355/53 |
| 8,035,882 B2 | 10/2011 | Fanton et al. | |
| 8,035,901 B2 * | 10/2011 | Abramov | C03B 33/0222 359/719 |
| 8,068,279 B2 * | 11/2011 | Schuster | G02B 1/02 359/15 |

(56) References Cited

U.S. PATENT DOCUMENTS

| | | | | |
|---|---|---|---|---|
| 8,104,385 B2* | 1/2012 | Hayashi | ............... | C03B 33/033 |
| | | | | 219/121.67 |
| 8,118,971 B2* | 2/2012 | Hori | .............. | B29B 17/02 |
| | | | | 156/703 |
| 8,123,515 B2 | 2/2012 | Schleelein | | |
| 8,132,427 B2* | 3/2012 | Brown | ............... | C03B 27/0404 |
| | | | | 65/112 |
| 8,144,308 B2* | 3/2012 | Muramatsu | ......... | G03F 7/70116 |
| | | | | 355/67 |
| 8,158,514 B2 | 4/2012 | Krueger et al. | | |
| 8,164,818 B2 | 4/2012 | Collins et al. | | |
| 8,168,514 B2* | 5/2012 | Garner | ................. | B23K 26/38 |
| | | | | 438/463 |
| 8,194,170 B2* | 6/2012 | Golub | ................... | G02B 5/001 |
| | | | | 348/335 |
| 8,211,259 B2 | 7/2012 | Sato et al. | | |
| 8,237,918 B2* | 8/2012 | Totzeck | ............. | G03F 7/70566 |
| | | | | 355/71 |
| 8,245,539 B2* | 8/2012 | Lu | ....................... | C03B 33/033 |
| | | | | 65/112 |
| 8,245,540 B2* | 8/2012 | Abramov | ............ | C03B 33/0215 |
| | | | | 65/105 |
| 8,248,600 B2* | 8/2012 | Matousek | ............ | G01N 21/65 |
| | | | | 356/301 |
| 8,259,393 B2* | 9/2012 | Fiolka | ................. | G02B 27/286 |
| | | | | 359/489.15 |
| 8,269,138 B2* | 9/2012 | Garner | ............... | C03B 33/0215 |
| | | | | 219/121.69 |
| 8,279,524 B2* | 10/2012 | Fiolka | ................... | G02B 1/08 |
| | | | | 359/489.15 |
| 8,283,595 B2* | 10/2012 | Fukuyo | ................. | B23K 26/03 |
| | | | | 219/121.69 |
| 8,283,695 B2 | 10/2012 | Salcedo et al. | | |
| 8,292,141 B2* | 10/2012 | Cox | ....................... | B26F 3/002 |
| | | | | 225/103 |
| 8,296,066 B2* | 10/2012 | Zhao | .................. | G01C 21/3492 |
| | | | | 701/516 |
| 8,327,666 B2* | 12/2012 | Harvey | ............... | C03B 33/0222 |
| | | | | 65/112 |
| 8,339,578 B2* | 12/2012 | Omura | ............... | G02B 13/143 |
| | | | | 355/53 |
| 8,341,976 B2* | 1/2013 | Dejneka | ............. | C03B 33/0222 |
| | | | | 65/112 |
| 8,347,551 B2 | 1/2013 | Van Der Drift | | |
| 8,347,651 B2* | 1/2013 | Abramov | ............ | C03B 33/091 |
| | | | | 219/121.67 |
| 8,358,868 B2 | 1/2013 | Iketani | | |
| 8,358,888 B2* | 1/2013 | Ramachandran | .. | G02B 6/02047 |
| | | | | 372/9 |
| 8,379,188 B2* | 2/2013 | Mueller | ................... | G02B 1/08 |
| | | | | 355/71 |
| 8,444,905 B2 | 5/2013 | Li et al. | | |
| 8,444,906 B2* | 5/2013 | Lee | ........................ | C03B 33/033 |
| | | | | 264/400 |
| 8,448,471 B2* | 5/2013 | Kumatani | .......... | B23K 26/0676 |
| | | | | 65/273 |
| 8,475,507 B2* | 7/2013 | Dewey | ................. | A61B 18/203 |
| | | | | 607/89 |
| 8,482,717 B2* | 7/2013 | Fiolka | ...................... | G03B 27/72 |
| | | | | 355/67 |
| 8,491,983 B2 | 7/2013 | Ono et al. | | |
| 8,518,280 B2* | 8/2013 | Hsu | ......................... | B28D 1/00 |
| | | | | 216/31 |
| 8,549,881 B2* | 10/2013 | Brown | .................. | C03B 27/0404 |
| | | | | 65/105 |
| 8,584,354 B2* | 11/2013 | Cornejo | .................. | C03C 15/00 |
| | | | | 29/825 |
| 8,584,490 B2* | 11/2013 | Garner | ................... | C03B 33/04 |
| | | | | 65/112 |
| 8,592,716 B2* | 11/2013 | Abramov | ............ | B23K 26/0884 |
| | | | | 219/121.72 |
| 8,604,380 B2* | 12/2013 | Howerton | ............... | B23K 26/40 |
| | | | | 219/121.6 |
| 8,607,590 B2* | 12/2013 | Glaesemann | ......... | B23K 26/073 |
| | | | | 219/121.67 |
| 8,616,024 B2* | 12/2013 | Cornejo | .................... | B26F 3/002 |
| | | | | 219/121.57 |
| 8,635,857 B2 | 1/2014 | Crosbie | | |
| 8,635,887 B2* | 1/2014 | Black | ..................... | C03B 33/0222 |
| | | | | 65/105 |
| 8,680,489 B2* | 3/2014 | Martinez | ................... | G21K 5/04 |
| | | | | 250/492.2 |
| 8,685,838 B2* | 4/2014 | Fukuyo | ............... | B23K 26/0604 |
| | | | | 438/463 |
| 8,697,228 B2* | 4/2014 | Carre | ...................... | G02F 1/1303 |
| | | | | 428/215 |
| 8,720,228 B2* | 5/2014 | Li | .......................... | C03B 33/091 |
| | | | | 219/121.72 |
| 8,826,696 B2 | 9/2014 | Brown et al. | | |
| 8,847,112 B2 | 9/2014 | Panarello et al. | | |
| 8,852,698 B2* | 10/2014 | Fukumitsu | ............. | B23K 26/03 |
| | | | | 428/3 |
| 8,887,529 B2* | 11/2014 | Lu | ....................... | C03B 33/0215 |
| | | | | 65/105 |
| 8,916,798 B2* | 12/2014 | Pluss | .................. | B23K 26/0853 |
| | | | | 219/121.67 |
| 8,943,855 B2* | 2/2015 | Gomez | ............... | C03B 33/0222 |
| | | | | 65/105 |
| 8,951,889 B2 | 2/2015 | Ryu et al. | | |
| 8,971,053 B2* | 3/2015 | Kariya | ................ | H01L 23/5389 |
| | | | | 174/260 |
| 9,028,613 B2 | 5/2015 | Kim et al. | | |
| 9,052,605 B2* | 6/2015 | Van Ingen Schenau | ..................... | |
| | | | | G03F 7/70116 |
| 9,086,509 B2* | 7/2015 | Knutson | ................ | G02B 5/001 |
| 9,138,913 B2* | 9/2015 | Arai | ......................... | B28D 5/00 |
| 9,170,500 B2* | 10/2015 | Van Schoot | ....... | G02B 26/0833 |
| 9,227,868 B2* | 1/2016 | Matsumoto | ........... | C03B 33/091 |
| 9,290,407 B2 | 3/2016 | Barefoot et al. | | |
| 9,296,066 B2* | 3/2016 | Hosseini | ............ | B23K 26/0604 |
| 9,324,791 B2* | 4/2016 | Tamemoto | ........... | B28D 5/0011 |
| 9,327,381 B2* | 5/2016 | Lee | ........................ | C03B 33/037 |
| 9,341,912 B2 | 5/2016 | Shrivastava et al. | | |
| 9,346,706 B2 | 5/2016 | Bazemore et al. | | |
| 9,446,590 B2* | 9/2016 | Chen | ........................ | B41J 2/14145 |
| 9,481,598 B2* | 11/2016 | Bergh | .................... | B23K 26/38 |
| 9,499,343 B2 | 11/2016 | Cornelissen et al. | | |
| 9,517,929 B2 | 12/2016 | Hosseini | | |
| 9,517,963 B2 | 12/2016 | Marjanovic et al. | | |
| 9,701,581 B2 | 7/2017 | Kangastupa et al. | | |
| 9,703,167 B2 | 7/2017 | Parker et al. | | |
| 9,815,730 B2 | 11/2017 | Marjanovic et al. | | |
| 9,850,160 B2 | 12/2017 | Marjanovic et al. | | |
| 9,873,628 B1 | 1/2018 | Haloui et al. | | |
| 9,878,304 B2 | 1/2018 | Kotake et al. | | |
| 10,190,363 B2 | 1/2019 | Behmke et al. | | |
| 10,730,783 B2 | 8/2020 | Akarapu et al. | | |
| 2001/0019404 A1* | 9/2001 | Schuster | ................ | G02B 17/08 |
| | | | | 355/67 |
| 2001/0027842 A1 | 10/2001 | Curcio et al. | | |
| 2002/0006765 A1 | 1/2002 | Michel et al. | | |
| 2002/0046997 A1* | 4/2002 | Nam | ................... | B23K 26/0736 |
| | | | | 219/121.72 |
| 2002/0082466 A1* | 6/2002 | Han | ....................... | A61B 18/20 |
| | | | | 600/13 |
| 2002/0097486 A1* | 7/2002 | Yamaguchi | .......... | G02B 21/248 |
| | | | | 359/380 |
| 2002/0097488 A1 | 7/2002 | Hay et al. | | |
| 2002/0110639 A1* | 8/2002 | Bruns | ................. | B29C 35/0805 |
| | | | | 427/162 |
| 2002/0126380 A1* | 9/2002 | Schuster | ............... | G02B 5/3083 |
| | | | | 359/485.01 |
| 2002/0139786 A1 | 10/2002 | Amako et al. | | |
| 2003/0006221 A1* | 1/2003 | Hong | ................ | B23K 26/0604 |
| | | | | 219/121.72 |
| 2003/0007772 A1 | 1/2003 | Borrelli et al. | | |
| 2003/0007773 A1* | 1/2003 | Kondo | ................ | G02B 6/3612 |
| | | | | 385/137 |

(56) References Cited

U.S. PATENT DOCUMENTS

| | | | |
|---|---|---|---|
| 2003/0038225 A1* | 2/2003 | Mulder | G03F 7/70116 250/205 |
| 2003/0070706 A1 | 4/2003 | Fujioka | |
| 2003/0227663 A1 | 12/2003 | Agrawal et al. | |
| 2004/0021615 A1 | 2/2004 | Benson et al. | |
| 2004/0051982 A1* | 3/2004 | Perchak | G02B 5/001 359/831 |
| 2004/0108467 A1* | 6/2004 | Eurlings | G03F 7/70116 250/492.1 |
| 2004/0144231 A1 | 7/2004 | Hanada | |
| 2004/0221615 A1* | 11/2004 | Postupack | C03C 21/002 65/30.14 |
| 2005/0024743 A1* | 2/2005 | Camy-Peyret | B23K 26/0617 359/719 |
| 2005/0098458 A1 | 5/2005 | Gruetzmacher et al. | |
| 2005/0098548 A1* | 5/2005 | Kobayashi | B23K 26/0613 219/121.73 |
| 2005/0115938 A1* | 6/2005 | Sawaki | B23K 26/067 219/121.73 |
| 2005/0116938 A1 | 6/2005 | Ito et al. | |
| 2005/0205778 A1 | 9/2005 | Kitai et al. | |
| 2005/0209898 A1 | 9/2005 | Asai et al. | |
| 2005/0231651 A1* | 10/2005 | Myers | H04N 9/3117 348/744 |
| 2005/0274702 A1* | 12/2005 | Deshi | B23K 26/0624 219/121.72 |
| 2005/0277270 A1* | 12/2005 | Yoshikawa | B23K 26/16 438/463 |
| 2006/0011593 A1* | 1/2006 | Fukuyo | B28D 1/221 219/121.67 |
| 2006/0021385 A1 | 2/2006 | Cimo et al. | |
| 2006/0028706 A1* | 2/2006 | Totzeck | G02B 27/286 359/238 |
| 2006/0028728 A1* | 2/2006 | Li | G02B 26/0808 359/573 |
| 2006/0050261 A1* | 3/2006 | Brotsack | G03F 7/70108 355/71 |
| 2006/0109874 A1* | 5/2006 | Shiozaki | B23K 26/38 372/25 |
| 2006/0118529 A1 | 6/2006 | Aoki et al. | |
| 2006/0127679 A1* | 6/2006 | Gulati | B32B 17/06 428/426 |
| 2006/0146384 A1* | 7/2006 | Schultz | G02B 27/09 359/9 |
| 2006/0151450 A1 | 7/2006 | You et al. | |
| 2006/0170617 A1* | 8/2006 | Latypov | G03F 7/70116 345/32 |
| 2006/0213883 A1 | 9/2006 | Eberhardt et al. | |
| 2006/0227440 A1* | 10/2006 | Gluckstad | G02B 27/09 359/885 |
| 2006/0266744 A1* | 11/2006 | Nomaru | B23K 26/0648 219/121.75 |
| 2006/0289410 A1* | 12/2006 | Morita | B23K 26/03 219/121.67 |
| 2006/0291835 A1 | 12/2006 | Nozaki et al. | |
| 2007/0021548 A1 | 1/2007 | Hattori et al. | |
| 2007/0030471 A1* | 2/2007 | Troost | G03F 7/70275 355/67 |
| 2007/0044606 A1 | 3/2007 | Kang et al. | |
| 2007/0045253 A1 | 3/2007 | Jordens et al. | |
| 2007/0051706 A1 | 3/2007 | Bovatsek et al. | |
| 2007/0053632 A1 | 3/2007 | Popp | |
| 2007/0068648 A1 | 3/2007 | Hu et al. | |
| 2007/0090180 A1 | 4/2007 | Griffis et al. | |
| 2007/0091977 A1* | 4/2007 | Sohn | G02B 6/02147 372/109 |
| 2007/0111119 A1 | 5/2007 | Hu et al. | |
| 2007/0111390 A1* | 5/2007 | Komura | B23K 26/009 438/113 |
| 2007/0111480 A1* | 5/2007 | Maruyama | B23K 26/009 438/463 |
| 2007/0119831 A1* | 5/2007 | Kandt | B23K 26/083 219/121.67 |
| 2007/0132977 A1* | 6/2007 | Komatsuda | G02B 17/002 355/60 |
| 2007/0138151 A1* | 6/2007 | Tanaka | H01L 21/268 219/121.65 |
| 2007/0177116 A1* | 8/2007 | Amako | G03B 21/625 355/53 |
| 2007/0202619 A1* | 8/2007 | Tamura | B23K 26/0608 438/22 |
| 2007/0209029 A1* | 9/2007 | Ivonin | G03F 7/70191 430/311 |
| 2007/0228616 A1 | 10/2007 | Bang | |
| 2007/0298529 A1* | 12/2007 | Maeda | B28D 5/0011 438/33 |
| 2008/0000884 A1* | 1/2008 | Sugiura | C03B 33/0222 219/121.67 |
| 2008/0050584 A1 | 2/2008 | Noguchi et al. | |
| 2008/0079940 A1* | 4/2008 | Sezerman | C03C 23/0025 356/364 |
| 2008/0087629 A1 | 4/2008 | Shimomura et al. | |
| 2008/0099444 A1* | 5/2008 | Misawa | B29C 59/16 216/94 |
| 2008/0158529 A1* | 7/2008 | Hansen | G03F 7/705 355/53 |
| 2008/0165925 A1* | 7/2008 | Singer | G03F 7/70075 378/34 |
| 2008/0190981 A1 | 8/2008 | Okajima et al. | |
| 2008/0239268 A1* | 10/2008 | Mulder | G03F 7/70116 355/67 |
| 2008/0309902 A1* | 12/2008 | Rosenbluth | G03F 7/70125 355/53 |
| 2008/0310465 A1 | 12/2008 | Achtenhagen | |
| 2008/0314879 A1 | 12/2008 | Bruland et al. | |
| 2008/0318028 A1 | 12/2008 | Winstanley et al. | |
| 2009/0013724 A1* | 1/2009 | Koyo | B23K 26/0093 65/31 |
| 2009/0032510 A1 | 2/2009 | Ando et al. | |
| 2009/0033902 A1* | 2/2009 | Mulder | G03F 7/70116 355/66 |
| 2009/0050661 A1 | 2/2009 | Na et al. | |
| 2009/0091731 A1* | 4/2009 | Ossmann | G03F 7/70075 355/67 |
| 2009/0104721 A1 | 4/2009 | Hirakata et al. | |
| 2009/0157341 A1 | 6/2009 | Cheung | |
| 2009/0170286 A1 | 7/2009 | Tsukamoto et al. | |
| 2009/0176034 A1* | 7/2009 | Ruuttu | B23K 26/364 427/566 |
| 2009/0183764 A1* | 7/2009 | Meyer | B32B 37/02 136/246 |
| 2009/0184849 A1 | 7/2009 | Nasiri et al. | |
| 2009/0188543 A1 | 7/2009 | Bann | |
| 2009/0199694 A1 | 8/2009 | Uh et al. | |
| 2009/0212033 A1 | 8/2009 | Beck et al. | |
| 2009/0242528 A1* | 10/2009 | Howerton | B23K 26/38 219/121.71 |
| 2009/0250446 A1* | 10/2009 | Sakamoto | B28D 1/221 219/121.72 |
| 2009/0294419 A1* | 12/2009 | Abramov | B23K 26/0736 219/121.68 |
| 2009/0294422 A1* | 12/2009 | Lubatschowski | B23K 26/38 219/121.72 |
| 2009/0323160 A1 | 12/2009 | Egerton et al. | |
| 2009/0323162 A1 | 12/2009 | Fanton et al. | |
| 2009/0324899 A1* | 12/2009 | Feinstein | C03C 15/00 428/195.1 |
| 2009/0324903 A1 | 12/2009 | Rumsby | |
| 2010/0020304 A1 | 1/2010 | Soer et al. | |
| 2010/0024865 A1 | 2/2010 | Shah et al. | |
| 2010/0025387 A1* | 2/2010 | Arai | B28D 5/00 219/121.69 |
| 2010/0029460 A1* | 2/2010 | Shojiya | C03C 3/085 501/64 |
| 2010/0032087 A1* | 2/2010 | Takahashi | B23K 26/18 156/272.8 |
| 2010/0038349 A1 | 2/2010 | Ke et al. | |
| 2010/0046761 A1 | 2/2010 | Henn et al. | |
| 2010/0086741 A1* | 4/2010 | Bovatsek | B23K 26/0617 428/156 |

(56) References Cited

U.S. PATENT DOCUMENTS

| | | | |
|---|---|---|---|
| 2010/0089631 A1* | 4/2010 | Sakaguchi | H01L 21/563 174/262 |
| 2010/0089682 A1 | 4/2010 | Martini et al. | |
| 2010/0089882 A1* | 4/2010 | Tamura | B23K 26/0608 219/121.69 |
| 2010/0102042 A1* | 4/2010 | Garner | C03B 33/0215 219/121.68 |
| 2010/0129603 A1* | 5/2010 | Blick | B23K 26/389 428/131 |
| 2010/0145620 A1 | 6/2010 | Georgi et al. | |
| 2010/0147813 A1* | 6/2010 | Lei | C03B 33/082 219/121.72 |
| 2010/0197116 A1 | 8/2010 | Shah et al. | |
| 2010/0206008 A1 | 8/2010 | Harvey et al. | |
| 2010/0252538 A1 | 10/2010 | Zeygerman | |
| 2010/0252540 A1* | 10/2010 | Lei | B23K 26/40 219/121.62 |
| 2010/0252959 A1* | 10/2010 | Lei | B23K 26/40 264/400 |
| 2010/0276505 A1* | 11/2010 | Smith | B23K 26/40 239/8 |
| 2010/0279067 A1* | 11/2010 | Sabia | C03B 17/064 428/141 |
| 2010/0287991 A1* | 11/2010 | Brown | C03B 27/0404 65/114 |
| 2010/0291353 A1 | 11/2010 | Dejneka et al. | |
| 2010/0320179 A1 | 12/2010 | Morita et al. | |
| 2010/0326138 A1* | 12/2010 | Kumatani | B23K 26/0676 65/286 |
| 2010/0332087 A1 | 12/2010 | Claffee et al. | |
| 2011/0017716 A1 | 1/2011 | Rumsby | |
| 2011/0023298 A1 | 2/2011 | Chujo et al. | |
| 2011/0037149 A1 | 2/2011 | Fukuyo et al. | |
| 2011/0049764 A1* | 3/2011 | Lee | B23K 26/0604 264/400 |
| 2011/0049765 A1* | 3/2011 | Li | C03B 33/093 264/400 |
| 2011/0088324 A1* | 4/2011 | Wessel | E06B 9/264 49/70 |
| 2011/0094267 A1 | 4/2011 | Aniolek et al. | |
| 2011/0100401 A1* | 5/2011 | Fiorentini | B08B 6/00 134/22.12 |
| 2011/0111179 A1 | 5/2011 | Blick et al. | |
| 2011/0127244 A1 | 6/2011 | Li | |
| 2011/0127697 A1 | 6/2011 | Milne | |
| 2011/0132581 A1 | 6/2011 | Moss | |
| 2011/0132881 A1* | 6/2011 | Liu | B23K 26/082 219/121.71 |
| 2011/0136303 A1 | 6/2011 | Lee | |
| 2011/0139760 A1* | 6/2011 | Shah | G01J 11/00 219/121.83 |
| 2011/0143470 A1 | 6/2011 | Lee | |
| 2011/0177325 A1 | 7/2011 | Tomamoto et al. | |
| 2011/0183116 A1* | 7/2011 | Hung | B24B 7/241 428/156 |
| 2011/0191024 A1 | 8/2011 | Deluca | |
| 2011/0210105 A1* | 9/2011 | Romashko | B23K 26/0732 219/121.72 |
| 2011/0238308 A1 | 9/2011 | Miller et al. | |
| 2011/0240476 A1 | 10/2011 | Wang et al. | |
| 2011/0240611 A1* | 10/2011 | Sandstrom | B23K 26/032 219/121.61 |
| 2011/0240617 A1 | 10/2011 | Cheon et al. | |
| 2011/0261429 A1 | 10/2011 | Sbar et al. | |
| 2011/0277507 A1* | 11/2011 | Lu | C03B 33/0215 65/97 |
| 2011/0300691 A1 | 12/2011 | Sakamoto et al. | |
| 2011/0318555 A1* | 12/2011 | Bookbinder | C03B 17/02 428/213 |
| 2012/0017642 A1* | 1/2012 | Teranishi | B28D 5/0011 65/105 |
| 2012/0026573 A1 | 2/2012 | Collins et al. | |
| 2012/0047951 A1* | 3/2012 | Dannoux | C03B 17/06 65/25.3 |
| 2012/0047956 A1 | 3/2012 | Li | |
| 2012/0047957 A1 | 3/2012 | Dannoux et al. | |
| 2012/0048604 A1* | 3/2012 | Cornejo | C03C 15/00 174/258 |
| 2012/0061440 A1* | 3/2012 | Roell | C03B 33/033 225/2 |
| 2012/0064306 A1* | 3/2012 | Kang | C03B 33/074 428/192 |
| 2012/0067858 A1* | 3/2012 | Kangastupa | B28D 5/0011 219/121.72 |
| 2012/0103018 A1* | 5/2012 | Lu | C03B 33/0215 65/29.12 |
| 2012/0106117 A1 | 5/2012 | Sundaram et al. | |
| 2012/0111310 A1 | 5/2012 | Ryu et al. | |
| 2012/0125588 A1 | 5/2012 | Nam et al. | |
| 2012/0131961 A1 | 5/2012 | Dannoux et al. | |
| 2012/0131962 A1* | 5/2012 | Mitsugi | C03B 33/0235 65/112 |
| 2012/0135195 A1* | 5/2012 | Glaesemann | B23K 26/073 428/156 |
| 2012/0135607 A1* | 5/2012 | Shimoi | B23K 26/0736 438/705 |
| 2012/0135608 A1* | 5/2012 | Shimoi | B23K 26/0736 438/705 |
| 2012/0145331 A1* | 6/2012 | Gomez | C03B 33/0222 156/712 |
| 2012/0147449 A1 | 6/2012 | Bhatnagar et al. | |
| 2012/0196071 A1* | 8/2012 | Cornejo | B28D 1/00 428/43 |
| 2012/0196454 A1 | 8/2012 | Shah et al. | |
| 2012/0205356 A1 | 8/2012 | Pluess | |
| 2012/0211923 A1 | 8/2012 | Garner et al. | |
| 2012/0214004 A1 | 8/2012 | Hashimoto et al. | |
| 2012/0216570 A1 | 8/2012 | Abramov et al. | |
| 2012/0229787 A1* | 9/2012 | Van Schoot | G02B 26/0833 355/71 |
| 2012/0234049 A1* | 9/2012 | Bolton | C03B 33/076 65/112 |
| 2012/0234807 A1* | 9/2012 | Sercel | B23K 26/0608 219/121.69 |
| 2012/0237731 A1 | 9/2012 | Boegli et al. | |
| 2012/0255935 A1* | 10/2012 | Kakui | B23K 26/0869 219/121.6 |
| 2012/0262689 A1* | 10/2012 | Van Ingen Schenau | G03F 7/70116 355/67 |
| 2012/0293784 A1* | 11/2012 | Xalter | G02B 26/0833 355/67 |
| 2012/0297568 A1 | 11/2012 | Spezzani | |
| 2012/0299219 A1* | 11/2012 | Shimoi | H01L 21/30604 264/400 |
| 2012/0302139 A1* | 11/2012 | Darcangelo | B24B 9/08 451/36 |
| 2012/0320458 A1* | 12/2012 | Knutson | G02B 5/001 359/489.11 |
| 2012/0324950 A1 | 12/2012 | Dale et al. | |
| 2013/0019637 A1* | 1/2013 | Sol | C09D 5/008 65/112 |
| 2013/0031879 A1 | 2/2013 | Yoshikane et al. | |
| 2013/0034688 A1* | 2/2013 | Koike | H01L 23/15 428/134 |
| 2013/0044371 A1* | 2/2013 | Rupp | B23K 26/046 359/432 |
| 2013/0047671 A1 | 2/2013 | Kohli | |
| 2013/0056450 A1* | 3/2013 | Lissotschenko | B23K 26/0604 219/121.74 |
| 2013/0061636 A1* | 3/2013 | Imai | C03C 21/002 65/30.14 |
| 2013/0068736 A1* | 3/2013 | Mielke | B23K 26/38 219/121.71 |
| 2013/0075480 A1* | 3/2013 | Yokogi | C08G 64/0208 235/492 |
| 2013/0078891 A1 | 3/2013 | Lee et al. | |

(56) References Cited

U.S. PATENT DOCUMENTS

| | | | |
|---|---|---|---|
| 2013/0091897 A1* | 4/2013 | Fujii | C03B 33/0222 65/112 |
| 2013/0122264 A1* | 5/2013 | Fujii | C03B 33/0222 428/192 |
| 2013/0126573 A1* | 5/2013 | Hosseini | B23K 26/0604 225/2 |
| 2013/0126751 A1* | 5/2013 | Mizoguchi | G02B 5/001 250/453.11 |
| 2013/0129947 A1* | 5/2013 | Harvey | C03B 33/091 428/34.4 |
| 2013/0133367 A1* | 5/2013 | Abramov | C03B 17/06 65/53 |
| 2013/0139708 A1 | 6/2013 | Hotta | |
| 2013/0143416 A1* | 6/2013 | Norval | B23K 26/36 438/795 |
| 2013/0149434 A1* | 6/2013 | Oh | C03B 33/074 427/58 |
| 2013/0149494 A1* | 6/2013 | Koike | C03B 19/14 428/141 |
| 2013/0167590 A1* | 7/2013 | Teranishi | C03B 33/0222 65/112 |
| 2013/0171425 A1 | 7/2013 | Wang et al. | |
| 2013/0174607 A1* | 7/2013 | Wootton | B24C 1/045 65/29.18 |
| 2013/0174610 A1* | 7/2013 | Teranishi | C03B 33/091 65/112 |
| 2013/0177033 A1 | 7/2013 | Muro et al. | |
| 2013/0180285 A1* | 7/2013 | Kariya | C03B 17/067 65/29.11 |
| 2013/0180665 A2 | 7/2013 | Gomez et al. | |
| 2013/0189806 A1* | 7/2013 | Hoshino | H01L 33/0095 438/29 |
| 2013/0192305 A1* | 8/2013 | Black | C03B 33/0222 65/30.14 |
| 2013/0209731 A1* | 8/2013 | Nattermann | B23K 26/0093 428/131 |
| 2013/0210245 A1 | 8/2013 | Jackl | |
| 2013/0216573 A1 | 8/2013 | Trusheim et al. | |
| 2013/0220982 A1* | 8/2013 | Thomas | B23K 26/36 219/121.69 |
| 2013/0221053 A1* | 8/2013 | Zhang | C03B 33/0222 225/2 |
| 2013/0222877 A1 | 8/2013 | Greer et al. | |
| 2013/0224439 A1* | 8/2013 | Zhang | C03B 33/0222 428/157 |
| 2013/0228918 A1* | 9/2013 | Chen | H01L 23/49811 257/737 |
| 2013/0247615 A1* | 9/2013 | Boek | C03C 15/00 65/29.1 |
| 2013/0248504 A1 | 9/2013 | Kusuda | |
| 2013/0266757 A1* | 10/2013 | Giron | C03B 33/0222 428/98 |
| 2013/0270240 A1* | 10/2013 | Kondo | B23K 26/0643 219/121.79 |
| 2013/0280495 A1* | 10/2013 | Matsumoto | C03B 33/091 428/172 |
| 2013/0288010 A1* | 10/2013 | Akarapu | B24B 9/10 428/157 |
| 2013/0291598 A1* | 11/2013 | Saito | C03B 33/07 65/112 |
| 2013/0312460 A1* | 11/2013 | Kunishi | B28D 5/0011 65/112 |
| 2013/0323469 A1* | 12/2013 | Abramov | C03B 33/0222 428/155 |
| 2013/0334185 A1* | 12/2013 | Nomaru | B23K 26/02 219/121.82 |
| 2013/0340480 A1* | 12/2013 | Nattermann | B26F 1/28 65/112 |
| 2013/0344684 A1 | 12/2013 | Bowden | |
| 2014/0023087 A1 | 1/2014 | Czompo | |
| 2014/0027951 A1* | 1/2014 | Srinivas | B29C 59/16 425/174.4 |
| 2014/0034730 A1* | 2/2014 | Lee | G06K 19/0723 235/435 |
| 2014/0042202 A1* | 2/2014 | Lee | C03B 33/033 225/2 |
| 2014/0047957 A1* | 2/2014 | Wu | B25B 23/1427 81/467 |
| 2014/0076869 A1 | 3/2014 | Lee et al. | |
| 2014/0083986 A1 | 3/2014 | Zhang et al. | |
| 2014/0102146 A1* | 4/2014 | Saito | C03B 33/091 65/112 |
| 2014/0110040 A1* | 4/2014 | Cok | G02F 1/133524 156/182 |
| 2014/0113797 A1* | 4/2014 | Yamada | C03B 33/091 501/11 |
| 2014/0133119 A1* | 5/2014 | Kariya | H01L 23/5389 361/767 |
| 2014/0141192 A1 | 5/2014 | Fernando et al. | |
| 2014/0141217 A1* | 5/2014 | Gulati | C03C 3/091 428/212 |
| 2014/0147623 A1* | 5/2014 | Shorey | C03B 33/102 428/137 |
| 2014/0147624 A1* | 5/2014 | Streltsov | C03C 3/083 65/30.14 |
| 2014/0165652 A1* | 6/2014 | Saito | C03B 33/04 65/28 |
| 2014/0174131 A1* | 6/2014 | Saito | B23K 26/14 65/112 |
| 2014/0182125 A1 | 7/2014 | Rozbicki et al. | |
| 2014/0199519 A1* | 7/2014 | Schillinger | B23K 26/0648 428/155 |
| 2014/0216108 A1* | 8/2014 | Wiegel | C03B 33/082 65/56 |
| 2014/0238962 A1 | 8/2014 | Nawrodt et al. | |
| 2014/0239034 A1 | 8/2014 | Cleary et al. | |
| 2014/0239552 A1 | 8/2014 | Srinivas et al. | |
| 2014/0290310 A1* | 10/2014 | Green | C03B 33/093 65/112 |
| 2014/0291122 A1 | 10/2014 | Bando | |
| 2014/0320947 A1* | 10/2014 | Egerton | G02F 1/13336 359/275 |
| 2014/0333929 A1* | 11/2014 | Sung | G01N 15/1475 356/341 |
| 2014/0339207 A1 | 11/2014 | Sugiyama et al. | |
| 2014/0340730 A1 | 11/2014 | Bergh et al. | |
| 2014/0352400 A1 | 12/2014 | Barrilado et al. | |
| 2014/0361463 A1* | 12/2014 | DeSimone | B33Y 30/00 264/401 |
| 2015/0014891 A1 | 1/2015 | Amatucci et al. | |
| 2015/0034612 A1* | 2/2015 | Hosseini | B23K 26/0648 219/121.61 |
| 2015/0038313 A1* | 2/2015 | Hosseini | B23K 26/38 501/32 |
| 2015/0044445 A1 | 2/2015 | Garner et al. | |
| 2015/0059986 A1 | 3/2015 | Komatsu et al. | |
| 2015/0060402 A1 | 3/2015 | Burkett et al. | |
| 2015/0075221 A1* | 3/2015 | Kawaguchi | C03B 33/0222 65/60.1 |
| 2015/0075222 A1* | 3/2015 | Mader | B23K 26/009 65/271 |
| 2015/0110442 A1* | 4/2015 | Zimmel | G02B 6/4452 385/55 |
| 2015/0118522 A1* | 4/2015 | Hosseini | G11B 5/8404 428/846.9 |
| 2015/0121960 A1 | 5/2015 | Hosseini | |
| 2015/0122656 A1 | 5/2015 | Hosseini | |
| 2015/0136743 A1* | 5/2015 | Hosseini | B23K 26/364 219/121.61 |
| 2015/0140241 A1* | 5/2015 | Hosseini | B23K 26/0617 428/34.4 |
| 2015/0140735 A1* | 5/2015 | Hosseini | B81C 1/00634 438/107 |
| 2015/0151380 A1* | 6/2015 | Hosseini | B23K 26/009 428/600 |
| 2015/0158120 A1* | 6/2015 | Courvoisier | B23K 26/0613 264/482 |
| 2015/0165396 A1 | 6/2015 | Mattson et al. | |

(56) References Cited

U.S. PATENT DOCUMENTS

| | | | | |
|---|---|---|---|---|
| 2015/0165548 | A1* | 6/2015 | Marjanovic | B23K 26/083 428/43 |
| 2015/0165560 | A1* | 6/2015 | Hackert | C03B 33/082 428/43 |
| 2015/0165561 | A1 | 6/2015 | Le et al. | |
| 2015/0165562 | A1* | 6/2015 | Marjanovic | C03B 33/0222 428/64.1 |
| 2015/0165563 | A1* | 6/2015 | Manley | B32B 17/00 428/34 |
| 2015/0166391 | A1* | 6/2015 | Marjanovic | C03B 33/0222 428/43 |
| 2015/0166393 | A1* | 6/2015 | Marjanovic | C03B 33/091 428/131 |
| 2015/0166394 | A1* | 6/2015 | Marjanovic | C03B 33/091 428/43 |
| 2015/0166395 | A1* | 6/2015 | Marjanovic | B23K 26/0613 428/131 |
| 2015/0166396 | A1* | 6/2015 | Marjanovic | B23K 26/0613 428/137 |
| 2015/0166397 | A1* | 6/2015 | Marjanovic | C03B 33/0222 65/112 |
| 2015/0183679 | A1* | 7/2015 | Saito | C03B 33/04 65/112 |
| 2015/0209922 | A1 | 7/2015 | Yoshikawa | |
| 2015/0232369 | A1* | 8/2015 | Marjanovic | C03B 33/0215 428/192 |
| 2015/0299018 | A1* | 10/2015 | Bhuyan | C03B 33/0222 65/29.18 |
| 2015/0311058 | A1 | 10/2015 | Antsiferov et al. | |
| 2015/0350991 | A1 | 12/2015 | Sayadi et al. | |
| 2015/0352671 | A1 | 12/2015 | Darzi | |
| 2015/0360991 | A1* | 12/2015 | Grundmueller | B23K 26/0648 428/141 |
| 2015/0362817 | A1 | 12/2015 | Ierson et al. | |
| 2015/0362818 | A1 | 12/2015 | Greer | |
| 2015/0367442 | A1* | 12/2015 | Bovatsek | C03B 33/0222 65/112 |
| 2016/0008927 | A1* | 1/2016 | Grundmueller | B23K 26/57 65/112 |
| 2016/0009066 | A1* | 1/2016 | Nieber | B23K 26/53 156/272.8 |
| 2016/0009585 | A1 | 1/2016 | Bookbinder et al. | |
| 2016/0016257 | A1 | 1/2016 | Hosseini | |
| 2016/0023922 | A1* | 1/2016 | Addiego | C02F 1/283 210/688 |
| 2016/0031737 | A1 | 2/2016 | Hoppe et al. | |
| 2016/0031745 | A1* | 2/2016 | Ortner | B28D 5/0011 65/29.1 |
| 2016/0039044 | A1 | 2/2016 | Kawaguchi | |
| 2016/0059359 | A1 | 3/2016 | Krueger et al. | |
| 2016/0060156 | A1* | 3/2016 | Krueger | B23K 26/064 65/31 |
| 2016/0097960 | A1 | 4/2016 | Dixit et al. | |
| 2016/0138328 | A1 | 5/2016 | Behmke et al. | |
| 2016/0152516 | A1 | 6/2016 | Bazemore et al. | |
| 2016/0154284 | A1 | 6/2016 | Sano | |
| 2016/0159679 | A1 | 6/2016 | West | |
| 2016/0168396 | A1 | 6/2016 | Letocart et al. | |
| 2016/0279895 | A1* | 9/2016 | Marjanovic | B32B 3/266 |
| 2016/0280580 | A1* | 9/2016 | Bohme | B23K 26/38 |
| 2016/0282521 | A1 | 9/2016 | Uchiyama et al. | |
| 2016/0290791 | A1* | 10/2016 | Buono | C03B 17/064 |
| 2016/0311717 | A1 | 10/2016 | Nieber et al. | |
| 2016/0368100 | A1 | 12/2016 | Marjanovic et al. | |
| 2017/0002601 | A1 | 1/2017 | Bergh et al. | |
| 2017/0008791 | A1 | 1/2017 | Kim et al. | |
| 2017/0052381 | A1 | 2/2017 | Huang et al. | |
| 2017/0169847 | A1* | 6/2017 | Tamaki | G11B 5/7315 |
| 2017/0183168 | A1 | 6/2017 | Jia | |
| 2017/0197868 | A1 | 7/2017 | Gupta et al. | |
| 2017/0225996 | A1 | 8/2017 | Bookbinder et al. | |
| 2017/0252859 | A1 | 9/2017 | Kumkar et al. | |
| 2017/0355634 | A1 | 12/2017 | Thierry | |
| 2017/0368638 | A1 | 12/2017 | Tayebati et al. | |
| 2018/0029919 | A1 | 2/2018 | Schnitzler et al. | |
| 2018/0029920 | A1 | 2/2018 | Marjanovic et al. | |
| 2018/0062342 | A1 | 3/2018 | Comstock et al. | |
| 2018/0118602 | A1 | 5/2018 | Hackert et al. | |
| 2018/0133837 | A1 | 5/2018 | Greenberg et al. | |
| 2018/0134606 | A1 | 5/2018 | Wagner et al. | |
| 2018/0186677 | A1 | 7/2018 | Ito et al. | |
| 2018/0186678 | A1 | 7/2018 | Boeker et al. | |
| 2018/0297887 | A1 | 10/2018 | Spier et al. | |

FOREIGN PATENT DOCUMENTS

| | | |
|---|---|---|
| CN | 1473087 A | 2/2004 |
| CN | 1517313 A | 8/2004 |
| CN | 1573364 A | 2/2005 |
| CN | 1619778 A | 5/2005 |
| CN | 1735568 A | 2/2006 |
| CN | 1283409 C | 11/2006 |
| CN | 1890074 A | 1/2007 |
| CN | 1920632 A | 2/2007 |
| CN | 1930097 A | 3/2007 |
| CN | 101031383 A | 9/2007 |
| CN | 101043936 A | 9/2007 |
| CN | 101048255 A | 10/2007 |
| CN | 101386466 A | 3/2009 |
| CN | 101502914 A | 8/2009 |
| CN | 101595554 A | 12/2009 |
| CN | 101610870 A | 12/2009 |
| CN | 201357287 Y | 12/2009 |
| CN | 101622722 A | 1/2010 |
| CN | 101637849 A | 2/2010 |
| CN | 201471092 U | 5/2010 |
| CN | 101862907 A | 10/2010 |
| CN | 101965242 A | 2/2011 |
| CN | 101980982 A | 2/2011 |
| CN | 102046545 A | 5/2011 |
| CN | 102060437 A | 5/2011 |
| CN | 102105256 A | 6/2011 |
| CN | 102248302 A | 11/2011 |
| CN | 102272355 A | 12/2011 |
| CN | 102326232 A | 1/2012 |
| CN | 102343631 A | 2/2012 |
| CN | 102356049 A | 2/2012 |
| CN | 102356050 A | 2/2012 |
| CN | 102574246 A | 7/2012 |
| CN | 102596830 A | 7/2012 |
| CN | 102642092 A | 8/2012 |
| CN | 102649199 A | 8/2012 |
| CN | 102672355 A | 9/2012 |
| CN | 102674709 A | 9/2012 |
| CN | 102741012 A | 10/2012 |
| CN | 102898014 A | 1/2013 |
| CN | 102916081 A | 2/2013 |
| CN | 102923939 A | 2/2013 |
| CN | 102962583 A | 3/2013 |
| CN | 103013374 A | 4/2013 |
| CN | 103079747 A | 5/2013 |
| CN | 103086591 A | 5/2013 |
| CN | 103143841 A | 6/2013 |
| CN | 103159401 A | 6/2013 |
| CN | 203021443 U | 6/2013 |
| CN | 103237771 A | 8/2013 |
| CN | 103273195 A | 9/2013 |
| CN | 103316990 A | 9/2013 |
| CN | 103329035 A | 9/2013 |
| CN | 103339559 A | 10/2013 |
| CN | 103359947 A | 10/2013 |
| CN | 103359948 A | 10/2013 |
| CN | 103531414 A | 1/2014 |
| CN | 103746027 A | 4/2014 |
| CN | 203509350 U | 4/2014 |
| CN | 103817434 A | 5/2014 |
| CN | 103831539 A | 6/2014 |
| CN | 104108870 A | 10/2014 |
| CN | 104344202 A | 2/2015 |
| CN | 204211638 U | 3/2015 |
| CN | 105081564 A | 11/2015 |
| CN | 105164581 A | 12/2015 |

(56) References Cited

FOREIGN PATENT DOCUMENTS

| | | | |
|---|---|---|---|
| CN | 105209218 A | 12/2015 |
| CN | 105246850 A | 1/2016 |
| CN | 103224117 B | 2/2016 |
| CN | 105392593 A | 3/2016 |
| CN | 105517969 A | 4/2016 |
| CN | 205328860 U | 6/2016 |
| CN | 106007349 A | 10/2016 |
| DE | 1020448 B | 12/1957 |
| DE | 2231330 A1 | 10/1974 |
| DE | 10322376 A1 | 12/2004 |
| DE | 102006042280 A1 | 6/2007 |
| DE | 102006035555 A1 | 1/2008 |
| DE | 102011000768 A1 | 8/2012 |
| DE | 102012010635 A1 | 11/2013 |
| DE | 102012110971 A1 | 5/2014 |
| DE | 102013103370 A1 | 10/2014 |
| DE | 102013223637 A1 | 5/2015 |
| DE | 102014213775 A1 | 1/2016 |
| DE | 102014116958 A1 | 5/2016 |
| DE | 102016102768 A1 | 8/2017 |
| EA | 004167 B1 | 2/2004 |
| EP | 270897 A1 | 2/1992 |
| EP | 609978 A1 | 8/1994 |
| EP | 656241 B1 | 12/1998 |
| EP | 938946 A1 | 9/1999 |
| EP | 949541 A2 | 10/1999 |
| EP | 1306196 A1 | 5/2003 |
| EP | 1159104 B1 | 8/2004 |
| EP | 1609559 A1 | 12/2005 |
| EP | 1043110 B1 | 8/2006 |
| EP | 1990125 A1 | 11/2008 |
| EP | 2105239 A1 | 9/2009 |
| EP | 2133170 A1 | 12/2009 |
| EP | 2202545 A1 | 6/2010 |
| EP | 2258512 A1 | 12/2010 |
| EP | 2398746 A1 | 12/2011 |
| EP | 2574983 A1 | 4/2013 |
| EP | 2754524 A1 | 7/2014 |
| EP | 2781296 A1 | 9/2014 |
| EP | 2783784 A2 | 10/2014 |
| EP | 2859984 A2 | 4/2015 |
| EP | 3311947 A1 | 4/2018 |
| FR | 2989294 A1 | 10/2013 |
| GB | 0768515 A | 2/1957 |
| GB | 1242172 A | 8/1971 |
| GB | 2481190 B | 1/2015 |
| JP | 53-018756 A | 2/1978 |
| JP | 61-027212 A | 2/1986 |
| JP | 61-074794 A | 4/1986 |
| JP | 62-046930 A | 2/1987 |
| JP | 63-018756 A | 1/1988 |
| JP | 63-192561 A | 8/1988 |
| JP | 64-077001 A | 3/1989 |
| JP | 1179770 | 7/1989 |
| JP | 05-274085 A | 10/1993 |
| JP | 05-300544 A | 11/1993 |
| JP | 06-082720 A | 3/1994 |
| JP | 6318756 | 11/1994 |
| JP | 08-184581 A | 7/1996 |
| JP | 09-109243 A | 4/1997 |
| JP | 9106243 | 4/1997 |
| JP | 11-079770 A | 3/1999 |
| JP | 11197498 | 7/1999 |
| JP | 11269683 | 10/1999 |
| JP | 11330597 | 11/1999 |
| JP | 11-347861 A | 12/1999 |
| JP | 11347758 | 12/1999 |
| JP | 2000-225485 A | 8/2000 |
| JP | 2000-327349 A | 11/2000 |
| JP | 2001-130921 A | 5/2001 |
| JP | 2001138083 A | 5/2001 |
| JP | 2001-179473 A | 7/2001 |
| JP | 2002-045985 A | 2/2002 |
| JP | 2002-205181 A | 7/2002 |
| JP | 2002210730 A | 7/2002 |
| JP | 2002228818 A | 8/2002 |
| JP | 2002-321081 A | 11/2002 |
| JP | 2003025085 A | 1/2003 |
| JP | 2003-088985 A | 3/2003 |
| JP | 2003062756 A | 3/2003 |
| JP | 2003114400 A | 4/2003 |
| JP | 2003154517 A | 5/2003 |
| JP | 2003181668 A | 7/2003 |
| JP | 2003238178 A | 8/2003 |
| JP | 3445250 B2 | 9/2003 |
| JP | 2003-340579 A | 12/2003 |
| JP | 2004-182530 A | 7/2004 |
| JP | 2004209675 A | 7/2004 |
| JP | 2004-348137 A | 12/2004 |
| JP | 2005-000952 A | 1/2005 |
| JP | 2005104819 A | 4/2005 |
| JP | 2005-135964 A | 5/2005 |
| JP | 2005-144487 A | 6/2005 |
| JP | 2005-179154 A | 7/2005 |
| JP | 2005-219960 A | 8/2005 |
| JP | 2005205440 A | 8/2005 |
| JP | 2005-263623 A | 9/2005 |
| JP | 2005288503 A | 10/2005 |
| JP | 2006-108478 A | 4/2006 |
| JP | 3775250 B2 | 5/2006 |
| JP | 3775410 B2 | 5/2006 |
| JP | 2006130691 A | 5/2006 |
| JP | 2006-150385 A | 6/2006 |
| JP | 2006-182009 A | 7/2006 |
| JP | 2006-240948 A | 9/2006 |
| JP | 3823108 B2 | 9/2006 |
| JP | 2006248885 A | 9/2006 |
| JP | 2006-327711 A | 12/2006 |
| JP | 2007021548 A | 2/2007 |
| JP | 2007196277 A | 8/2007 |
| JP | 2007253203 A | 10/2007 |
| JP | 2008-018547 A | 1/2008 |
| JP | 2008-132616 A | 6/2008 |
| JP | 2008-168327 A | 7/2008 |
| JP | 2008-522950 A | 7/2008 |
| JP | 2008-266046 A | 11/2008 |
| JP | 2008-288577 A | 11/2008 |
| JP | 2009056482 A | 3/2009 |
| JP | 2009-082958 A | 4/2009 |
| JP | 2009-084089 A | 4/2009 |
| JP | 2009-126779 A | 6/2009 |
| JP | 2009-142886 A | 7/2009 |
| JP | 2009-178725 A | 8/2009 |
| JP | 2009172633 A | 8/2009 |
| JP | 2009-255114 A | 11/2009 |
| JP | 2009-269057 A | 11/2009 |
| JP | 2010017990 A | 1/2010 |
| JP | 2010-042424 A | 2/2010 |
| JP | 4418282 B2 | 2/2010 |
| JP | 2010046761 A | 3/2010 |
| JP | 4592855 B2 | 12/2010 |
| JP | 2011-011212 A | 1/2011 |
| JP | 2011-037707 A | 2/2011 |
| JP | 2011049398 A | 3/2011 |
| JP | 2011-512259 A | 4/2011 |
| JP | 4672689 B2 | 4/2011 |
| JP | 2011-517622 A | 6/2011 |
| JP | 2011517299 A | 6/2011 |
| JP | 2011-138083 A | 7/2011 |
| JP | 2011-520748 | 7/2011 |
| JP | 2011-147943 A | 8/2011 |
| JP | 2011-240291 A | 12/2011 |
| JP | 4880820 B2 | 2/2012 |
| JP | 2012024782 A | 2/2012 |
| JP | 2012031018 A | 2/2012 |
| JP | 2012-506837 | 3/2012 |
| JP | 2012-517957 A | 8/2012 |
| JP | 2012159749 A | 8/2012 |
| JP | 2012-521889 | 9/2012 |
| JP | 2012187618 A | 10/2012 |
| JP | 2012-232894 A | 11/2012 |
| JP | 2012-528772 A | 11/2012 |
| JP | 2013007842 A | 1/2013 |
| JP | 2013031879 A | 2/2013 |

(56) References Cited

FOREIGN PATENT DOCUMENTS

| | | |
|---|---|---|
| JP | 2013043808 A | 3/2013 |
| JP | 2013-063863 A | 4/2013 |
| JP | 2013075802 A | 4/2013 |
| JP | 2013091578 A | 5/2013 |
| JP | 2013-121908 A | 6/2013 |
| JP | 2013-521131 A | 6/2013 |
| JP | 2013-132664 A | 7/2013 |
| JP | 2013-136075 A | 7/2013 |
| JP | 2013-144613 A | 7/2013 |
| JP | 2013-528492 A | 7/2013 |
| JP | 2013-150990 A | 8/2013 |
| JP | 2013-168445 A | 8/2013 |
| JP | 5274085 B2 | 8/2013 |
| JP | 2013-536081 A | 9/2013 |
| JP | 5300544 B2 | 9/2013 |
| JP | 2013187247 A | 9/2013 |
| JP | 5318748 B2 | 10/2013 |
| JP | 2013203630 A | 10/2013 |
| JP | 2013203631 A | 10/2013 |
| JP | 2013223886 A | 10/2013 |
| JP | 2013-245153 A | 12/2013 |
| JP | 2014-001102 A | 1/2014 |
| JP | 2014-037006 A | 2/2014 |
| JP | 2014-104484 A | 6/2014 |
| JP | 2014-117707 A | 6/2014 |
| JP | 2014-156289 A | 8/2014 |
| JP | 2015-030040 A | 2/2015 |
| JP | 2015-076115 A | 4/2015 |
| JP | 2015-091606 A | 5/2015 |
| JP | 2015-129076 A | 7/2015 |
| JP | 2015-519722 A | 7/2015 |
| JP | 2015-536896 A | 12/2015 |
| JP | 2015-543336 | 2/2016 |
| JP | 2016-021077 A | 2/2016 |
| JP | 2016-503383 A | 2/2016 |
| JP | 6061193 B2 | 1/2017 |
| KR | 2012015366 | 2/2002 |
| KR | 10-2002-0031573 A | 5/2002 |
| KR | 2009057161 | 6/2009 |
| KR | 10-2009-0107417 A | 10/2009 |
| KR | 2010-0120297 A | 11/2010 |
| KR | 10-2011-0001948 A | 1/2011 |
| KR | 1020621 | 3/2011 |
| KR | 10-2011-0120862 A | 11/2011 |
| KR | 2011-0121637 A | 11/2011 |
| KR | 10-2012-0000073 A | 1/2012 |
| KR | 1120471 | 3/2012 |
| KR | 2012074508 | 7/2012 |
| KR | 2012-0102675 A | 9/2012 |
| KR | 2013-0031377 A | 3/2013 |
| KR | 2013031380 | 3/2013 |
| KR | 10-1259349 B1 | 4/2013 |
| KR | 1269474 | 5/2013 |
| KR | 10-2013-0075651 A | 7/2013 |
| KR | 2013-0079395 A | 7/2013 |
| KR | 10-2013-0111269 A | 10/2013 |
| KR | 2013124646 | 11/2013 |
| KR | 10-2013-0135873 A | 12/2013 |
| KR | 10-2013-0140561 A | 12/2013 |
| KR | 1344368 | 12/2013 |
| KR | 2014022980 | 2/2014 |
| KR | 2014022981 | 2/2014 |
| KR | 2014064220 | 5/2014 |
| KR | 10-2014-0112652 A | 9/2014 |
| KR | 10-2015-0009153 A | 1/2015 |
| KR | 2015-0016176 A | 2/2015 |
| NL | 2017998 | 6/2018 |
| TW | 480550 | 3/2002 |
| TW | 201041027 A | 11/2010 |
| TW | 201107253 A | 3/2011 |
| TW | 201139025 A | 11/2011 |
| TW | 1362370 B | 4/2012 |
| TW | 201226345 | 7/2012 |
| TW | 201311592 A | 3/2013 |
| TW | 201331136 A | 8/2013 |
| TW | 201339111 A | 10/2013 |
| TW | 201433550 A | 9/2014 |
| TW | 201436968 A | 10/2014 |
| TW | I468354 B | 1/2015 |
| TW | I520804 B | 2/2016 |
| TW | 201612615 A | 4/2016 |
| WO | 98/21154 A1 | 5/1998 |
| WO | 1999029243 | 6/1999 |
| WO | 1999063900 | 12/1999 |
| WO | 00/51778 A1 | 9/2000 |
| WO | 02/39063 A1 | 5/2002 |
| WO | 2003/007370 A1 | 1/2003 |
| WO | 2004110693 A1 | 12/2004 |
| WO | 2006/017583 A2 | 2/2006 |
| WO | 2006073098 A1 | 7/2006 |
| WO | 2007094160 A1 | 8/2007 |
| WO | 2007/119740 A1 | 10/2007 |
| WO | 2008/012186 A1 | 1/2008 |
| WO | 2008049389 A1 | 5/2008 |
| WO | 2008080182 A1 | 7/2008 |
| WO | 2008/102848 A1 | 8/2008 |
| WO | 2008/108332 A1 | 9/2008 |
| WO | 2008/126742 A1 | 10/2008 |
| WO | 2008128612 A1 | 10/2008 |
| WO | 2009/012913 A1 | 1/2009 |
| WO | 2009/114372 A2 | 9/2009 |
| WO | 2009114375 A2 | 9/2009 |
| WO | 2009/119694 A1 | 10/2009 |
| WO | 2010035736 A1 | 4/2010 |
| WO | 2010/096359 A1 | 8/2010 |
| WO | 2010111609 A2 | 9/2010 |
| WO | 2010129459 A2 | 11/2010 |
| WO | 2011025908 A1 | 3/2011 |
| WO | 2011056781 A1 | 5/2011 |
| WO | 2012006736 A2 | 1/2012 |
| WO | 2012075072 A2 | 6/2012 |
| WO | 2012108052 A1 | 8/2012 |
| WO | 2012166753 A1 | 12/2012 |
| WO | 2013/016157 A1 | 1/2013 |
| WO | 2013022148 A1 | 2/2013 |
| WO | 2013043173 A1 | 3/2013 |
| WO | 2013/084877 A1 | 6/2013 |
| WO | 2013/084879 A1 | 6/2013 |
| WO | 2013138802 A1 | 9/2013 |
| WO | 2013150990 A1 | 10/2013 |
| WO | 2013153195 A1 | 10/2013 |
| WO | 2014/010490 A1 | 1/2014 |
| WO | 2014/012125 A1 | 1/2014 |
| WO | 2014028022 A1 | 2/2014 |
| WO | 2014/058663 A1 | 4/2014 |
| WO | 2014/075995 A2 | 5/2014 |
| WO | 2014064492 A1 | 5/2014 |
| WO | 2014079478 A1 | 5/2014 |
| WO | 2014079570 A1 | 5/2014 |
| WO | 2014085663 A1 | 6/2014 |
| WO | 2014111385 A1 | 7/2014 |
| WO | 2014111794 A1 | 7/2014 |
| WO | 2014/121261 A1 | 8/2014 |
| WO | 2014/132493 A1 | 9/2014 |
| WO | 2014161534 A2 | 10/2014 |
| WO | 2014161535 A2 | 10/2014 |
| WO | 2015077113 A1 | 5/2015 |
| WO | 2015/094898 A2 | 6/2015 |
| WO | 2015/095151 A2 | 6/2015 |
| WO | 2015095088 A1 | 6/2015 |
| WO | 2015095090 A1 | 6/2015 |
| WO | 2015095146 A1 | 6/2015 |
| WO | 2015/114032 A1 | 8/2015 |
| WO | 2015/128833 A1 | 9/2015 |
| WO | 2015/132008 A1 | 9/2015 |
| WO | 2015127583 A1 | 9/2015 |
| WO | 2016/007843 A1 | 1/2016 |
| WO | 2016/010991 A1 | 1/2016 |
| WO | 2016005455 A1 | 1/2016 |
| WO | 2016010954 A2 | 1/2016 |
| WO | 2016/079275 A1 | 5/2016 |
| WO | 2016/089799 A1 | 6/2016 |
| WO | 2016/100954 A1 | 6/2016 |
| WO | 20160154284 A1 | 9/2016 |

(56) References Cited

FOREIGN PATENT DOCUMENTS

| WO | 2017/009149 A1 | 1/2017 |
|---|---|---|
| WO | 2017/079570 A2 | 5/2017 |
| WO | 2017/091529 A1 | 6/2017 |
| WO | 2017/093393 A1 | 6/2017 |

OTHER PUBLICATIONS

Betriebsanleitung; TruMicro 5000; Aug. 2011; pp. 1-4.
Bhuyan, M. et al.; High aspect ratio nanochannel machining using single shot femtosecond Bessel beams; Applied Physics Letters; Aug. 23, 2010; pp. 081102-1-081102-3; vol. 97.
Bhuyan, M. et al.; High aspect ratio taper-free microchannel fabrication using femtosecond Bessel beams; Optics Express; Jan. 18, 2010; pp. 566-574; vol. 18, No. 2; Optical Society of America.
Cubeddu, R. et al.; A compact time-resolved reflectance system for dual-wavelength multichannel assessment of tissue absorption and scattering; SPIE Conference on Optical Tomography and Spectroscopy of Tissue III; San Jose, California; Jan. 1999; pp. 450-455; vol. 3597; SPIE.
Cubeddu, R. et al.; Compact tissue oximeter based on dual-wavelength multichannel time-resolved reflectance; Applied Optics; Jun. 1, 1999; pp. 3670-3680; vol. 38, No. 16; Optical Society of America.
Ding, Z. et al.; High-resolution optical coherence tomography over a large depth range with an axicon lens; Optics Letters; Feb. 15, 2002; pp. 243-245; vol. 27, No. 4; Optical Society of America.
EagleEtch; The Anti-glare Glass for Technical Display Applications; Glass and Polymer Technologies; pp. 1-8 EuropTec USA Inc.
Girkin, J. et al.; Macroscopic multiphoton biomedical imaging using semiconductor saturable Bragg reflector modelocked Lasers; SPIE Conference on Commercial and Biomedical Applications of Ultrafast Lasers; San Jose, California; Jan. 1999; pp. 92-98; vol. 3616; SPIE.
Glezer, E. et al.; Ultrafast-laser driven micro-explosions in transparent materials; Applied Physics Letters; 1997; pp. 882-884, vol. 71.
Golub, I.; Fresnel axicon; Optics Letters; Jun. 15, 2006; pp. 1890-1892;. vol. 31, No. 12; Optical Society of America.
Herman, P. et al.; Laser micromachining of 'transparent' fused silica with 1-ps pulses and pulse trains; SPIE Conference on Commercial and Biomedical Applications of Ultrafast Lasers; San Jose, California; Jan. 1999; pp. 148-155; vol. 3616; SPIE.
Kosareva, O. et al.; Formation of extended plasma channels in a condensed medium upon axicon focusing of a femtosecond laser pulse; Quantum Electronics; 2005; pp. 1013-1014; vol. 35, No. 11; Kvantovaya Elektronika and Turpion Ltd.
Kruger, J. et al.; Femtosecond-pulse visible laser processing of transparent materials; Applied Surface Science; 1996; pp. 430-438; Elsevier B.V.
Kruger, J. et al.; Laser micromachining of barium aluminium borosilicate glass with pulse durations between 20 fs and 3 ps; Applied Surface Science; 1998; pp. 892-898; Elsevier B.V.
Kruger, J. et al.; Structuring of dielectric and metallic materials with ultrashort laser pulses between 20 fs and 3 ps; SPIE Proceedings; San Jose, California; Feb. 8, 1997; pp. 40-47 vol 2991; SPIE.
Lapczyna, M. et al.; Ultra high repetition rate (133 MHz) laser ablation of aluminum with 1.2-ps pulses; Applied Physics A Materials Science & Processing; Dec. 28, 1999; pp. S883-S886; vol. 69 (Suppl).; Springer-Verlag.
Perry, M. et al.; Ultrashort-Pulse Laser Machining; Lawrence Livermore National Laboratory; Sep. 1998; pp. i-30.
Perry, M. et al.; Ultrashort-Pulse Laser Machining; International Congress on Applications of Lasers and Electro-Optics; Orlando, Florida; Nov. 16-19, 1998; pp. 1-24.
Perry, M. et al.; Ultrashort-pulse laser machining of dielectric materials; Journal of Applied Physics; May 1, 1999 pp. 6803-6810; vol. 85, No. 9; American Institute of Physics.
Pharos High-power Femtosecond Laser System specification; Light Conversion; 2011; pp. 1-2.
Polynkin, P. et al.; Extended filamentation with temporally chirped femtosecond Bessel-Gauss beams in air; Optics Express; Jan. 19, 2009; pp. 575-584; vol. 17, No. 2; Optical Society of America.
Serafetinides, A. et al.; Ultra-short pulsed laser ablation of polymers; Applied Surface Science; 2011; pp. 42-56; vol. 180; Elsevier Science B.V.
Sundaram, S. et al.; Inducing and probing non-thermal transitions in semiconductors using femtosecond laser pulses; Nature Materials; Dec. 2002; pp. 217-224; vol. 1; Nature Publishing Group.
Vanagas, E. et al.; Glass cutting by femtosecond pulsed irradiation; Journal of Micro/Nanolithography, MEMS, and MOEMS; Mar. 31, 2004; pp. 1-18; vol. 3, Issue 2; SPIE.
Varel, H. et al.; Micromachining of quartz with ultrashort laser pulses; Applied Physics A Materials Science & Processing; 1997; pp. 367-373; vol. 65.
Yoshino, F. et al.; Micromachining with a High Repetition Rate Femtosecond Fiber Laser; JLMN—Journal of Laser Micro/Nanoengineering; 2008; pp. 157-162; vol. 3, No. 3.
Zeng, D. et al.; Characteristic analysis of refractive axicon system for optical trepanning; Optical Engineering; Sep. 2006; pp. 094302-1-094302-10; vol. 45, No. 9.
Zhang, G. et al.; Design of diffractive-phase axicon illuminated by a Gaussian-profile beam; Acta Physica Sinica; May 1996; pp. 354-364; vol. 5, No. 5; Chin. Phys. Soc.
Abakians, H. et al.; Evaporative Cutting of a Semitransparent Body With a Moving CW Laser; Journal of Heat Transfer; Nov. 1988; pp. 924-930; vol. 110; ASME.
Ahmed, F. et al.; Display glass cutting by femtosecond laser induced single shot periodic void array; Applied Physics A Material Science & Processing; Jun. 3, 2008; pp. 189-192; vol. 93; Springer-Verlag.
Bagchi, S. et al.; Fast ion beams from intense, femtosecond laser irradiated nanostructured surfaces; Applied Physics B Lasers and Optics; Jun. 27, 2007; pp. 167-173; vol. 88; Springer-Verlag.
Bhuyan, M.K. et al.; Femtosecond non-diffracting Bessel beams and controlled nanoscale ablation; ResearchGate Conference Paper; Sep. 2011; pp. 1-4.
Bhuyan, M.K. et al.; Laser micro- and nanostructuring using femtosecond Bessel beams; The European Physical Journal Special Topics; Dec. 7, 2011; pp. 101-110; vol. 1999; EDP Sciences, Springer-Verlag.
Bhuyan, M.K. et al.; Single-shot high aspect ratio bulk nanostructuring of fused silica using chirp-controlled ultrafast laser Bessel beams; Applied Physics Letters; Jan. 14, 2014; pp. 021107-1-021107-4; vol. 104; AIP Publishing LLC.
Bhuyan, M.K. et al.; Ultrafast Bessel beams for high aspect ratio taper free micromachining of glass; Nonlinear Optics and Applications IV; 2010; pp. 77281V-1-77281V-8; vol. 7728; SPIE.
Case Design Guidelines for Apple Devices; Sep. 13, 2013; pp. 1-58; Apple Inc.
Chiao, R. Y. et al.; Self-Trapping of Optical Beams; Physical Review Letters; Oct. 12, 1964; pp. 479-482; vol. 13, No. 15.
Corning EAGLE AMLCD Glass Substrates Material Information; Apr. 2005; pp. MIE 201-1-MIE 201-3; Corning Incorporated.
Corning 1737 AMLCD Glass Substrates Material Information; Aug. 2002; pp. MIE 101-1-MIE 101-3; Corning Incorporated.
Couairon, A. et al.; Femtosecond filamentation in transparent media; ScienceDirect Physical Reports; Feb. 6, 2007; pp. 47-189; vol. 441; Elsevier B.V.
Courvoisier, F. et al.; Applications of femtosecond Bessel beams to laser ablation; Applied Physics A Materials Science & Processing; Sep. 6, 2012; pp. 29-34; vol. 112; Springer-Veriag.
Courvoisier, F. et al.; Surface nanoprocessing with nondiffracting femtosecond Bessel beams; Optics Letters; Oct. 15, 2009; pp. 3163-3165; vol. 34, No. 20; Optical Society of America.
Dong, M. et al.; On-axis irradiance distribution of axicons illuminated by spherical wave; ScienceDirect Optics & Laser Technology; Sep. 2007; pp. 1258-1261; vol. 39; Elsevier Ltd.
Duocastella, M. et al.; Bessel and annular beams for materials processing; Laser & Photonics Reviews; 2012; pp. 607-621; vol. 6, No. 5.
Durnin, J.; Exact solutions for nondiffracting beams. I. The scalar theory; J. Opt. Soc. Am. A; Apr. 1987; pp. 651-654; vol. 4, No. 4; Optical Society of America.

(56) References Cited

OTHER PUBLICATIONS

Eaton, S. et al.; Heat accumulation effects in femtosecond laser-written waveguides with variable repetition rate; Optics Express; Jun. 13, 2005; pp. 4708-4716; vol. 13, No. 12; Optical Society of America.

Gattass, R. et al.; Micromachining of bulk glass with bursts of femtosecond laser pulses at variable repetition rates; Optics Express; Jun. 12, 2006; pp. 5279-5284; vol. 14, No. 12; Optical Society of America.

Gori, F. et al.; Analytical derivation of the optimum triplicator; Optics Communications; Dec. 1, 1998; pp. 13-16; vol. 157; Elsevier B.V.

Honda, M. et al.; A Novel Polymer Film that Controls Light Transmission; Progress in Pacific Polymer Science 3; 1994; pp. 159-169; Springer-Verlag Berlin Heidelberg.

Hu, Z. et al.; 5-Axis Laser Cutting Interference Detection and Correction Based on STL Model; Chinese Journal of Lasers; Dec. 2009; pp. 3313-3317; vol. 36, No. 12.

Huang, Z. et al.; Laser etching of glass substrates by 1064 nm laser irradiation; Applied Physics A Materials Science & Processing; Jun. 6, 2008; pp. 159-163; vol. 93; Springer-Verlag.

Juodkazis, S. et al.; Laser-Induced Microexplosion Confined in the Bulk of a Sapphire Crystal: Evidence of Multimegabar Pressures; Physical Review Letters; Apr. 28, 2006; pp. 166101-1-166101-4; vol. 96; The American Physical Society.

Karlsson, S. et al.; The Technology of Chemical Glass Strengthening—A Review; Glass Technology—European Journal of Glass Science and Technology Part A; Apr. 2010; pp. 41-54; vol. 51, No. 2.

Levy, U. et al.; Design, fabrication, and characterization of circular Dammann gratings based on grayscale lithography; Optics Letters; Mar. 15, 2010; pp. 880-882; vol. 35, No. 6; Optical Society of America.

Liu, X. et al.; Laser Ablation and Micromachining with Ultrashort Laser Pulses; IEEE Journal of Quantum Electronics; Oct. 1997; pp. 1706-1716; vol. 33, No. 10; IEEE.

Maeda, K. et al.; Optical performance of angle dependent light control glass; Optical Materials Technology for Energy Efficiency and Solar Energy Conversion X; 1991; pp. 138-148; vol. 1536; SPIE.

Mbise, G. et al.; Angular selective window coatings; theory and experiments; J. Phys. D: Appl. Phys.; 1997; pp. 2103-2122; vol. 30; IOP Publishing Ltd.

McGloin, D. et al.; Bessel beams: diffraction in a new light; Contemporary Physics; Jan.-Feb. 2005; pp. 15-28; vol. 46; Taylor & Francis Ltd.

Merola, F. et al.; Characterization of Bessel beams generated by polymeric microaxicons; Measurement Science and Technology; May 15, 2012; pp. 1-10; vol. 23; IOP Publishing Ltd.

Mirkhalaf, M. et al.; Overcoming the biillleness of glass through bio-inspiration and micro-architecture; Nature Communications; Jan. 28, 2014; pp. 1-9; Macmillan Publishers Limited.

Romero, L. et al.; Theory of optimal beam splitting by phase gratings. II. Square and hexagonal gratings; J. Opt. Soc. Am. A; Aug. 2007; pp. 2296-2312; vol. 24, No. 8; Optical Society of America.

Salleo, A. et al.; Machining of transparent materials using an IR and UV nanosecond pulsed laser; Applied Physics A Materials Science & Processing; Sep. 20, 2000; pp. 601-608; vol. 71; Springer-Verlag.

Serafetinides, A. et al.; Polymer Ablation by Ultra-Short Pulsed Lasers; Proceedings of SPIE; 2000; pp. 409-415.

Shah, L. et al.; Micromachining with a High Repetition Rate Femtosecond Fiber Laser; JLMN—Journal of Laser Micro/Nanoengineering; Nov. 2008; pp. 157-162; vol. 3, No. 3.

Shealy, D. et al.; Geometric optics-based design of laser beam shapers; Opt. Eng.; Nov. 2003; pp. 3123-3138; vol. 42, No. 11; Society of Photo-Optical Instrumentation Engineers.

Yan, Y. et al.; Fiber structure to convert a Gaussian beam to higher-order optical orbital angular momentum modes; Optics Letters; Aug. 15, 2012; pp. 3294-3296; vol. 37, No. 16; Optical Society of America.

Abramov, A. et al.; Laser separation of chemically strengthened glass; ScienceDirect Physics Procedia; 2010; pp. 285-290; vol. 5; Elsevier B.V.

Stoian, R. et al.; Spatial and temporal laser pulse design for material processing on ultrafast scales; Applied Physics A Materials Science & Processing; Jan. 1, 2014; pp. 119-127; vol. 114; Springer-Veriag Berlin Heidelberg.

Thiele, E.; Relation between Catalytic Activity and Size of Particle; Industrial and Engineering Chemistry; Jul. 1939; pp. 916-920; vol. 31, No. 7.

Toytman, I. et al.; Optical breakdown in transparent media with adjustable axial length and location; Optic Express; Nov. 22, 2010; pp. 24688-24698; vol. 18, No. 24; Optical Society of America.

Velpula, P. et al.; Ultrafast imaging of free carriers: controlled excitation with chirped ultrafast laser Bessel beams; Laser Applications in Microelectronic and Optoelectronic Manufacturing (LAMOM) XIX; Proc. of SPIE; 2014; pp. 896711-1-896711-8; vol. 8967; SPIE.

Nang, Z. et al.; Investigation on CO2 laser irradiation inducing glass strip peeling for microchannel formation; Biomicrofluidics; Mar. 12, 2012; pp. 012820-1-012820-12; vol. 6; American Institute of Physics.

Ra & RMS: Calculating Surface Roughness; Harrison Eelectropolishing; 2012.

Wu, W. et al.; Optimal Orientation of the Cutting Head for Enhancing Smoothness Movement in Three-Dimensional Laser Cutting; Chinese Journal of Lasers; Jan. 2013; pp. 0103005-1-0103005-7, vol. 10, No. 1.

GT ASF Grown Sapphire Cover and Touch Screen Material; www.gtat.com; 2012; pp. 1-2; GTAT Corporation.

Xu, H. et al.; Optimization of 3D laser cutting head orientation based on minimum energy consumption; Int J Adv Manuf Technol; Jun. 28, 2014; pp. 1283-1291; vol. 74; Springer-Verlag London.

Kerr. "Filamentary tracks formed in transparent optical glass by laser beam self-focusing. II. Theoretical Analysis" Physical Review A. 4(3) 1971, pp. 1196-1218.

"Aviation Manufacturing Technology"; Beijing Aviation Manufacturing Engineering Research Institute Aviation Industry Press; (2013) p. 147.

"EagleEtch" Product Brochure, EuropeTec USA Inc., pp. 1-8, Aug. 1, 2014.

"TruMicro 5000" Product Manual, Trumpf Laser GmbH +Co.KG, pp. 1-4, Aug. 2011.

Amended claims 1,2 Amended Claims (Nov. 21, 2018) GMvp4 p. 1.

Analyse of claims 1-11 GMvP7 p. 1.

Betriebsanleitung TruMicro Series 5000, "Ausgabe May 2008 Betriebsanleitung TruMicro Series 5000_Anlage E2a-1.pdf".

Case Design Guidelines for Apple Devices Release R5 (https://web.archive.org/web/20131006050442/https://developer.apple.com/resources/cases/Case-Design-Guidelines.pdf; archived on Oct. 6, 2013).

Case study: Simulation einer Beschneidung des Fernfelds eines Bessel-Gauß-Strahls GMvP6 p. 1.

Claim 1—published on Nov. 20, 2019 EP947: Anspruch 1—erteilt am Nov. 20, 2019 GMvp5 p. 1.

Coming Inc., Coming Eagle2000TM AMLCD Glass Substrates Material Information, issued Apr. 2005. (Year: 2005).

D5 Claims GMvP2 p. 1.

D6 Amended claim 1 EP947: Anspruch 1—geandert am Nov. 21, 2018 GMvp3 p. 1.

European Patent Application No. 15750162.8 Communication under Rule 71(3) EPC dated Dec. 11, 2018; 6 Pages; European Patent Office.

European Patent Application No. 15750162.8 Communication under Rule 71(3) EPC dated Jul. 27, 2017; 6 Pages; European Patent Office.

(56) References Cited

OTHER PUBLICATIONS

European Patent Application No. 15750162.8 Decision to grant a European patent dated Jan. 8, 2020; 2 Pages; European Patent Office.
European Patent Application No. 15750162.8 Office Action dated Feb. 20, 2018; 4 Pages; European Patent Office.
European Patent Application No. 19172136.4 Office Action dated Nov. 5, 2020; 5 Pages; European Patent Office.
Extended European Search Report and Search Opinion; 19172136. 4; dated Nov. 13, 2019; 11 pages; European Patent Office.
Faccio et al. "Kerr-induced spontaneous Bessel beam formation in the regime of strong two-photon absorption" Optics Express 16(11) 2008, pp. 8213-8218.
Flamm et al., "Higher-order Bessel-like Beams for Optimized Ultrafast Processing of Transparent Materials" GMvP 19.
Flamm et al., "Higher-order Bessel-like Beams for Optimized Ultrafast Processing of Transparent Materials" GMvP 20.
Gollier et al., U.S. Appl. No. 62/024,122, "Systems and Methods for Processing Transparent Materials Using Adjustable Laser Beam Focal Lines", filed Jul. 14, 2014., U.S. Appl. No. 62/024,122.
High aspect ratio machining . . . Anlage E8-1.pdf.
http://www.gtat.com/Collateral/Documents/Engltsh-US/Sapphire/ 12-21-12_GT_TnuchScreen_V3_web.pdf.
International Search Report and Written Opinion of the International Searching Authority; PCT/US2015/040259; dated Mar. 8, 2016; 22 Pages; European Patent Office.
Merkmalsgliederung Patentanspruch 1 des Streitpatents, "Merkmalsgliederung Patentanspruch 1 _Anlage E15-1.pd1".
Merkmalsgliederung Patentanspruch 12 des Streitpatents,"Merkmalsgliederung Patentanspruch 12 _Anlage E16-1.pdf".
Norm: DI N EN ISO 11146-2, 2005 DIN EN ISO 11146-2 May 2, 2005 GMvP 21 pages.
Norm: DIN EN ISO 11146-1, 2005 GMVP DIN EN ISO 11146:1999-09, Apr. 1, 2005 GMvP 23 pages.
Norm: ISO/TR 11146-3 , Technical Report First edition GMvP Norm-TR 1 Pages.
Polesana (Polesana, P., Dubietis, A., Porras, A. Kucinskas, E. Faccio, D. Couairon, A. and DiTrapani, P.,, "Near-field dynamics of ultrashort pulsed Bessel beams in media with Kerr nonlinearity", Physical Review E 73, 056612 (2006)).
Product Data Sheet for Corning Eagle XG Slim Glass, Issued Aug. 2013; 2 Pages.
Product data sheet for Corning Eagle XR glass substrate, issued Jan. 2006 (Year: 2006).
Produktbeschreibung Pharos Laser vom Apr. 18, 2011, "Pharos_2011 Anlage E 1 a-1. pdf".
U.S. Appl. No. 62/208,282, filed Aug. 21, 2015.
Sukumaran, "Design, Fabrication, and Characterization of Ultrathin 3-D Glass Interposers with Through-Package-Vias at Same Pitch as TSVs in Silicon." IEEE Transactions on Components, Packaging and Manufacturing Technology, vol. 4, No. 5: 786-795, (2014.).
Sukumaran, "Through-Package—via Formation and Metallization of Glass Interposers.", Electronic Components and Technology Conference: 557-563, (2010.).
U.S. Appl. No. 62/137,443, "Laser Cutting and Processing of Display Glass Compositions", filed Mar. 24, 2015., U.S. Appl. No. 62/137,443.
Unichains, Engineering Manual: Innovative Belt & Chain solutions for every industry and application, available publically at least as of Jun. 1, 2016 as evidenced at the following hyperlink: https://web.archive.org/web/20160601000000/http://www.unichains.com/.
What is the difference between Ra and RMS?; Harrison Electropolishing LP; (http://www.harrisonep.com/electropolishingra.html), Accessed Aug. 8, 2016.
ICNIRP, Infrared Radiation, https://www.icnirp.org/en/frequencies/infrared/index.html#:~:text=Wavelength, accessed Apr. 7, 2021 (Year: 2014).
Liu,Xiuwen, "Graphical Audio-Visual Technology Tips", Apr. 30, 2006, pp. 58-59. (Original Document Only).
Tian e al., "Development status and Prospects of TFT-LCD Substrate Glass Chemical Composition", vol. 29, No. 6, 2010, pp. 1348-1362 (English Abstract Submitted).
Tsai et al. ,"Internal modification for cutting transparent glass using femtosecond Bessel beams", Optical Engineering, Soc. of Photo-optical Instrumentation Engineering, Bellingham, vol. 53, May 2014, p. 51503.
Tymon Barwicz, et al., "Assembly of Mechanically Compliant Interfaces between Optical Fibers and Nanophotonic Chips", Tymon Barwicz (IBM), et al., Electronic Components & Technology Conference, 2014,. 978-1799-2407-3, 2014 IEEE, pp. 179-185.
Chinese Patent Application No. 201780065972.0, Office Action dated Apr. 15, 2022, 14 pages (6 pages of English Translation and 8 pages of Original Document), Chinese Patent Office.
Japanese Patent Application No. 2020-116177, Decision to Grant, dated Jul. 6, 2022, 5 pages (2 pages of English Translation and 3 pages of Original Copy); Japanese Patent Office.
Japanese Patent Application No. 2020-116177, Office Action dated Aug. 3, 2021, 10 pages (5 pages of English Translation and 5 pages of Original Document), Japanese Patent Office.

\* cited by examiner

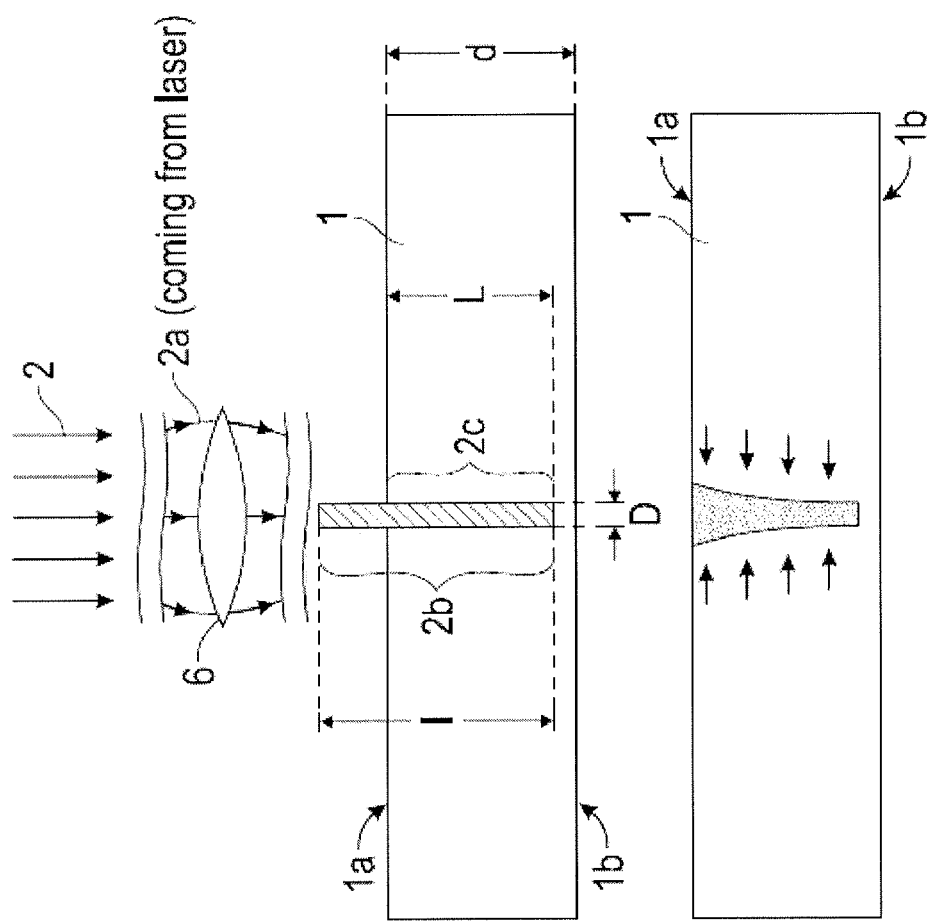

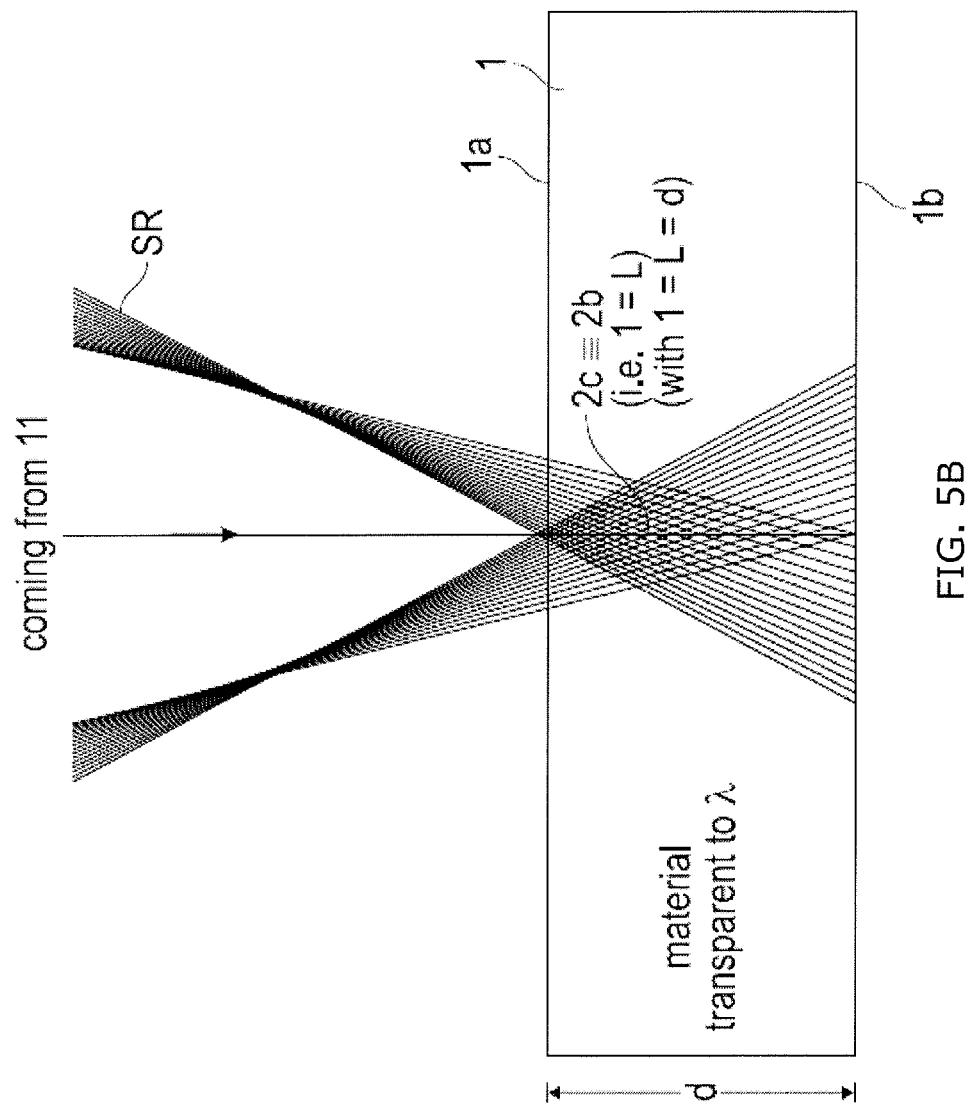

SYSTEMS AND METHODS FOR PROCESSING TRANSPARENT MATERIALS USING ADJUSTABLE LASER BEAM FOCAL LINES

CROSS-REFERENCE TO RELATED APPLICATIONS

This application claims the benefit of priority under 35 U.S.C. § 371 of International Application No. PCT/US2015/40259, filed on Jul. 14, 2015, which claims the benefit of priority under 35 U.S.C. § 119 of U.S. Provisional Application Ser. No. 62/024,122 filed on Jul. 14, 2014 the content of which is relied upon and incorporated herein by reference in its entirety.

BACKGROUND

In recent years, precision micromachining and its improvement of process development to meet customer demand to reduce the size, weight and material cost of leading-edge devices has led to fast pace growth in high-tech industries in flat panel displays for touch screens, tablets, smartphones and TVs. Ultrafast industrial lasers are becoming important tools for applications requiring high precision micromachining.

There are various known ways to cut glasses. In conventional laser glass cutting processes, the separation of glass relies on laser scribing or perforation followed by separation with mechanical force or thermal stress-induced crack propagation. Nearly all current laser cutting techniques exhibit one or more shortcomings. For example, glass cutting by laser processes employing Gaussian laser beams require a large number of pulses to create the desired damage lines within the glass substrate due to the tight focus of the laser beam. Such laser cutting processes may be time consuming and therefore limit throughput.

SUMMARY

The embodiments disclosed herein relate to methods and systems that create small (few micron and smaller) "holes" in transparent materials (glass, sapphire, etc.) for the purpose of drilling, cutting, separating, perforating, or otherwise processing the materials. More particularly, an ultrashort (i.e., from $10^{-10}$ to $10^{-15}$ second) pulse laser beam (wavelengths such as 1064, 532, 355 or 266 nanometers) is focused to a line focus having an energy density above the threshold needed to create a defect in the region of focus at the surface of or within the transparent material. The length and diameter of the line focus is adjusted according to the type and thickness of the transparent material. By repeating the process, a series of laser-induced defects aligned along a predetermined path can be created. By spacing the laser-induced features sufficiently close together, a controlled region of mechanical weakness within the transparent material can be created and the transparent material can be precisely fractured or separated (immediately, or later with additional mechanical or thermal separation step) along the path defined by the series of laser-induced defects. In the case of high internal stress materials such as chemically strengthened glasses, the material may immediately fracture and separate along the path defined by the laser induced defects. In the case of low stress materials such as glasses made for TFT (thin film transistor) display applications, an additional separation step may be needed. Hence the ultrashort, line focus laser pulse(s) may be optionally followed by a carbon dioxide ($CO_2$) laser or other source of thermal stress to effect fully automated separation of a transparent material or part from a substrate, for example.

In one embodiment, a system for processing a transparent material includes a laser source operable to emit a pulsed laser beam, and an optical assembly disposed within an optical path of the pulsed laser beam. The optical assembly is configured to transform the pulsed laser beam into a laser beam focal line having an adjustable length and an adjustable diameter. At least a portion of the laser beam focal line is operable to be positioned within a bulk of the transparent material such that the laser beam focal line generates an induced multi-photon absorption within the transparent material. The induced multi-photon absorption produces a material modification within the transparent material along the laser beam focal line.

In another embodiment, a method of processing a transparent material includes focusing a pulsed laser beam to form a laser beam focal line along a beam propagation direction, wherein the laser beam focal line has a length and a diameter. The method further includes adjusting at least one of the length of the laser beam focal line and the diameter of the laser beam focal line, and directing the laser beam focal line into the transparent material such that at least a portion of the laser beam focal line is within a bulk of the material. The laser beam focal line generates an induced multi-photon absorption within the transparent material. The induced multi-photon absorption produces a material modification within the material along the laser beam focal line.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the representative embodiments.

FIGS. 2A and 2B are schematic illustrations of positioning of the laser beam focal line, i.e., laser processing of a material transparent to the laser wavelength due to the induced absorption along the focal line;

FIGS. 3B-1, 3B-2, 3B-3, and 3B-4 illustrate various possibilities for processing the substrate by forming the laser beam focal line at different positions within the transparent material relative to the substrate;

FIG. 4 is a schematic illustration of a second optical assembly for laser processing;

FIGS. 5A and 5B are schematic illustrations of a third optical assembly for laser processing;

DETAILED DESCRIPTION

Figure 1:
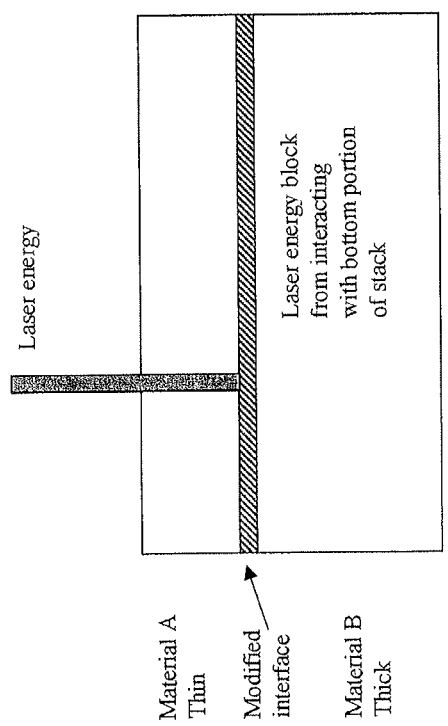
FIG. 1 is a schematic illustration of a stack of three layers: a thin material A facing the laser energy, a modified interface, and a thick material B, the modified interface disrupting the laser energy form interacting with the portion of the stack on the side of the modified interface remote from the laser beam.

Embodiments described herein relate to methods and systems for optically producing high precision cuts in or through transparent materials. Sub-surface damage from the cutting process may be limited to the order of 60 microns in depth or less, and the cuts may produce only low debris. Cutting of a transparent material with a laser in accordance with the present disclosure may also be referred to herein as drilling or laser drilling or laser processing. A material is substantially transparent to the laser wavelength when the absorption is less than about 10%, preferably less than about 1% per mm of material depth at this wavelength.

Generally, a laser beam is transformed to a laser beam focus line that is positioned within the bulk of a material, such as glass, to create damage lines within the material. The material may then be separated along these damage lines. The laser beam focus line may also be utilized to fabricate holes in a material, such as hole in an interposer of a semiconductor device assembly. Systems and methods for adjusting the length and the diameter of the laser line focus are described herein. The length and/or diameter of the laser line focus may be adjusted according to different types of materials as well as materials of different thicknesses.

In accordance with methods described below, in a single pass, a laser can be used to create highly controlled full line perforation through the material, with extremely little (<75 μm, often <50 μm) subsurface damage and debris generation. This is in contrast to the typical use of spot-focused laser to ablate material, where multiple passes are often necessary to completely perforate the glass thickness, large amounts of debris are formed from the ablation process, and more extensive sub-surface damage (>100 μm) and edge chipping occur.

Thus, it is possible to create a microscopic (i.e., <0.5 μm and >100 nm in diameter) elongated "hole" (also called a perforation or a defect line) in transparent material using a single high energy burst pulse. According to the exemplary embodiments described herein a typical perforation will have a diameter of >100 nm and less than 5 micrometer, for example 0.2 to 2 microns, 0.2 to 1 micron, or therebetween; and a length of 50 microns or greater (e.g., 0.1 mm to 100 mm, 150 microns to 2 mm, or 150 microns to 5 mm, or 150 microns to 10 mm). These perforations, defect regions, damage tracks, or defect lines are generally spaced from 1 to 25 microns apart, in some embodiments 1-15 microns apart (for example, 2-12 microns, 5-10 microns), but in some embodiments 15-25 microns apart. These individual perforations can be created at rates of several hundred kilohertz (several hundred thousand perforations per second, for example). Thus, with relative motion between the source and the material these perforations can be placed adjacent to one another (spatial separation varying from sub-micron to several microns as desired). This spatial separation is selected in order to facilitate cutting. In some embodiments, the defect line is a "through hole", which is a hole or an open channel that extends from the top to the bottom of the transparent material. In some embodiments the defect line may not be a continuous channel, and may be blocked or partially blocked by portions or sections of solid material (e.g., glass). As defined herein, the internal diameter of the defect line is the internal diameter of the open channel or the air hole. For example, in the embodiments described herein the internal diameter of the defect line is <500 nm, for example ≤400 nm, or ≤300 nm. The disrupted or modified area (e.g., compacted, melted, or otherwise changed) of the material surrounding the holes in the embodiments disclosed herein, preferably has diameter of <50 μm (e.g., <10 μm).

Micromachining and selective cutting of a stack of transparent materials is accomplished with precise control of the depth of cut through selection of an appropriate laser source and wavelength along with beam delivery optics, and the placement of a beam disruption element at the boundary of a desired layer. The beam disruption element may be a layer of material or an interface. The beam disruption element may be referred to herein as a laser beam disruption element, disruption element or the like. Embodiments of the beam disruption element may be referred to herein as a beam disruption layer, laser beam disruption layer, disruption layer, beam disruption interface, laser beam disruption interface, disruption interface, or the like.

The beam disruption element reflects, absorbs, scatters, defocuses or otherwise interferes with an incident laser beam to inhibit or prevent the laser beam from damaging or otherwise modifying underlying layers in the stack. In one embodiment, the beam disruption element underlies the layer of transparent material in which laser drilling will occur. As used herein, the beam disruption element underlies the transparent material when placement of the beam disruption element is such that the laser beam must pass through the transparent material before encountering the beam disruption element. The beam disruption element may underlie and be directly adjacent to the transparent layer in which laser drilling will occur. Stacked materials can be micromachined or cut with high selectivity by inserting a layer or modifying the interface such that a contrast of optical properties exists between different layers of the stack. By making the interface between materials in the stack more reflective, absorbing, and/or scattering at the laser wavelengths of interest, cutting can be confined to one portion or layer of the stack.

The wavelength of the laser is selected so that the material within the stack to be laser processed (drilled, cut, ablated, damaged or otherwise appreciably modified by the laser) is transparent to the laser wavelength. In one embodiment, the material to be processed by the laser is transparent to the laser wavelength if it absorbs less than 10% of the intensity of the laser wavelength per mm of thickness of the material. In another embodiment, the material to be processed by the laser is transparent to the laser wavelength if it absorbs less than 5% of the intensity of the laser wavelength per mm of thickness of the material. In still another, the material to be processed by the laser is transparent to the laser wavelength if it absorbs less than 2% of the intensity of the laser wavelength per mm of thickness of the material. In yet another embodiment, the material to be processed by the laser is transparent to the laser wavelength if it absorbs less than 1% of the intensity of the laser wavelength per mm of thickness of the material.

The selection of the laser source is further predicated on the ability to induce multi-photon absorption (MPA) in the transparent material. MPA is the simultaneous absorption of multiple photons of identical or different frequencies in order to excite a material from a lower energy state (usually the ground state) to a higher energy state (excited state). The excited state may be an excited electronic state or an ionized state. The energy difference between the higher and lower energy states of the material is equal to the sum of the energies of the two or more photons. MPA is a nonlinear process that is several orders of magnitude weaker than linear absorption. In the case of two-photon absorption, it differs from linear absorption in that the strength of absorption depends on the square of the light intensity, thus making it a nonlinear optical process. At ordinary light intensities, MPA is negligible. If the light intensity (energy density) is extremely high, such as in the region of focus of a laser source (particularly a pulsed laser source), MPA becomes appreciable and leads to measurable effects in the material within the region where the energy density of the light source is sufficiently high. Within the focal region, the energy density may be sufficiently high to result in ionization, breaking of molecular bonds, and vaporization of material.

At the atomic level, the ionization of individual atoms has discrete energy requirements. Several elements commonly used in glass (e.g., Si, Na, K) have relatively low ionization energies (~5 eV). Without the phenomenon of MPA, a wavelength of about 248 nm would be required to create linear ionization at ~5 eV. With MPA, ionization or excitation between states separated in energy by ~5 eV can be accomplished with wavelengths longer than 248 nm. For example, photons with a wavelength of 532 nm have an energy of ~2.33 eV, so two photons with wavelength 532 nm can induce a transition between states separated in energy by ~4.66 eV in two-photon absorption (TPA), for example.

Thus, atoms and bonds can be selectively excited or ionized in the regions of a material where the energy density of the laser beam is sufficiently high to induce nonlinear TPA of a laser wavelength having half the required excitation energy, for example. MPA can result in a local reconfiguration and separation of the excited atoms or bonds from adjacent atoms or bonds. The resulting modification in the bonding or configuration can result in non-thermal ablation and removal of matter from the region of the material in which MPA occurs. This removal of matter creates a structural defect (e.g. a defect line or "perforation") that mechanically weakens the material and renders it more susceptible to cracking or fracturing upon application of mechanical or thermal stress. By controlling the placement of perforations, a contour or path along which cracking occurs can be precisely defined and precise micromachining of the material can be accomplished. The contour defined by a series of perforations may be regarded as a fault line and corresponds to a region of structural weakness in the material. In one embodiment, micromachining includes separation of a part from the material processed by the laser, where the part has a precisely defined shape or perimeter determined by a closed contour of perforations formed through MPA effects induced by the laser. As used herein, the term closed contour refers to a perforation path formed by the laser line, where the path intersects with itself at some location. An internal contour is a path formed where the resulting shape is entirely surrounded by an outer portion of material.

Perforations can be accomplished with a single "burst" of high energy short duration pulses spaced close together in time. The laser pulse duration may be $10^{-10}$ s or less, or $10^{-11}$ s or less, or $10^{-12}$ s or less, or $10^{-13}$ s or less. These "bursts" may be repeated at high repetition rates (e.g. kHz or MHz). The perforations may be spaced apart and precisely positioned by controlling the velocity of a substrate or stack relative to the laser through control of the motion of the laser and/or the substrate or stack.

As an example, in a thin transparent substrate moving at 200 mm/sec exposed to a 100 kHz series of pulses, the individual pulses would be spaced 2 microns apart to create a series of perforations separated by 2 microns. This defect (perforation) spacing is sufficient close to allow for mechanical or thermal separation along the contour defined by the series of perforations.

Thermal Separation:

In some cases, a fault line created along a contour defined by a series of perforations or defect lines is not enough to separate the part spontaneously, and a secondary step may be necessary. If so desired, a second laser can be used to create thermal stress to separate it, for example. In the case of sapphire, separation can be achieved, after the creation of a fault line, by application of mechanical force or by using a thermal source (e.g., an infrared laser, for example a $CO_2$ laser or a CO laser) to create thermal stress and force a part to separate from a substrate. The optional thermal separation can be achieved, for example, with a defocused $CO_2$ laser continuous wave (cw) laser emitting at 10.6 µm and with power adjusted by controlling its duty cycle. Focus change (i.e., extent of defocusing up to and including focused spot size) is used to vary the induced thermal stress by varying the spot size. Defocused laser beams include those laser beams that produce a spot size larger than a minimum, diffraction-limited spot size on the order of the size of the laser wavelength. For example, spot sizes of about 7 mm, 2 mm and 20 mm can be used for $CO_2$ lasers, for example, whose emission wavelength is much smaller at 10.6 µm. Distance between adjacent defect lines 120 along the direction of the fault lines 110 can be, for example, greater than 0.5 µm and less than or equal to about 15 or 20 µm in some embodiments. Another option is to have the $CO_2$ laser only start the separation and then finish the separation manually, i.e. by applying mechanical force to separate the part along the laser-perforated contour.

Etching:

Acid etching can be used, for example, to separate a workpiece having a glass layer, for example. To enlarge the holes to a size useful for metal filling and electrical connections, parts can be acid etched. In one embodiment, for example, the acid used can be 10% HF/15% $HNO_3$ by volume. The parts can be etched for 53 minutes at a temperature of 24-25° C. to remove about 100 µm of material, for example. The parts can be immersed in this acid bath, and ultrasonic agitation at a combination of 40 kHz and 80 kHz frequencies can used to facilitate penetration of fluid and fluid exchange in the holes. In addition, manual agitation of the part within the ultrasonic field can be made to prevent standing wave patterns from the ultrasonic field from creating "hot spots" or cavitation related damage on the part. The acid composition and etch rate can be intentionally designed to slowly etch the part—a material removal rate of only 1.9 um/minute, for example. An etch rate of less than about 2 µm/minute, for example, allows acid to fully penetrate the narrow holes and agitation to exchange fresh fluid and remove dissolved material from the holes which are initially very narrow.

In the embodiment shown in FIG. 1, precise control of the depth of cut in a multilayer stack is achieved by inclusion of a beam disruption interface (labeled "modified interface"). The beam disruption interface prevents the laser radiation from interacting with portions of the multilayer stack beyond the position of the disruption interface. Although embodiments are shown and described herein as utilizing a multilayer stack, it should be understood that embodiments are not limited thereto. The laser cutting process using the laser beam line focus attributes described herein may be applied to a single layer of material, such as a glass substrate.

In one embodiment, the beam disruption element is positioned immediately below the layer of the stack in which modification via two-photon absorption will occur. Such a configuration is shown in FIG. 1, where the beam disruption element is a modified interface positioned immediately below material A and material A is the material in which formation of perforations through the two-photon absorption mechanism described herein will occur. As used herein, reference to a position below or lower than another position assumes that the top or uppermost position is the surface of the multilayer stack upon which the laser beam is first incident. In FIG. 1, for example, the surface of material A that is closest to the laser source is the top surface and placement of the beam disruption element below material A means that the laser beam traverses material A before interacting with the beam disruption element.

The disruption element has different optical properties than the material to be cut. For example, the beam disruption element may be a defocusing element, a scattering element, a translucent element, or a reflective element. A defocusing element is an interface or a layer comprising a material that prevents the laser light from forming the laser beam focal line on or below the defocusing element. The defocusing element may be comprised of a material or interface with refractive index inhomogeneities that scatter or perturb the wavefront of the optical beam. A translucent element is an interface or layer of material that allows light to pass through, but only after scattering or attenuating the laser beam to lower the energy density sufficiently to prevent formation of a laser beam focal line in portions of the stack on the side of the translucent element that are remote from the laser beam. In one embodiment, the translucent element effects scattering or deviating of at least 10% of the light rays of the laser beam.

More specifically, the reflectivity, absorptivity, defocusing, attenuation, and/or scattering of the disruption element can be employed to create a barrier or impediment to the laser radiation. The laser beam disruption element can be created by several means. If the optical properties of the overall stack system are not of a concern, then one or more thin films can be deposited as a beam disruption layer(s) between the desired two layers of the stack, where the one or more thin films absorb, scatter, defocus, attenuate, reflects, and/or dissipates more of the laser radiation than the layer immediately above it to protect layers below the thin film(s) from receiving excessive energy density from the laser source. If the optical properties of the entire stack system do matter, the beam disruption element can be implemented as a notch filter. This can be done by several methods:

a) creating structures at the disruption layer or interface (e.g. via thin film growth, thin film patterning, or surface pattering) such that diffraction of incident laser radiation is at a particular wavelength or range of wavelengths occurs;
b) creating structures at the disruption layer or interface (e.g. via thin film growth, thin film patterning, or surface pattering) such that scattering of incident laser radiation occurs (e.g. a textured surface);
c) creating structures at the disruption layer or interface (e.g. via thin film growth, thin film patterning, or surface pattering) such that attenuated phase-shifting of laser radiation occurs; and
d) creating a distributed Bragg reflector via thin-film stack at the disruption layer or interface to reflect only laser radiation.

It is not necessary that the absorption, reflection scattering, attenuation, defocusing etc. of the laser beam by the disruption element be complete. The effect of the disruption element, when utilized, on the laser beam should be sufficient to reduce the energy density or intensity of the focused laser beam to a level below the threshold required for cutting, ablation, perforating etc. of the layers in the stack protected by (underlying) the disruption element. In one embodiment, the disruption element reduces the energy density or intensity of the focused laser beam to a level below the threshold needed to induce two-photon absorption. The disruption layer or disruption interface may be configured to absorb, reflect, or scatter the laser beam, where the absorption, reflection, or scattering are sufficient to reduce the energy density or intensity of the laser beam transmitted to the carrier (or other underlying layer) to a level below the level needed to induce nonlinear absorption in the carrier or underlying layer.

Turning to FIGS. 2A and 2B, a method of laser drilling a material includes focusing a pulsed laser beam 2 into a laser beam focal line 2b, viewed along the beam propagation direction. Laser beam focal line 2b is a region of high energy density. As shown in FIG. 3, laser 3 (not shown) emits laser beam 2, which has a portion 2a incident to optical assembly 6. The optical assembly 6 turns the incident laser beam into an extensive laser beam focal line 2b on the output side over a defined expansion range along the beam direction (length 1 of the focal line).

Embodiments of the present disclosure utilize non-diffracting beams ("NDB") to form the laser beam focal line 2b. Typically laser processing has used Gaussian laser beams. The tight focus of a laser beam with a Gaussian intensity profile has a Rayleigh range ZR given by:

$$Z_R = \frac{\pi n_o w_o^2}{\lambda_o}. \qquad \text{Eq. (1)}$$

The Rayleigh range represents the distance over which the spot size $w_0$ of the beam will increase by $\sqrt{2}$ in a material of refractive index $n_0$ at wavelength $n_0$. This limitation is imposed by diffraction. Note in Eq. (1) that the Rayleigh range is related directly to the spot size, thereby leading to the conclusion that a beam with a tight focus (i.e. small spot size) cannot have a long Rayleigh range. Such a beam will maintain this small spot size only for a very short distance. This also means that if such a beam is used to drill through a material by changing the depth of the focal region, the rapid expansion of the spot on either side of the focus will require a large region free of optical distortion that might limit the focus properties of the beam. Such a short Rayleigh range also requires multiple pulses to cut through a thick sample.

However, embodiments of the present disclosure utilize NDBs instead of the optical Gaussian beams discussed above. Non-diffracting beams may propagate for a considerable distance before diffraction effects inevitably limit the beam focus. Although an infinite NDB does not suffer from diffractive effects, a physically realizable NDB will have a limited physical extent. The central lobe of the beam can be quite small in radius and thus produce a high intensity beam. There are several types of NDBs including, but not limited to, Bessel beams, Airy beams, Weber beams and Mathieu beams whose field profiles are typically given by special functions which decay more slowly in the transverse direction than a Gaussian function.

Figure 6A:
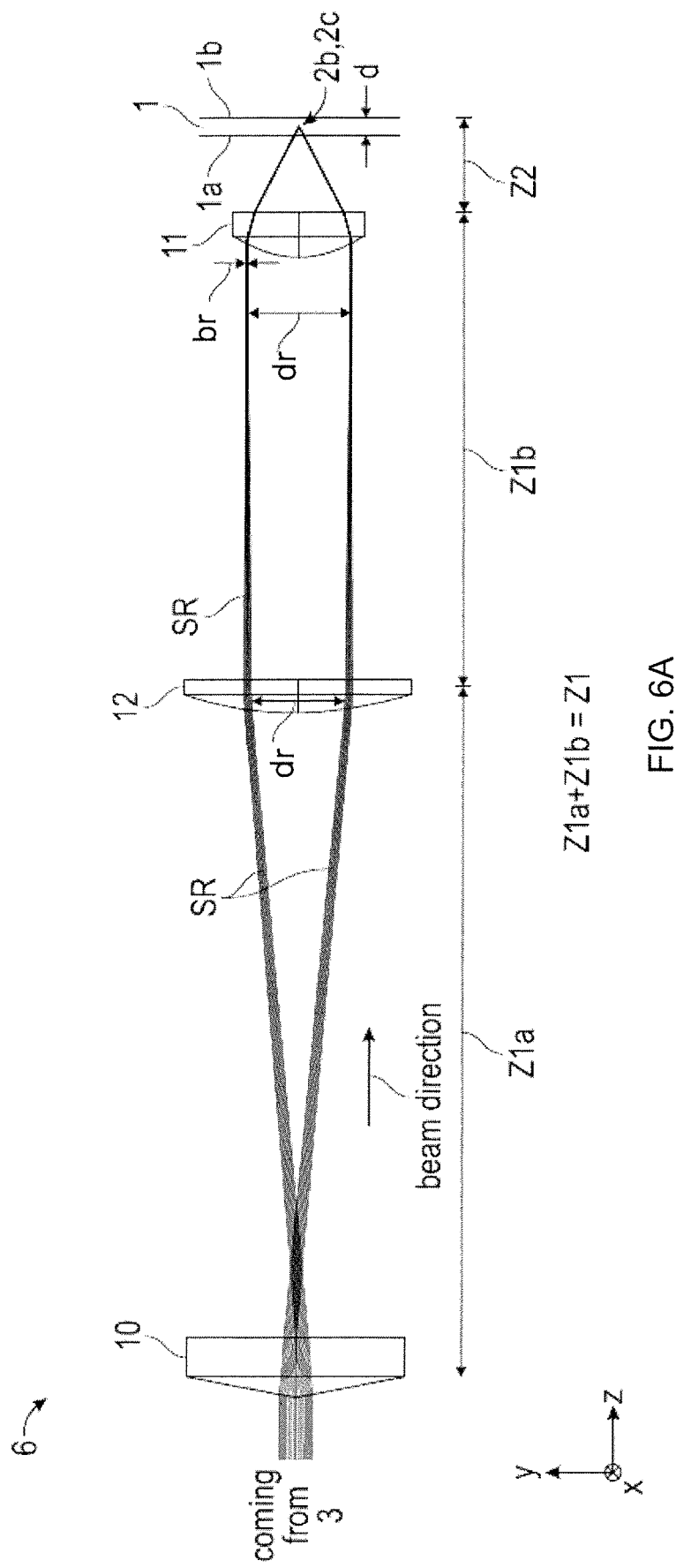
FIG. 6A is a schematic illustration of a fourth optical assembly for laser processing.
Figure 6B:
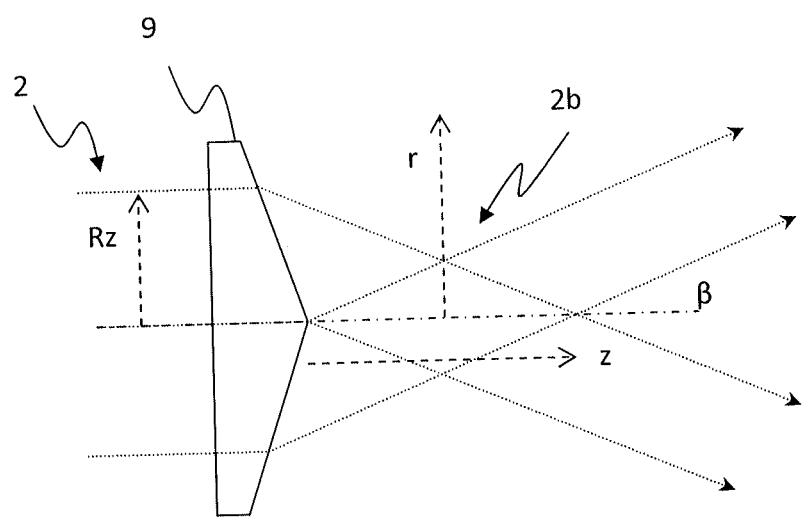
FIG. 6B is a schematic illustration of an axicon for laser processing.

It should be understood that, although NDBs described are described herein in the context of Bessel beams, embodiments are not limited thereto. The central spot size of a Bessel beam is given by:

$$d = 2\frac{2.405\lambda_o}{NA2\pi n_o}, \qquad \text{Eq. (2)}$$

where NA is the numerical aperture given by the cone of plane waves making an angle of $\beta$ with the optical axis (see FIG. 6B). A key difference between Bessel beams and Gaussian beams is that Rayleigh range is given by:

$$Z_{max} = \frac{\pi D d}{4\lambda}, \qquad \text{Eq. (3)}$$

where D is the finite extent of the beam imposed by some aperture or optical element. It is therefore shown that the aperture size D may be used to increase the Rayleigh range beyond the limit imposed by the size of the central spot. A practical method for generating Bessel beams is to pass a Gaussian beam through an axicon or an optical element with a radially linear phase element as shown in FIG. 6B.

In general, the optical method of forming the line focus (i.e., the laser beam focal line) can take multiple forms, such as, without limitation, using donut shaped laser beams and spherical lenses, axicon lenses, diffractive elements, or other methods to form the linear region of high intensity. The type of laser (picosecond, femtosecond, and the like) and wavelength (IR, visible, UV, and the like) may also be varied, as long as sufficient optical intensities are reached to create breakdown of the substrate material.

The laser power and lens focal length (which determines the line focus length and hence power density) are parameters that ensure full penetration of the substrate for cutting and drilling, while either purposefully generating cracks between the perforations (damage tracks) in the case of cutting, or possibly trying to suppress micro-cracking in the case of drilling. Accordingly, the dimensions of the line focus formed in the substrate should be precisely controlled.

Embodiments of the present disclosure are directed to systems and methods for adjusting both the diameter and the length of the line focus, enabling, with a single laser machine, the cutting of thin and thick materials, as well as the machining of materials that crack easily versus materials that have very high optical thresholds for material modification. This allows a single system to be rapidly adapted for cutting and drilling different substrates, thereby increasing manufacturing efficiency and improving capital utilization.

Referring once again to FIGS. 2A and 2B, layer 1 is the layer of a multilayer stack in which internal modifications by laser processing and two-photon absorption is to occur. Layer 1 is a component of a larger workpiece, which typically includes a substrate or carrier upon which a multilayer stack is formed. Layer 1 is the layer within the multilayer stack in which holes, cuts, or other features are to be formed through two-photon absorption assisted ablation or modification as described herein. The layer 1 is positioned in the beam path to at least partially overlap the laser beam focal line 2b of laser beam 2. Reference 1a designates the surface of the layer 1 facing (closest or proximate to) the optical assembly 6 or the laser, respectively, reference 1b designates the reverse surface of layer 1 (the surface remote, or further away from, optical assembly 6 or the laser). The thickness of the layer 1 (measured perpendicularly to the planes 1a and 1b, i.e., to the substrate plane) is labeled with d.

As FIG. 2A depicts, layer 1 is aligned perpendicular to the longitudinal beam axis and thus behind the same focal line 2b produced by the optical assembly 6 (the substrate is perpendicular to the plane of the drawing). Viewed along the beam direction, the layer 1 is positioned relative to the focal line 2b in such a way that the focal line 2b (viewed in the direction of the beam) starts before the surface 1a of the layer 1 and stops before the surface 1b of the layer 1, i.e. focal line 2b terminates within the layer 1 and does not extend beyond surface 1b. In the overlapping area of the laser beam focal line 2b with layer 1, i.e. in the portion of layer 1 overlapped by focal line 2b, the extensive laser beam focal line 2b generates nonlinear absorption in layer 1. (Assuming suitable laser intensity along the laser beam focal line 2b, which intensity is ensured by adequate focusing of laser beam 2 on a section of length 1 (i.e. a line focus of length 1), which defines an extensive section 2c (aligned along the longitudinal beam direction) along which an induced nonlinear absorption is generated in the layer 1.) The induced nonlinear absorption results in formation of a defect line or crack in layer 1 along section 2c. The defect or crack formation is not only local, but rather may extend over the entire length of the extensive section 2c of the induced absorption. The length of section 2c (which corresponds to the length of the overlapping of laser beam focal line 2b with layer 1) is labeled with reference L. The average diameter or extent of the section of the induced absorption 2c (or the sections in the material of layer 1 undergoing the defect line or crack formation) is labeled with reference D. This average extent D may correspond to the average diameter $\delta$ of the laser beam focal line 2b, that is, an average spot diameter in a range of between about 0.1 µm and about 5 µm.

As FIG. 2A shows, the layer 1 (which is transparent to the wavelength $\lambda$ of laser beam 2) is locally heated due to the induced absorption along the focal line 2b. The induced absorption arises from the nonlinear effects associated with the high intensity (energy density) of the laser beam within focal line 2*b*. FIG. 2B illustrates that the heated layer 1 will eventually expand so that a corresponding induced tension leads to micro-crack formation, with the tension being the highest at surface 1*a*.

Representative optical assemblies 6, which can be applied to generate the focal line 2*b*, as well as a representative optical setup, in which these optical assemblies can be applied, are described below. All assemblies or setups are based on the description above so that identical references are used for identical components or features or those which are equal in their function. Therefore only the differences are described below.

To insure high quality (regarding breaking strength, geometric precision, roughness and avoidance of re-machining requirements) of the surface of separation after cracking along the contour defined by the series of perforations, the individual focal lines used to form the perforations that define the contour of cracking should be generated using the optical assembly described below (hereinafter, the optical assembly is alternatively also referred to as laser optics). The roughness of the separated surface is determined primarily by the spot size or the spot diameter of the focal line. A roughness of a surface can be characterized, for example, by an Ra surface roughness statistic (roughness arithmetic average of absolute values of the heights of the sampled surface). In order to achieve a small spot size of, for example, 0.5 µm to 2 µm in case of a given wavelength λ of laser 3 (interaction with the material of layer 1), certain requirements must usually be imposed on the numerical aperture of laser assembly 6.

In order to achieve the required numerical aperture, the optics must, on the one hand, dispose of the required opening for a given focal length, according to the known Abbé formulae (N.A.=n sin (theta), n: refractive index of the material to be processed, theta: half the aperture angle; and theta=arctan (D/2f); D: aperture, f: focal length). On the other hand, the laser beam must illuminate the optics up to the required aperture, which is typically achieved by means of beam widening using widening telescopes between the laser and focusing optics.

The spot size should not vary too strongly for the purpose of a uniform interaction along the focal line. This can, for example, be ensured (see the embodiment below) by illuminating the focusing optics only in a small, circular area so that the beam opening and thus the percentage of the numerical aperture only varies slightly.

Figure 3A:
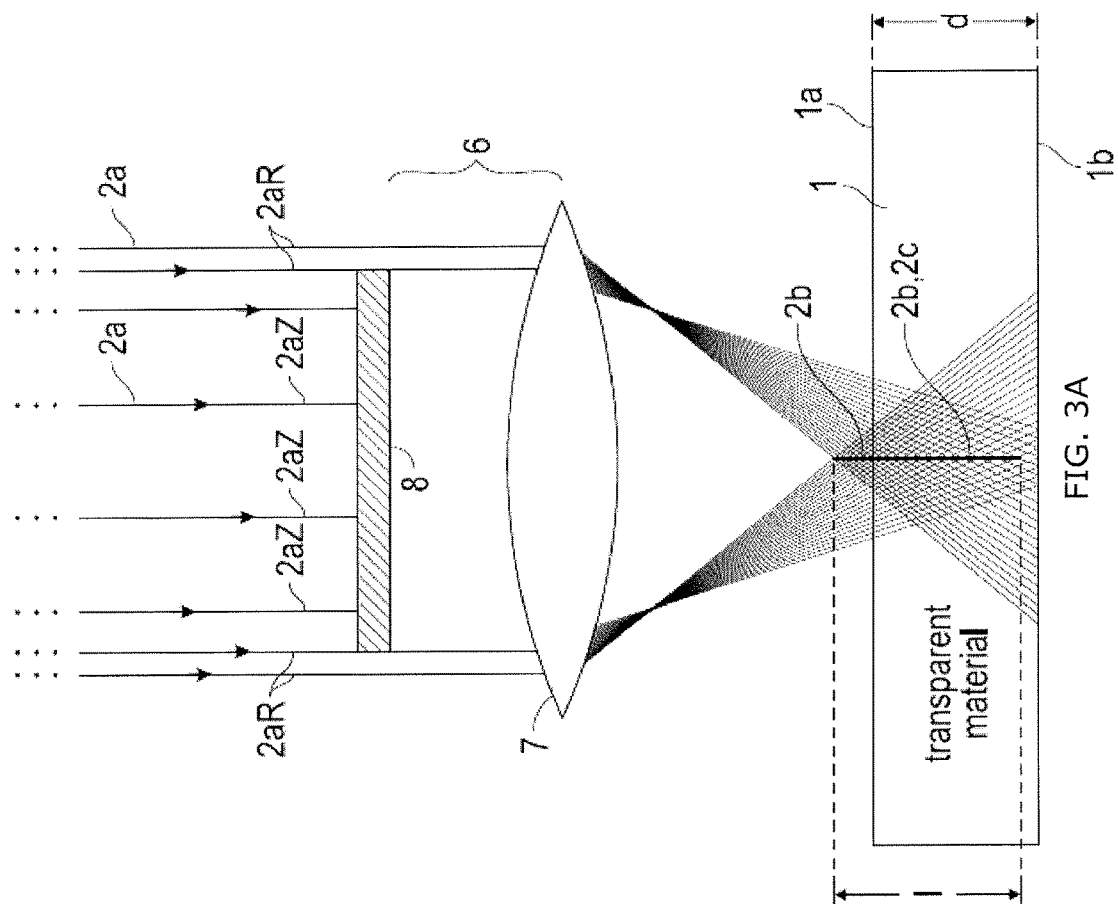
FIG. 3A is a schematic illustration of an optical assembly for laser processing.

FIG. 3A depicts one method of generating a line focus. According to FIG. 3A (section perpendicular to the substrate plane at the level of the central beam in the laser beam bundle of laser radiation 2; here, too, laser beam 2 is perpendicularly incident to the layer 1, i.e. incidence angle β is 0° so that the focal line 2*b* or the extensive section of the induced absorption 2*c* is parallel to the substrate normal), the laser radiation 2*a* emitted by laser 3 is first directed onto a circular aperture 8 which is completely opaque to the laser radiation used. Aperture 8 is oriented perpendicular to the longitudinal beam axis and is centered on the central beam of the depicted beam bundle 2*a*. The diameter of aperture 8 is selected in such a way that the beam bundles near the center of beam bundle 2*a* or the central beam (here labeled with 2*a*Z) hit the aperture and are completely blocked by it. Only the beams in the outer perimeter range of beam bundle 2*a* (marginal rays, here labeled with 2*a*R) are not blocked due to the reduced aperture size compared to the beam diameter, but pass aperture 8 laterally and hit the marginal areas of the focusing optic elements of the optical assembly 6, which, in this embodiment, is designed as a spherically cut, bi-convex lens 7.

Lens 7 is centered on the central beam and is designed as a non-corrected, bi-convex focusing lens in the form of a common, spherically cut lens. The spherical aberration of such a lens may be advantageous. As an alternative, aspheres or multi-lens systems deviating from ideally corrected systems, which do not form an ideal focal point but a distinct, elongated focal line of a defined length, can also be used (i.e., lenses or systems which do not have a single focal point). The zones of the lens thus focus along a focal line 2*b*, subject to the distance from the lens center. The diameter of aperture 8 across the beam direction is approximately 90% of the diameter of the beam bundle (defined by the distance required for the intensity of the beam to decrease to 1/e of the peak intensity) and approximately 75% of the diameter of the lens of the optical assembly 6. The focal line 2*b* of a non-aberration-corrected spherical lens 7 generated by blocking out the beam bundles in the center is thus used. FIG. 3A shows the section in one plane through the central beam, the complete three-dimensional bundle can be seen when the depicted beams are rotated around the focal line 2*b*.

One potential disadvantage of this type of focal line is that the conditions (spot size, laser intensity) may vary along the focal line (and thus along the desired depth in the material) and therefore the desired type of interaction (no melting, induced absorption, thermal-plastic deformation up to crack formation) may possibly occur only in selected portions of the focal line. This means in turn that possibly only a part of the incident laser light is absorbed by the material to be processed in the desired way. In this way, the efficiency of the process (required average laser power for the desired separation speed) may be impaired, and the laser light may also be transmitted into undesired regions (parts or layers adherent to the substrate or the substrate holding fixture) and interact with them in an undesirable way (e.g. heating, diffusion, absorption, unwanted modification).

Figures 1, 3B:
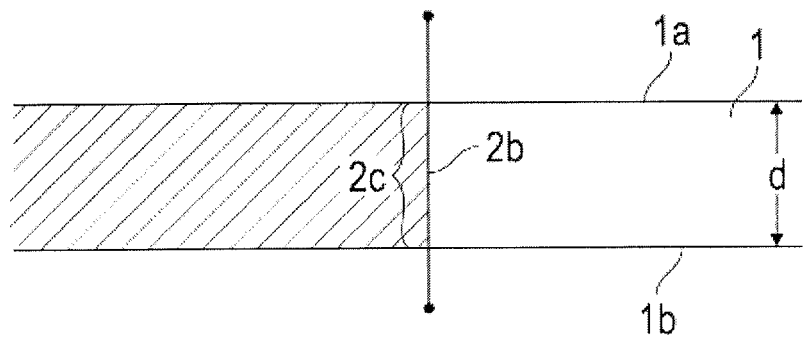
Figures 2, 3B:
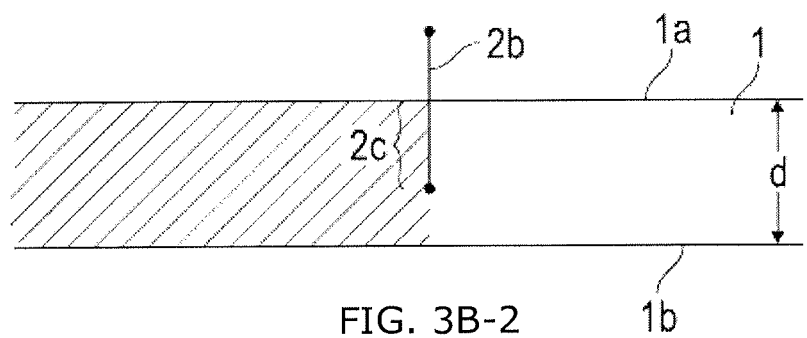
Figures 3, 3B:
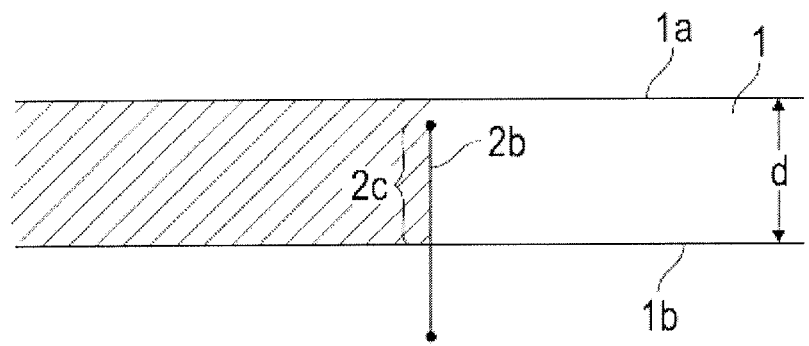
Figures 3, 3B, 4:
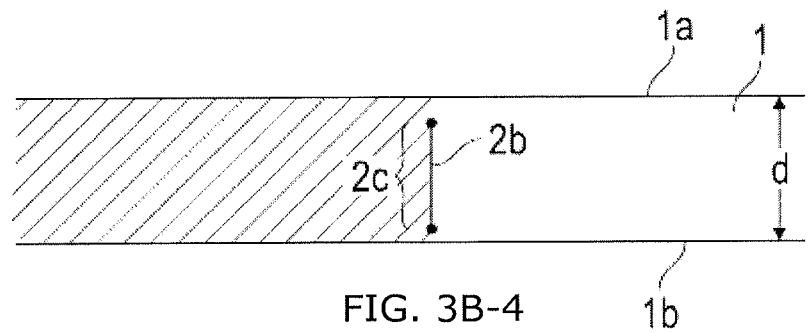
Figure 4:
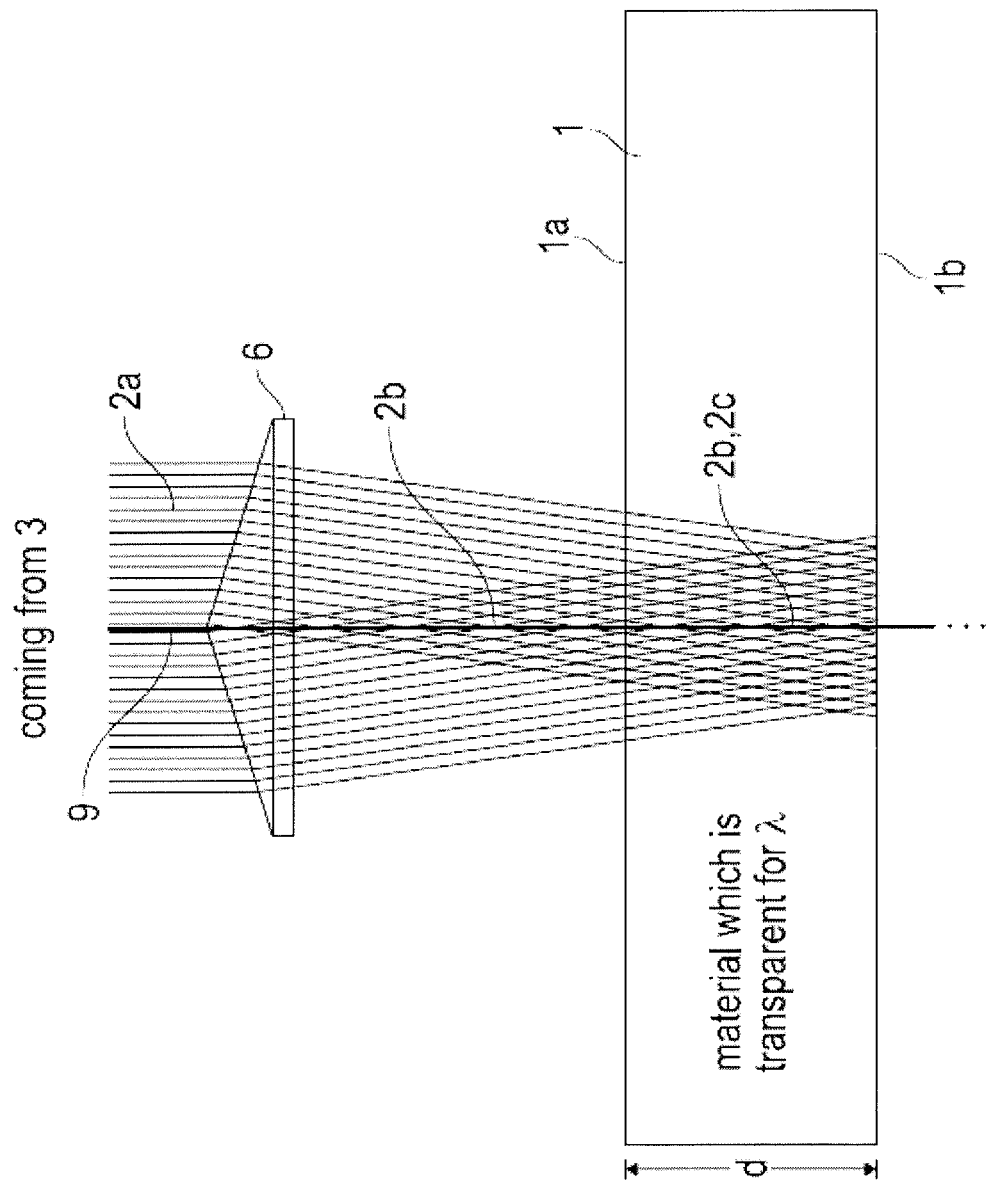

FIG. 3B-1-4 show (not only for the optical assembly in FIG. 3A, but also for any other applicable optical assembly 6) that the position of laser beam focal line 2*b* can be controlled by suitably positioning and/or aligning the optical assembly 6 relative to layer 1 as well as by suitably selecting the parameters of the optical assembly 6: As FIG. 3B-illustrates, the length l of the focal line 2*b* can be adjusted in such a way that it exceeds the layer thickness d (here by factor 2). If layer 1 is placed (viewed in longitudinal beam direction) centrally to focal line 2*b*, an extensive section of induced absorption 2*c* is generated over the entire substrate thickness.

In the case shown in FIG. 3B-2, a focal line 2*b* of length l is generated which corresponds more or less to the layer thickness d. Since layer 1 is positioned relative to line 2*b* in such a way that line 2*b* starts at a point outside the material to be processed, the length L of the section of extensive induced absorption 2*c* (which extends here from the substrate surface to a defined substrate depth, but not to the reverse surface 1*b*) is smaller than the length l of focal line 2*b*. FIG. 3B-3 shows the case in which the layer 1 (viewed along the beam direction) is positioned above the starting point of focal line 2*b* so that, as in FIG. 3B-2, the length l of line 2*b* is greater than the length L of the section of induced absorption 2*c* in layer 1. The focal line thus starts within the layer 1 and extends beyond the reverse surface 1*b*. FIG. 3B-4 shows the case in which the focal line length l is smaller than the layer thickness d so that—in the case of a central positioning of the substrate relative to the focal line viewed in the direction of incidence—the focal line starts near the surface 1a within the layer 1 and ends near the surface 1b within the layer 1 (e.g. 1=0.75·d). The laser beam focal line 2b can have a length 1 in a range of between about 0.1 mm and about 100 mm or in a range of between about 0.1 mm and about 10 mm, for example. Various embodiments can be configured to have length 1 of about 0.1 mm, 0.2 mm, 0.3 mm, 0.4 mm, 0.5 mm, 0.7 mm, 1 mm, 2 mm, 3 mm or 5 mm, for example.

It is particularly advantageous to position the focal line 2b in such a way that at least one of surfaces 1a, 1b is covered by the focal line, so that the section of induced nonlinear absorption 2c starts at least on one surface of the layer or material to be processed. In this way it is possible to achieve virtually ideal cuts while avoiding ablation, feathering and particulate generation at the surface.

FIG. 4 depicts another applicable optical assembly 6. The basic construction follows the one described in FIG. 3A so that only the differences are described below. The depicted optical assembly is based the use of optics with a non-spherical free surface in order to generate the focal line 2b, which is shaped in such a way that a focal line of defined length 1 is formed. For this purpose, aspheres can be used as optic elements of the optical assembly 6. In FIG. 4, for example, a so-called conical prism, also often referred to as axicon, is used. An axicon is a conically cut lens which forms a spot source on a line along the optical axis (or transforms a laser beam into a ring). The layout of such an axicon is principally known to those of skill in the art; the cone angle in the example is 10°. The apex of the axicon labeled here with reference 9 is directed towards the incidence direction and centered on the beam center. Since the focal line 2b produced by the axicon 9 starts within its interior, layer 1 (here aligned perpendicularly to the main beam axis) can be positioned in the beam path directly behind axicon 9. As FIG. 4 shows, it is also possible to shift layer 1 along the beam direction due to the optical characteristics of the axicon while remaining within the range of focal line 2b. The section of extensive induced absorption 2c in the material of layer 1 therefore extends over the entire depth d.

However, the depicted layout is subject to the following restrictions: Since the region of focal line 2b formed by axicon 9 begins within the axicon 9, a significant part of the laser energy is not focused into the section of induced absorption 2c of focal line 2b, which is located within the material, in the situation where there is a separation between axicon 9 and the material to be processed. Furthermore, length 1 of focal line 2b is related to the beam diameter through the refractive indices and cone angles of axicon 9. This is why, in the case of relatively thin materials (several millimeters), the total focal line is much longer than the thickness of the material to be processed, having the effect that much of the laser energy is not focused into the material.

Figure 5A:
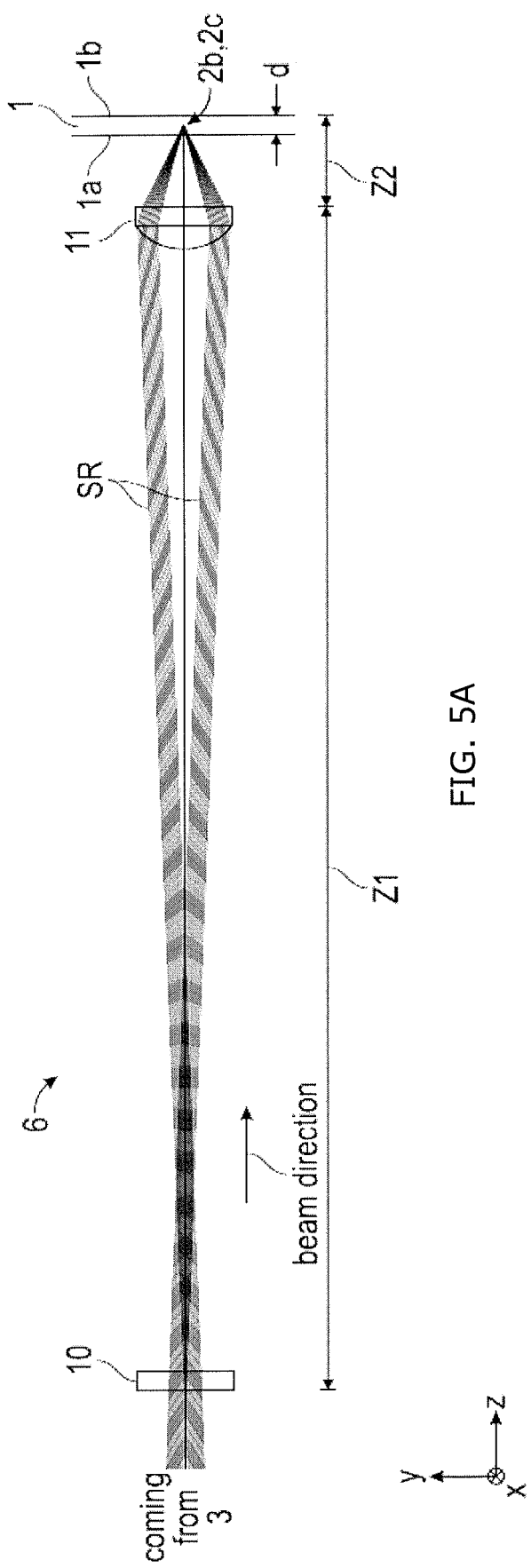

For this reason, it may be desirable to use an optical assembly 6 that includes both an axicon and a focusing lens. FIG. 5A depicts such an optical assembly 6 in which a first optical element (viewed along the beam direction) with a non-spherical free surface designed to form an extensive laser beam focal line 2b is positioned in the beam path of laser 3. In the case shown in FIG. 5A, this first optical element is an axicon 10 with a cone angle of 5°, which is positioned perpendicularly to the beam direction and centered on laser beam. The apex of the axicon is oriented towards the beam direction. A second, focusing optical element, here the plano-convex lens 11 (the curvature of which is oriented towards the axicon), is positioned in the beam direction at a distance z1 from the axicon 10. The distance z1, in this case approximately 300 mm, is selected in such a way that the laser radiation formed by axicon 10 is circularly incident on the outer radial portion of lens 11. Lens 11 focuses the circular radiation on the output side at a distance z2, in this case approximately 20 mm from lens 11, on a focal line 2b of a defined length, in this case 1.5 mm. The effective focal length of lens 11 is 25 mm in this embodiment. The circular transformation of the laser beam by axicon 10 is labeled with the reference SR.

FIG. 5B depicts the formation of the focal line 2b or the induced absorption 2c in the material of layer 1 according to FIG. 5A in detail. The optical characteristics of both elements 10, 11 as well as the positioning of them is selected in such a way that the length 1 of the focal line 2b in beam direction is exactly identical with the thickness d of layer 1. Consequently, an exact positioning of layer 1 along the beam direction should be provided to position the focal line 2b exactly between the two surfaces 1a and 1b of layer 1, as shown in FIG. 5B.

It is therefore advantageous if the focal line is formed at a certain distance from the laser optics, and if the greater part of the laser radiation is focused up to a desired end of the focal line. As described, this can be achieved by illuminating a primarily focusing element 11 (lens) only circularly (annularly) over a particular outer radial region, which, on the one hand, serves to realize the required numerical aperture and thus the required spot size, and, on the other hand, however, the circle of diffusion diminishes in intensity after the required focal line 2b over a very short distance in the center of the spot, as a basically circular spot is formed. In this way, the crack formation is stopped within a short distance in the required substrate depth. A combination of axicon 10 and focusing lens 11 meets this requirement. The axicon acts in two different ways: due to the axicon 10, a usually round laser spot is sent to the focusing lens 11 in the form of a ring, and the asphericity of axicon 10 has the effect that a focal line is formed beyond the focal plane of the lens instead of a focal point in the focal plane. The length 1 of focal line 2b can be adjusted via the beam diameter on the axicon. The numerical aperture along the focal line, on the other hand, can be adjusted via the distance z1 axicon-lens and via the cone angle of the axicon. In this way, the entire laser energy can be concentrated in the focal line.

If the crack formation is intended to continue to the back side of the layer or material to be processed, the circular (annular) illumination still has the advantage that (1) the laser power is used optimally in the sense that most of the laser light remains concentrated in the required length of the focal line, and (2) it is possible to achieve a uniform spot size along the focal line—and thus a uniform separation process along the perforations produced by the focal lines—due to the circularly illuminated zone in conjunction with the desired aberration set by means of the other optical functions.

Instead of the plano-convex lens depicted in FIG. 5A, it is also possible to use a focusing meniscus lens or another higher corrected focusing lens (asphere, multi-lens system).

In order to generate very short focal lines 2b using the combination of an axicon and a lens depicted in FIG. 5A, a very small beam diameter of the laser beam incident on the axicon may be needed. This has the practical disadvantage that the centering of the beam onto the apex of the axicon must be very precise and that the result is very sensitive to directional variations of the laser (beam drift stability). Furthermore, a tightly collimated laser beam is very divergent, i.e. due to the light deflection the beam bundle becomes blurred over short distances.

As shown in FIG. 6A, both effects can be avoided by including another lens, a collimating lens 12 in the optical assembly 6. The additional collimating lens 12 serves to adjust the circular illumination of focusing lens 11 very tightly. The focal length f' of collimating lens 12 is selected in such a way that the desired circle diameter dr results from distance z1a from the axicon to the collimating lens 12, which is equal to f'. The desired width br of the ring can be adjusted via the distance z1b (collimating lens 12 to focusing lens 11). As a matter of pure geometry, the small width of the circular illumination leads to a short focal line. A minimum can be achieved at distance f'.

The optical assembly 6 depicted in FIG. 6A is thus based on the one depicted in FIG. 5A so that only the differences are described below. The collimating lens 12, here also designed as a plano-convex lens (with its curvature towards the beam direction) is additionally placed centrally in the beam path between axicon 10 (with its apex towards the beam direction), on the one side, and the plano-convex lens 11, on the other side. The distance of collimating lens 12 from axicon 10 is referred to as z1a, the distance of focusing lens 11 from collimating lens 12 as z1b, and the distance of the focal line 2b from the focusing lens 11 as z2 (always viewed in beam direction). As shown in FIG. 6A, the circular radiation SR formed by axicon 10, which is incident divergently and under the circle diameter dr on the collimating lens 12, is adjusted to the required circle width br along the distance z1b for an at least approximately constant circle diameter dr at the focusing lens 11. In the case shown, a very short focal line 2b is intended to be generated so that the circle width br of approx. 4 mm at collimating lens 12 is reduced to approx. 0.5 mm at lens 11 due to the focusing properties of collimating lens 12 (circle diameter dr is 22 mm in the example).

In the depicted example it is possible to achieve a length of the focal line 1 of less than 0.5 mm using a typical laser beam diameter of 2 mm, a focusing lens 11 with a focal length f=25 mm, a collimating lens with a focal length f'=150 mm, and choosing distances Z1a=Z1b=140 mm and Z2=15 mm.

With reference to FIG. 6B, properties of a NDB formed by an axicon 10 will now be described. FIG. 6B schematically depicts a Gaussian laser beam 2 impinging a flat entrance surface of a transmissive axicon 10. The emergent surface of the axicon 10 deflects the laser beam 2 as shown. The typical energy profile in a plane located at a distance z from the tip of the axicon is given by:

$$I(r,z) = Io(Rz)Rz2\pi k(\sin(\beta)/\cos 2(\beta))Jo^2(kr\sin(\beta)) \quad \text{Eq. (4.1)},$$

$$Rz = z^*\tan(\beta) \quad \text{Eq. (4.2)}.$$

Here, β is the ray angle created by the axicon 10, which is a function of the angle of the axicon cone provided by the angled emergent surface and the refractive index of the axicon 10. Io(Rz) is the irradiance profile of the laser beam 2 illuminating the axicon 10, which is assumed to be a Gaussian profile, and k is the wavevector k=2π/λ, and Jo denotes a first-order Bessel function.

To make the strongest damage tracks, or holes, in the hardest of materials, the diameter of the lone focus should be as small as possible. Based on the formulas above, the full width half maximum ("FWHM") of the irradiance profile in any plane at some distance z from the apex of the axicon 10 is given by:

$$FWHM = 2.52\lambda/(2\pi\sin(\beta)) \quad \text{Eq. (4.3)}.$$

As can be seen from Eq. (4.3), the diameter of the line focus is related to a single geometric system parameter, the aperture angle β as shown in FIG. 6B.

From Eq. 4.1, at the center of the line focus, the peak power is given by:

$$I\_peak(z) = Io(Rz)Rz2\pi k(\sin(\beta)/\cos 2(\beta)) \quad \text{Eq. (4.4)}.$$

As can be seen in Eq. (4.4), the peak power is a function of the pupil irradiance profile Io(Rz), as well as a function of the aperture angle β.

If we examine where the on-axis intensity decays to approximately one half of its maximum intensity, then the length (or extent along the optical axis) of the line focus can be approximated by:

$$L \sim 0.8 * Rz/\sin(\beta) \quad \text{Eq. (4.5)}$$

Thus the length of the focused line is a function of both the input beam size (Rz) and the aperture angle β.

In a laser cutting machine, the material to be cut may vary in thickness. As an example, such a laser machine may be used to cut glass with thicknesses varying from 0.1 to 2.0 mm. Accordingly, to ensure that it is possible to drill and cut thick material (i.e., glass), the useful portion of the line focus should be set at, for example, at least 2.0 mm by, for instance, spreading the pupil irradiance profile into a larger area. However, by doing so, the peak power density within the line focus will decrease because the maximum value of Io(Rz) decreases. To keep the peak power density greater than the material modification energy density threshold, the aperture angle β should be increased, which means that the FWHM of the line focus will decrease.

Therefore, in a system with a fixed choice of optics, the parameters should be adjustable for the most difficult cases. When cutting thinner substrates (e.g. 100 μm thick display glass), much of the laser energy may be wasted if a long line focus is set to allow cutting of thick materials (e.g. stacks of ion exchanged glass). Similarly, if the optics are set to produce a very short and small diameter line focus (high energy density) to cut very thin and hard materials (e.g. sapphire), the optical system may no longer work well for thicker materials (e.g., thick soda lime glass or ion-exchangeable glass substrates).

For at least these reasons, it may be desirable for making the irradiance profile Io(Rz) and/or the aperture angle β adjustable. It is desirable to have both parameters adjustable to apply the following strategy: for each glass thickness and material:

adjust the input irradiance profile to achieve the desired line focus length; and adjust the aperture angle to set the FWHM (or diameter) of the laser beam at the line focus, keeping the energy density optimal for modification of the given material.

It may be desirable to set the FWHM (or diameter) of the line focus 2b to be as narrow as possible, which allows the lowest laser power to be used to create the damage tracks within the material and hence provide the most process margin. However, in some cases, it may be desirable to have a larger diameter line focus, which reduces the amount of micro-cracking around the damage tracks. For example, larger diameter spots are helpful in drilling of holes that are subsequently acid-etched, where micro-cracks are not desired as they may create etch asymmetries. The upper limitation on the diameter of the line focus is that, given a maximum laser pulse energy available for a laser source, sufficient energy density must still be reached to allow modification of the material and creation of a damage track.

For the length of the line focus 2b, it is desirable to make it at least equal to but preferentially greater than the thickness of the material, accounting for the fact that per Snell's law of refraction, the refractive index of the material (e.g. for glass n~1.5) increases the effective length of the line focus 2b within the material itself. Longer focal lines give larger focus tolerance, and also allow various substrate thicknesses to be accommodated. The upper limitation upon the focal line length is again that, given a maximum laser pulse energy available for a laser source, sufficient energy density must still be reached to allow modification of the material and creation of a damage track throughout the thickness of the substrate.

Figure 6C:
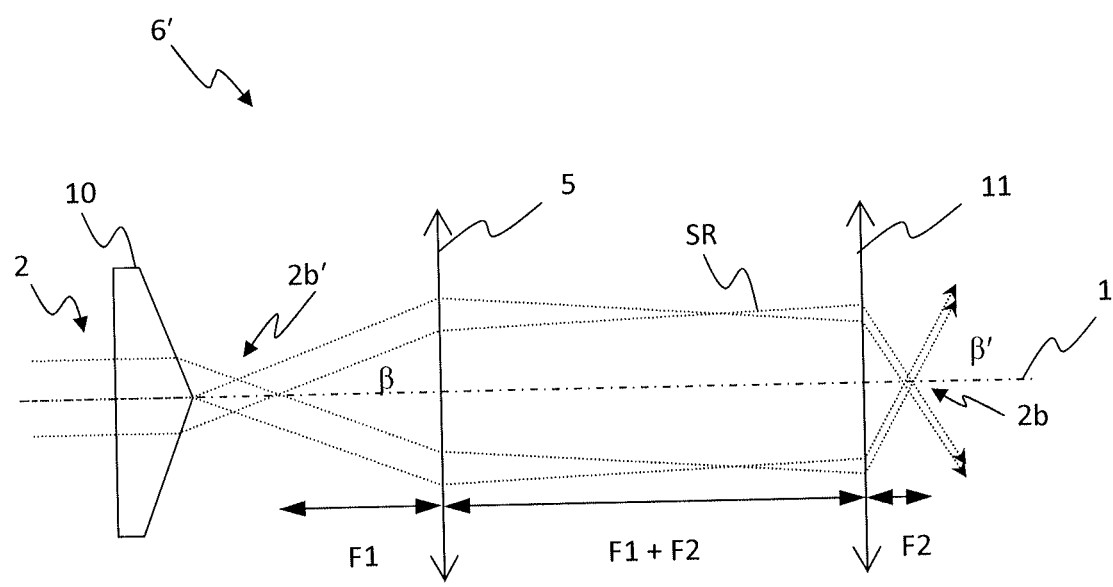
FIG. 6C is a schematic illustration of a fifth optical assembly for laser processing.

FIGS. 6C and 6E-6G depict non-limiting optical systems that allow for the adjustment of the length and the FWHM (i.e., the diameter) of the laser beam focal line 2b (i.e., line focus). FIG. 6C depicts a system for cutting a material (not shown) using a laser beam focal line 2b. The system comprises a laser source 3 (not shown) and an optical assembly 6' configured to transform a Gaussian profile laser beam 2 into a Bessel profile laser beam having a focal line 2b. The optical assembly 6' is disposed within an optical path 1 of the laser beam 2, and comprises a transparent (i.e. acting as a refractive element) axicon 10, a first lens element 5 having a first focal length F1, and a second lens element 11 (i.e., a focusing lens element) having a second focal length F2.

The transparent axicon 10 forms a line focus 2b' that is imaged by the first lens element 5 and the second lens element 11, which act as a telescope that relays and magnifies the line focus 2b' formed by the axicon 10 into the line focus 2b that is applied to the material. The magnification of the telescope defined by the first lens element 5 and the second lens element 11 is given by M=F2/F1, which may be varied by changing one or both of the two lens elements to achieve a different magnification M. The length of the line focus 2b gets scaled with the square of the magnification, while the diameter of the line focus in a given z-plane is scaled linearly with magnification.

Changing the focal length of the first and/or second lens 5, 11 may not be optimal in some applications as both line focus length and width scale together. Assuming that M is the magnification provided by the first and second focal lengths:

$$FWHM_1 = FWHM_0 * M \qquad \text{Eq. (5.1)};$$

$$Length_1 = Length_0 * M^2 \qquad \text{Eq. (5.2)}.$$

Here $FWHM_0$ denotes the full-width at half maximum diameter of the line focus formed immediately after the axicon 10, and $FWHM_1$ denotes the full-width at half maximum diameter of the line focus formed after the second lens element 11. Similarly LENGTH0 denotes the length, or spatial extent along the optical axis, of the line focus formed immediately after the axicon 10, and $LENGTH_1$ denotes the length of the line focus formed after the second lens element 11. If it is assumed that the resulting line focus 2b takes the form of a cylinder of length and diameter dimensions $Length_1 \times FWHM_1$, then the power (or energy) density inside the cylinder will scale as 1/volume of that object, where volume=(pi/4)*diameter$^2$*length. This means the power density will scale as:

$$PowerDensity_1 = PowerDensity_0 / M^4 \qquad \text{Eq. (5.3)}.$$

Thus, the diameter of the line focus increases linearly with the magnification of the telescope provided by the first and second lenses 5, 11, the length of the line focus 2b increases as the square of the magnification, and the power or energy density scales at one over the $4^{th}$ power of the magnification. This means that as shorter focal length lenses are used for F2, the diameter of the focus drops, the length gets much shorter, and the power density increases rapidly.

In some embodiments, an axicon 10 with an adjustable angle is provided as a third degree of freedom to achieve a system that is capable of adjusting both the length and diameter of the line focus 2b. Suppose that the angle of the original axicon 10 discussed above is multiplied by a factor A. Then, assuming small angles (i.e., (sin(α)≈α), the following is true:

$$FWHM_2 = FWHM_1 / A \qquad \text{Eq. (6.1); and}$$

$$Length_2 = Length_1 / A \qquad \text{Eq. (6.2)}.$$

Here, if an amplification A creates a larger axicon angle, then the FWHM (i.e., the diameter) of the line focus 2b gets smaller and the length of the line focus 2b gets smaller as well. Generally, to achieve the desired FWHM and length of the line focus 2b for a given system, it is possible to calculate A and M such that:

$$M/A = FWHM_2 / FWHM_0 \qquad \text{Eq. 6.3; and}$$

$$M^2/A = Length_2 / Length_0 \qquad \text{Eq. (6.4)}.$$

Figure 6D:
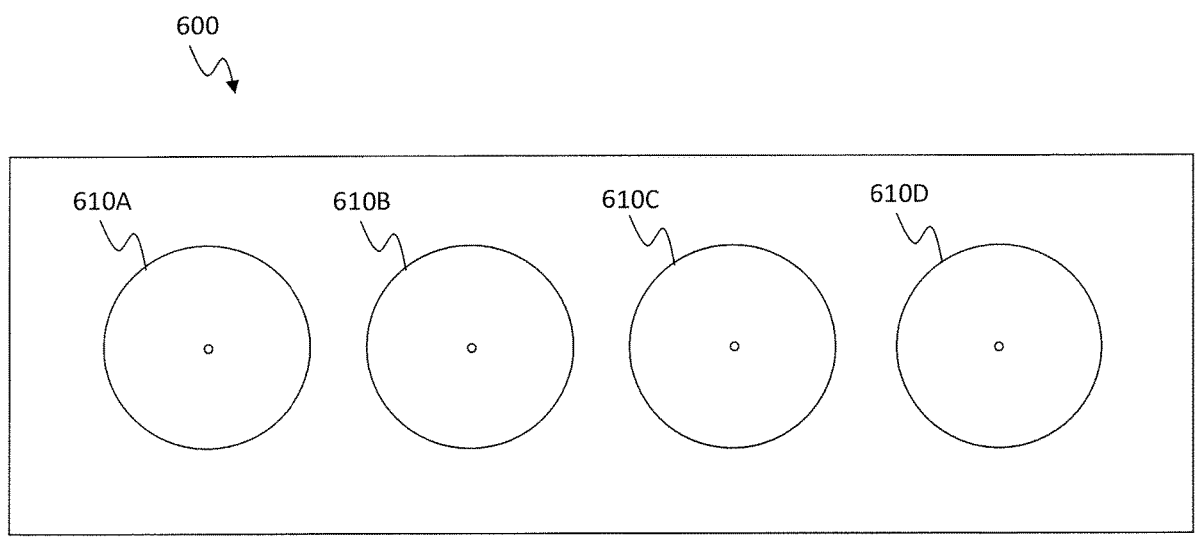
FIG. 6D is a schematic illustration of a sixth optical assembly for laser processing.

Accordingly, the optical elements of the first lens element 5, the second lens element 11, and the axicon 10 may be exchanged to achieve the desired diameter and length for the line focus 2b. In some embodiments, these optical elements are physically removed from the optical assembly 6' and replaced by others having the desired optical properties. However, this may require realignment of the optical assembly 6' when switching to another configuration. In some embodiments, a plurality of optical elements is provided on a rotary wheel (similar to a filter wheel) or a slider to selectively choose the desired optical element that is in the beam path. For example, if the axicon is chosen as the removable/adjustable element, multiple axicons may be fabricated on a single substrate. Referring now to FIG. 6D, an axicon assembly 600 comprising a plurality of individual axicons 10A-10D having different angles in a single substrate is schematically illustrated. Any number of axicons may be provided. A desired individual axicon 10A-10D may be translated into an optical path of the laser beam 2 either manually or by motorized control.

As an example and not a limitation, diamond turning may be used to form the plurality of individual axicons 10A-10D in a transmissive material. Diamond turning allows very high precision (~1 μm) features to be fabricated, in particular of the optical surfaces with respect to the outside features of a physical part that are referenced mechanically for alignment. The substrate may have a rectangular shape, and thus can be translated laterally to select a different axicon. For the wavelengths used in these laser cutting systems (commonly 1064 nm), ZnSe is an appropriate transmissive optical material which is compatible with diamond turning. Also, since diamond turning has an extremely high degree of precision to place objects relative to one other, the substrate could include mechanical repositioning features such as grooves or conical holes. It should be understood that similar lens element assemblies may be fabricated and utilized to select the various first and lens elements having different focal lengths (i.e., a first lens assembly and/or a second lens assembly).

Figure 6E:
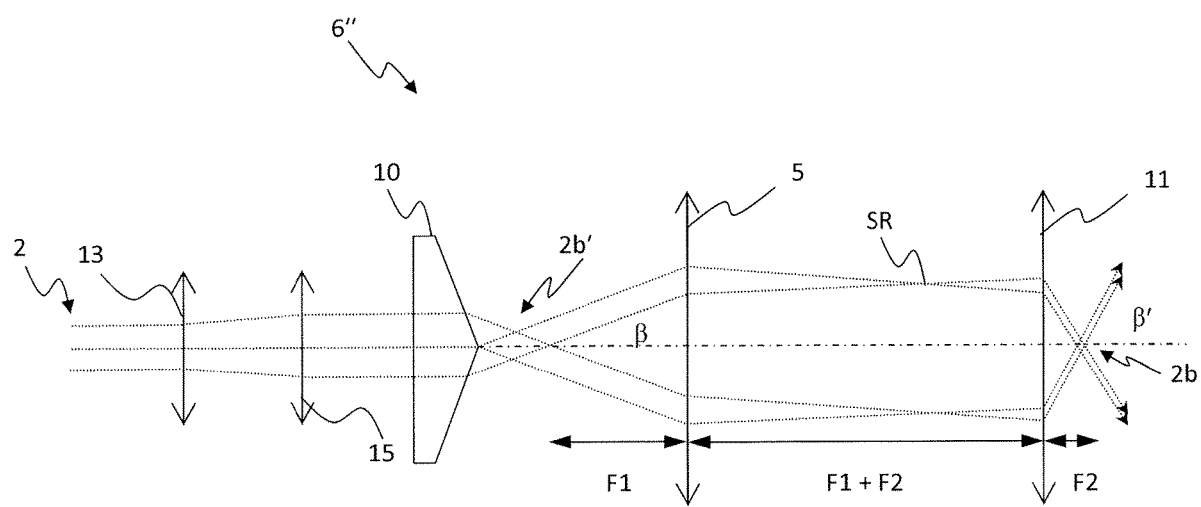
FIG. 6E is a schematic illustration of a seventh optical assembly for laser processing.

In some embodiments, the input laser beam 2 is magnified by a factor N in the optical path prior to the axicon 10, as shown in the optical assembly 6" illustrated in FIG. 6E. The optical assembly 6" illustrated in FIG. 6E comprises an axicon 10, a first lens element 5, and a second lens element 11, similar to the embodiment depicted in FIG. 6C. In the example optical assembly 6" illustrated in FIG. 6E, a telescope assembly comprising a third lens element 13 having a third focal length and a fourth lens element 15 having a fourth focal length is provided. As indicated above with respect to FIG. 6C, the focal lengths of the third lens element 13 and the fourth lens element 15 are adjustable, such as by exchanging lens elements.

By magnifying the laser beam 2, per Eqs. (4.3) and (4.5), the only parameter that is affected is the length of the line focus 2b—the diameter remains unchanged. The telescope positioned prior to the axicon 10, therefore, allows changes of only the length of the line focus 2b while leaving the diameter unchanged.

Interchanging optical elements, such as the first through fourth lenses, may not be desirable for a laser cutting system that operates in an industrial environment. In some embodiments, the third and fourth lens elements 13, 15 providing the magnification factor N and/or the first and second lens elements 5, 11 may instead be configured as one or more variable zoom assemblies. Such variable zoom assemblies may allow for continuous adjustment of the laser beam focal line length, as opposed to discrete steps available by interchanging axicons or lens elements. Such variable zoom assemblies may be actuated either manually or by motorization, where the latter allows programmatic adjustment of the system, which may be compatible with manufacturing requirements.

Figure 6F:
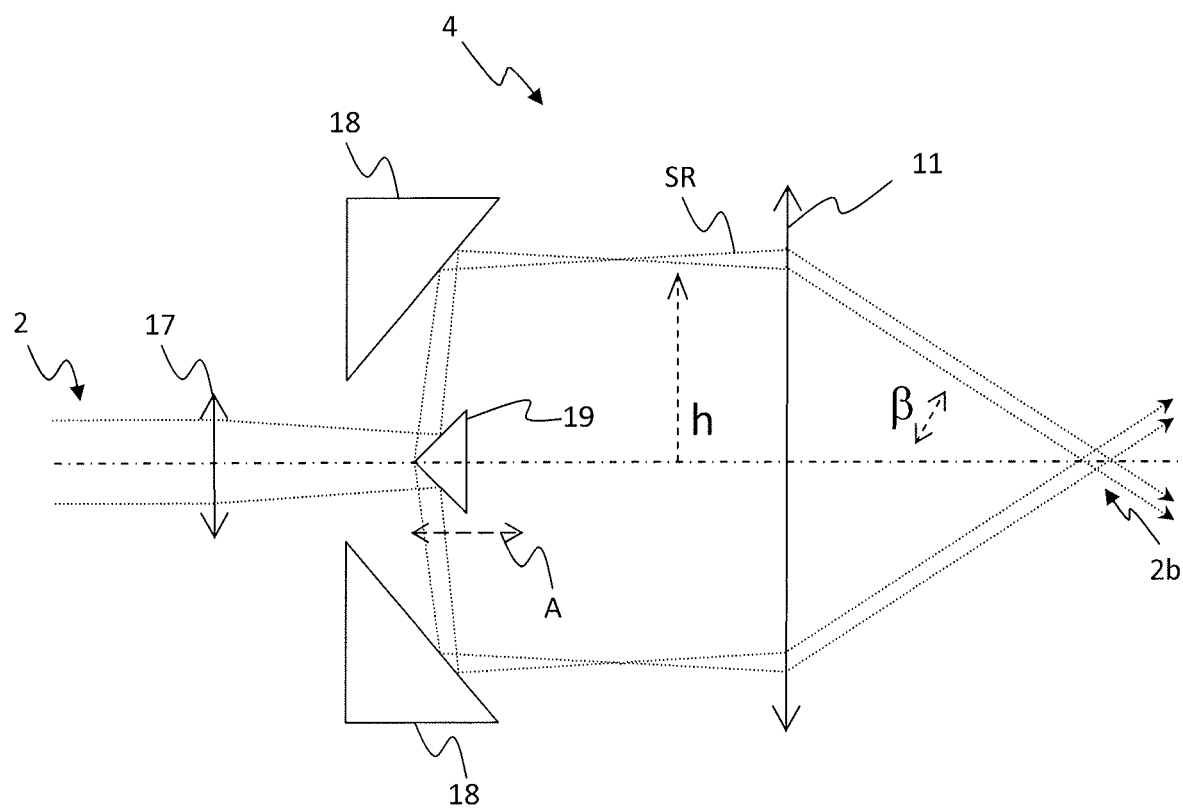
FIG. 6F is a schematic illustration of a eighth optical assembly for laser processing.

Another optical assembly 4 for separating a material using a laser beam line focus 2b is schematically depicted in FIG. 6F. Generally, the example optical assembly 4 utilizes a reflective axicon 19 and a ring-shaped reflection assembly 18 with an angled reflective surface having the same angle as the reflective axicon 19. A first lens element 17 converges (or, diverges) the laser beam 2 prior to the reflective axicon 19. The reflective axicon 19 and the ring-shaped reflection assembly 18 create a ring of collimated light. A second lens element 11 focuses the circular radiation SR to generate the laser beam line focus 2b. The radius of the circular radiation h may be continuously varied by translating the reflective axicon 19 with respect to the ring-shaped reflection assembly 18 (or vice versa) as indicated by arrow A. Because the focal length of the second lens element 11 focuses the rays at approximately a distance F2 from the second lens element 11, this change in ring radius will in turn change the final aperture angle β, yielding a change in the length of the laser beam line focus 2b, per Eq. (4.5). Larger rain radii h, created by moving the reflective axicon 19 to the right, will yield smaller focal line lengths. However, the diameter of the laser beam focal line 2b will also change, per Eq. (4.3). Larger ring radii h will yield smaller focal line diameters.

Figure 6G:
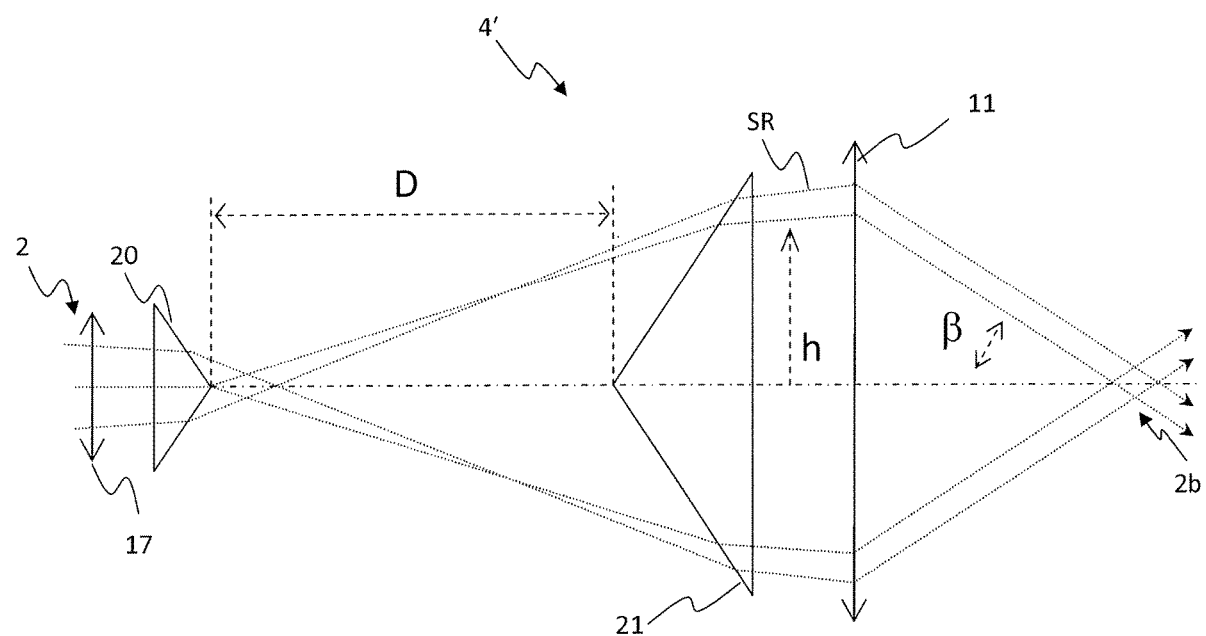
FIG. 6G is a schematic illustration of a ninth optical assembly for laser processing.

FIG. 6G schematically illustrates another optical assembly 4' for creating a continuously adjustable collimated ring of light SR. The example optical assembly 4' comprises a first lens element 17 prior to a first transmissive axicon 20, a second transmissive axicon 21, and a second lens element 11 prior to the second transmissive axicon 21. The first lens element 17 creates a small convergence (or divergence in some embodiments) of the laser beam 2 which creates a spherical aberration in the system to make a line focus.

The laser beam 2 exits the first transmissive axicon 20 at its angled emergence surface. The second transmissive axicon 21 receives the laser beam at its angled entrance surface and creates a ring of collimated light SR. The angle of deflection of the first transmissive axicon 20 is substantially equal to the angle of deflection of the second transmissive axicon 21. A second lens element 11 then focuses the light to generate the laser beam line focus 2b. Adjusting the ring radii h may be achieved by varying the adjustable distance D between the first and second transmissive axicons 20, 21. This movement adjusts the length and diameter of the laser beam line focus 2b.

Figure 7:
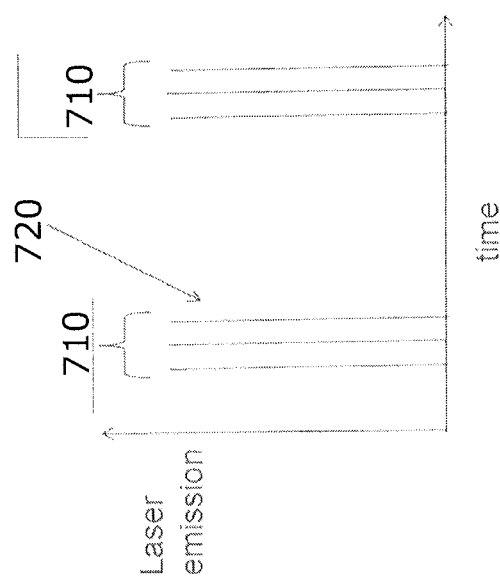
FIG. 7 is a graph of laser emission as a function of time for a picosecond laser. Each emission is characterized by a pulse "burst" which may contain one or more sub-pulses. The frequency of the bursts is the repetition rate of the laser, typically about 100 kHz (10 μsec). The time between sub-pulses is much shorter, e.g., about 20 nanoseconds (nsec)

Note that, as shown in FIG. 7, the typical operation of such a picosecond laser creates a "burst" 710 of pulses 720. Each "burst" 710 may contain multiple pulses 720 (such as two pulses, three pulses as shown in FIG. 7, four pulses, five pulses, 10 pulses, 15 pulses, 20 pulses, 25 pulses or more) of very short duration (~10 psec). Each pulse 720 (also referred to as a sub-pulse herein) is separated in time by a duration in a range of between about 1 nsec and about 50 nsec, for example, 10 to 30 nsec, such as approximately 20 nsec (50 MHz), with the time often governed by the laser cavity design. The time between each "burst" 710 will be much longer, often about 10 μsec, for a laser repetition rate of about 100 kHz. In some embodiments the burst repetition frequency is in a range of between about 1 kHz and about 200 kHz. The exact timings, pulse durations, and repetition rates can vary depending on the laser design, but short pulses (i.e., less than about 15 psec) of high intensity have been shown to work well with this technique. (Bursting or producing pulse bursts is a type of laser operation where the emission of pulses is not in a uniform and steady stream but rather in tight clusters of pulses.)

The average laser power per burst measured at the material can be greater than 40 microJoules per mm thickness of material, for example between 40 microJoules/mm and 2500 microJoules/mm, or between 500 and 2250 microJoules/mm. For example, for 0.1 mm-0.2 mm thick Corning Eagle XG® glass one may use 200 μJ pulse bursts, which gives an exemplary range of 1000-2000 μJ/mm. For example, for 0.5-0.7 mm thick Corning Eagle XG® glass, one may use 400-700 μJ pulse bursts to perforate glass, which corresponds to an exemplary example, for the purpose of perforating some alkaline earth boro-aluminosilicate glass compositions a picosecond pulsed laser (e.g., a 1064 nm, or 532 nm picosecond pulsed laser) which produces bursts of multiple pulses in combination with line-focus beam forming optics may be used to create lines of damage (defect lines) in the glass composition. In one embodiment, a glass composition with up to 0.7 mm thickness was positioned so that it was within the region of the focal line produced by the optics. With a focal line about 1 mm in length, and a 1064 nm picosecond laser that produces output power of about 24 W or more at a burst repetition rate of 200 kHz (about 120 microJoules/burst) measured at the glass, the optical intensities in the focal line region are high enough to create non-linear absorption in the glass. The pulsed laser beam can have an average laser burst energy measured, at the material, greater than 40 microJoules per mm thickness of material. The average laser burst energy used can be as high as 2500 μJ per mm thickness of transparent material, for example 40-2500 μJ/mm, with 500-2250 μJ/mm being preferable, and 550 to 2100 μJ/mm being even more preferable because the energy density is strong enough to make a thorough damage track through the glass, while minimizing the extent of micro cracking orthogonal to the perforated line or cut edge. In some exemplary embodiments the laser burst energy is 40-1000 μJ/mm. This "average pulse burst laser energy" per mm can also be referred to as an average, per-burst, linear energy density, or an average energy per laser pulse burst per mm thickness of material. A region of damaged, vaporized, or otherwise modified material within the glass composition was created that approximately followed the linear region of high optical intensity created by the laser beam focal line.

Figure 8:
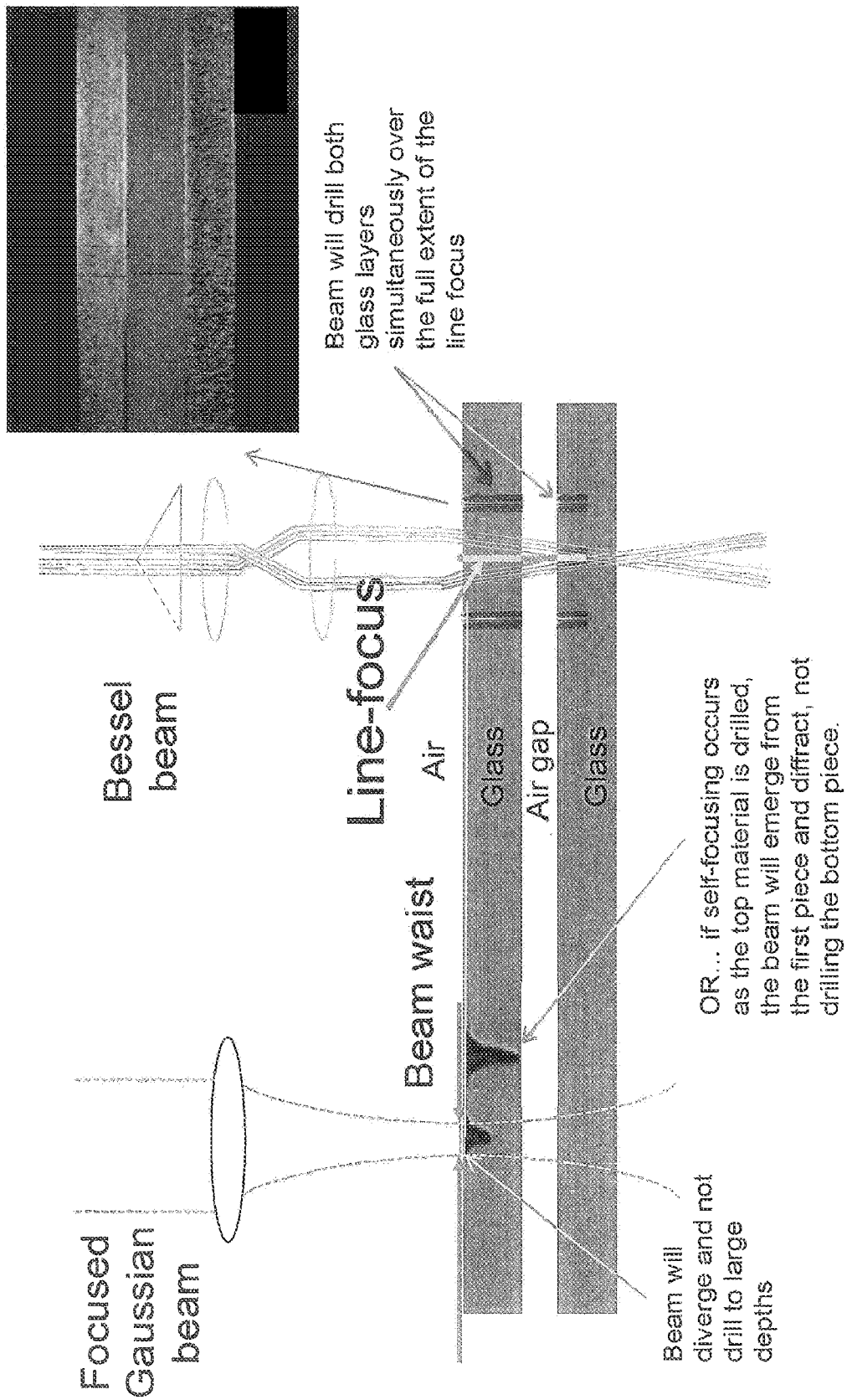
FIG. 8 is a comparison between a focused Gaussian beam and a Bessel beam incident upon a glass-air-glass composite structure.

FIG. 8 shows the contrast between a focused Gaussian beam and a Bessel beam incident upon a glass-air-glass composite structure. A focused Gaussian beam will diverge upon entering the first glass layer and will not drill to large depths, or if self-focusing occurs as the glass is drilled, the beam will emerge from the first glass layer and diffract, and will not drill into the second glass layer. In contrast, a Bessel beam will drill (and more specifically damage, perforate, or cut) both glass layers over the full extent of the line focus. An example of a glass-air-glass composite structure cut with a Bessel beam is shown in the inset photograph in FIG. 8, which shows a side view of the exposed cut edges. The top and bottom glass pieces are 0.4 mm thick 2320, CT101. The exemplary air gap between two layers of glass is about 400 µm. The cut was made with a single pass of the laser at 200 mm/sec, so that the two pieces of glass were cut simultaneously, even though they were separated by >400 µm.

In some of the embodiments described herein, the air gap is between 50 µm and 5 mm, for example is between 50 µm and 2 mm, or between 200 µm and 2 mm.

Figure 9:
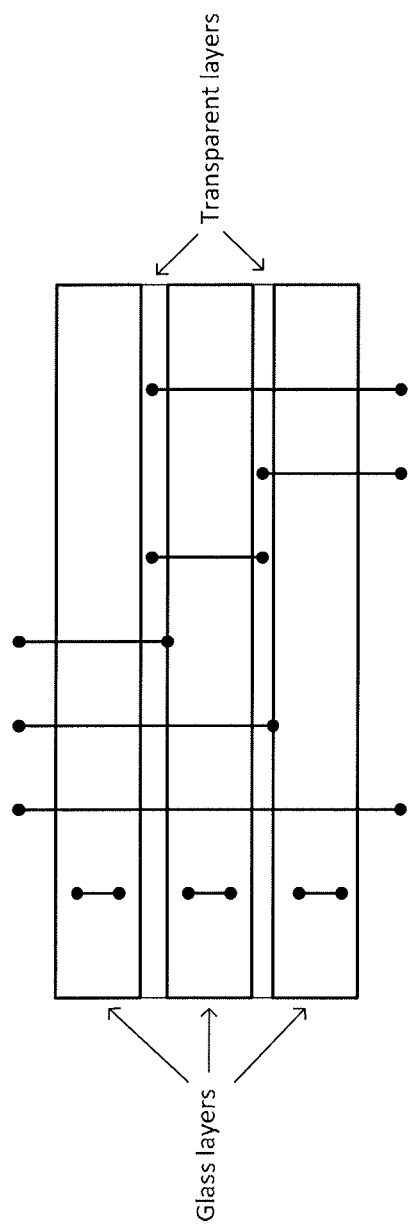
FIG. 9 is a schematic illustration of stacking with transparent protective layers to cut multiple sheets while reducing abrasion or contamination.

Exemplary disruption layers include polyethylene plastic sheeting (e.g., Visqueen). Transparent layers, as shown in FIG. 9, include transparent vinyl (e.g., Penstick). Note that unlike with other focused laser methods, to get the effect of a blocking or stop layer, the exact focus does not need to be precisely controlled, nor does the material of the disruption layer need to be particularly durable or expensive. In many applications, one just needs a layer that interferes with the laser light slightly to disrupt the laser light and prevent line focus from occurring. The fact that Visqueen prevents cutting with the picosecond laser and line focus is a perfect example—other focused picosecond laser beams will most certainly drill right through the Visqueen, and one wishing to avoid drilling right through such a material with other laser methods one would have to very precisely set the laser focus to not be near the Visqueen.

Figure 10:
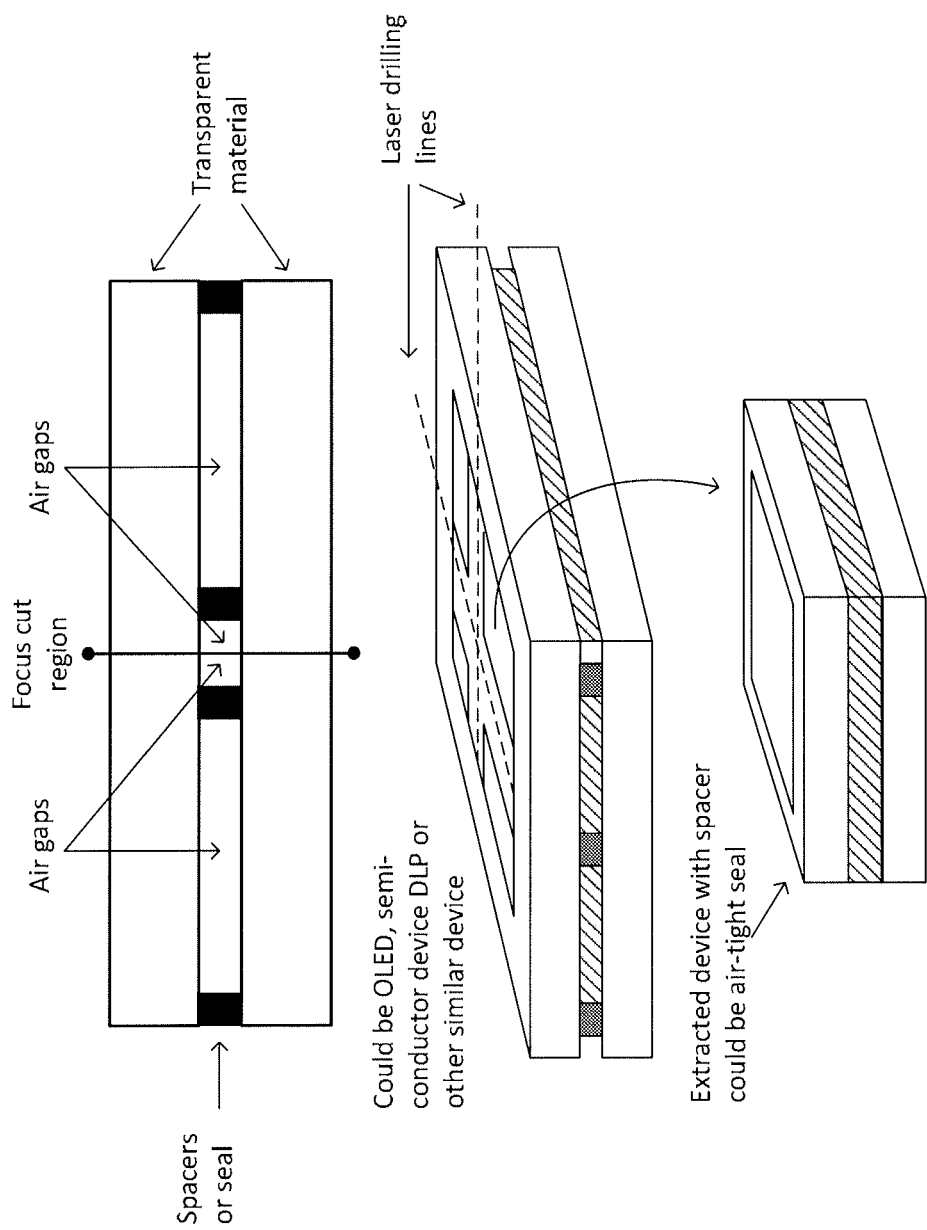
FIG. 10 is a schematic illustration of an air gap and cutting of encapsulated devices.

FIG. 10 shows stacking with transparent protective layers to cut multiple sheets while reducing abrasion or contamination. Simultaneously cutting a stack of display glass sheets is very advantageous. A transparent polymer such as vinyl can be placed between the glass sheets. The transparent polymer layers serve as protective layers serve to reduce damage to the glass surfaces which are in close contact with one another. These layers would allow the cutting process to work, but would protect the glass sheets from scratching one another, and would furthermore prevent any cutting debris (albeit it is small with this process) from contaminating the glass surfaces. The protective layers can also be comprised of evaporated dielectric layers deposited on the substrates or glass sheets.

Figure 11:
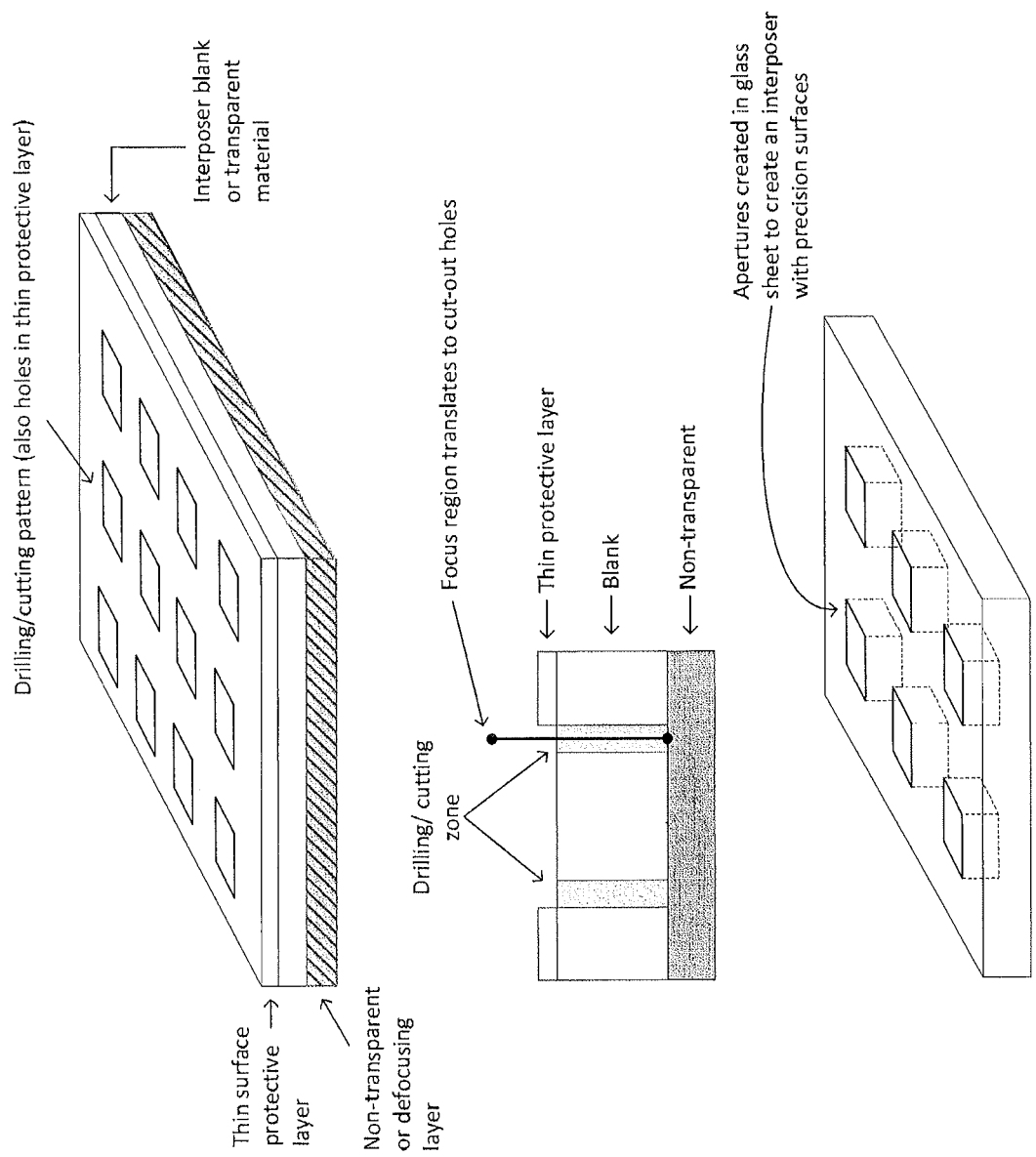
FIG. 11 is a schematic illustration of cutting of interposers or windows with laser perforation then etch or laser perforation and $CO_2$ laser release.

FIG. 11 shows air gap and cutting of encapsulated devices. This line focus process can simultaneously cut through stacked glass sheets, even if a significant macroscopic air gap is present. This is not possible with other laser methods, as illustrated in FIG. 8. Many devices require glass encapsulation, such as OLEDs (organic light emitting diode). Being able to cut through the two glass layers simultaneously is very advantageous for a reliable and efficient device segmentation process. Segmented means one component can be separated from a larger sheet of material that may contain a plurality of other components. Other components that can be segmented, cut out, or produced by the methods described herein are, for example, OLED (organic light emitting diode) components, DLP (digital light processor) components, an LCD (liquid crystal display) cells, semiconductor device substrates.

Figure 12:
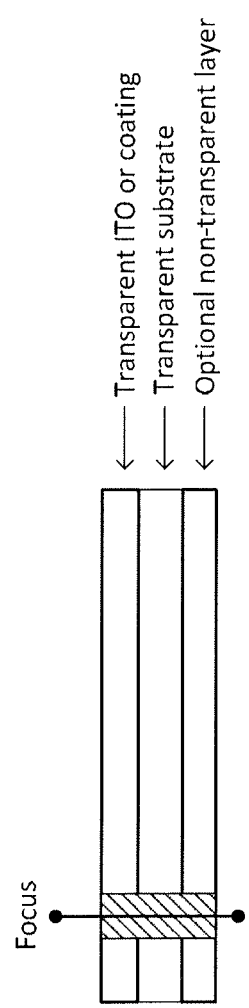
FIG. 12 is a schematic illustration of cutting an article such as electrochromic glass coated with transparent conductive layers (e.g. indium tin oxide (ITO))

FIG. 12 shows cutting an article such as electrochromic glass coated with transparent conductive layers (e.g. ITO). Cutting glass that already has transparent conducting layers such as indium tin oxide (ITO) is of high value for electrochromic glass applications and also touch panel devices. This laser process can cut through such layers with minimal damage to the transparent conductive layer and very little debris generation. The extremely small size of the perforated holes (<5 um) means that very little of the ITO will be affected by the cutting process, whereas other cutting methods are going to generate far more surface damage and debris.

Figure 13:
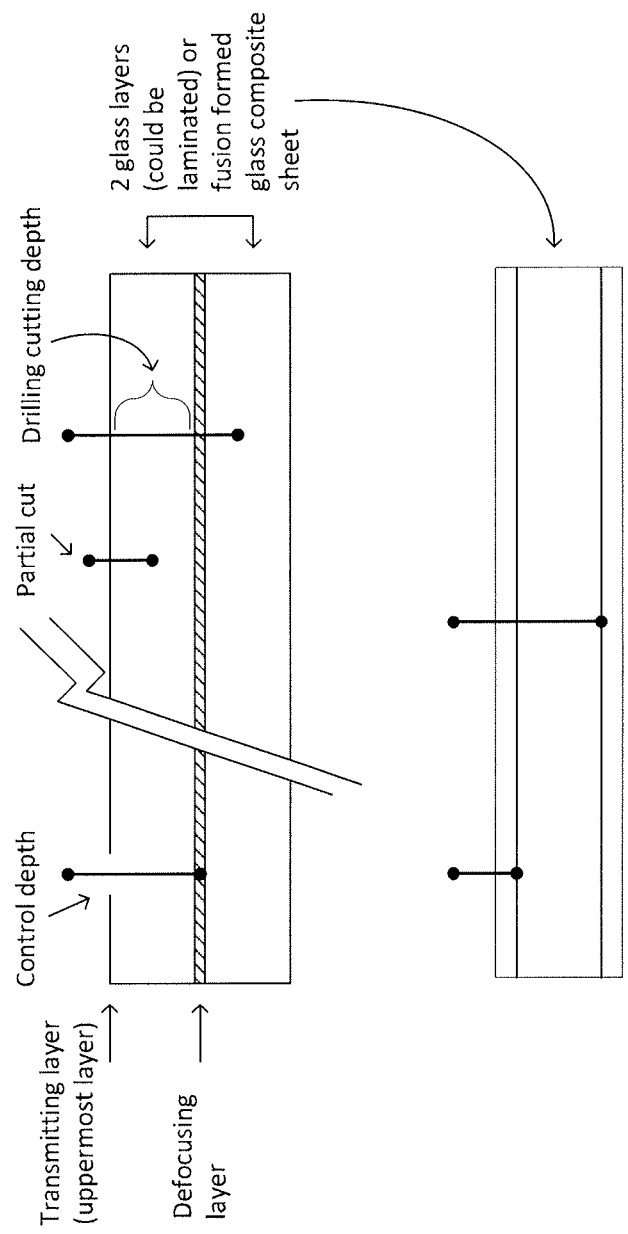
FIG. 13 is a schematic illustration of precision cutting of some layers in a stack while not damaging others.

FIG. 13 shows precision cutting of some layers in a stack while not damaging others, as also shown in FIG. 1, extending the concept to multiple layers (i.e., more than two layers). In the embodiment of FIG. 13, the disruption element is a defocusing layer.

Other Examples

In general, the higher the available laser power, the faster the material can be cut with the above process. Processes disclosed herein can cut glass at a cutting speed of 0.25 m/sec, or faster. A cut speed (or cutting speed) is the rate the laser beam moves relative to the surface of the transparent material (e.g., glass) while creating multiple holes or modified regions.) High cut speeds, such as, for example 400 mm/sec, 500 mm/sec, 750 mm/sec, 1 m/sec, 1.2 m/sec, 1.5 m/sec, or 2 m/sec, or even 3.4 m/sec, 5 m/sec, 5 m/sec, 7 m/sec, or 10 m/sec are often desired in order to minimize capital investment for manufacturing, and to optimize equipment utilization rate. The laser power is equal to the burst energy multiplied by the burst repetition frequency (rate) of the laser. In general, to cut such glass materials at high cutting speeds, the damage tracks are typically spaced apart by 1-25 microns, in some embodiments the spacing is preferably 3 microns or larger—for example 3-12 microns, or for example 5-10 microns, or 10-20 microns.

For example, to achieve a linear cutting speed of 300 mm/sec, 3 micron hole pitch corresponds to a pulse burst laser with at least 100 kHz burst repetition rate. For a 600 mm/sec cutting speed, a 3 micron pitch corresponds to a burst-pulsed laser with at least 200 kHz burst repetition rate. A pulse burst laser that produces at least 40 µJ/burst at 200 kHz, and cuts at a 600 mm/s cutting speed needs to have laser power of at least 8 Watts. Higher cut speeds therefore require even higher laser powers.

For example a 0.4 m/sec cut speed at 3 µm pitch and 40 µJ/burst would require at least a 5 Watt laser, a 0.5 m/sec cut speed at 3 µm pitch and 40 µJ/burst would require at least a 6 Watt laser. Thus, preferably the laser power of the pulse burst ps laser is 6 watts or higher, more preferably at least 8 Watts or higher, and even more preferably at least 10 W or higher. For example in order to achieve a 0.4 m/sec cut speed at 4 µm pitch (defect lines pacing, or between damage tracks spacing) and 100 µJ/burst one would require at least a 10 Watt laser, and to achieve a 0.5 m/sec cut speed at 4 µm pitch and 100 µJ/burst one would require at least a 12 Watt laser. For example, to achieve a cut speed of 1 m/sec at 3 µm pitch and 40 µJ/burst one would require at least a 13 Watt laser. Also for example 1 m/sec cut speed at 4 µm pitch and 400 µJ/burst would require at least a 100 Watt laser. The optimal pitch between damage tracks and the exact burst energy is material dependent, and can be determined empirically.

However, it should be noted that raising the laser pulse energy or making the damage tracks at a closer pitch are not conditions that always make the substrate material separate better or with improved edge quality. Too dense a pitch (for example <0.1 micron, in some exemplary embodiments <1 μm, or in some embodiments <2 μm) between damage tracks can sometimes inhibit the formation of nearby subsequent damage tracks, and often can inhibit the separation of the material around the perforated contour, and may also result in increased unwanted micro cracking within the glass. Too long a pitch (>50 μm, and in some glasses >25 μm) may result in "uncontrolled microcracking"—i.e., where instead of propagating from hole to hole the microcracks propagate along a different path, and cause the glass to crack in a different (undesirable) direction. This may ultimately lower the strength of the separated glass part, since the residual microcracks will acts as flaws which weaken the glass. Too high a burst energy (e.g., >2500 μJ/burst, and in some embodiments >500 μJ/burst) used to form each damage track can cause "healing" or re-melting of already formed microcracks of adjacent damage tracks, which will inhibit separation of the glass. Accordingly, it is preferred that burst energy be <2500 μJ/burst, for example, ≤500 μJ/burst. Also, using a burst energy that is too high can cause formation of microcracks that are extremely large and create flaws which reduce the edge strength of the parts after separation. Too low a burst energy (<40 μJ/burst) may result in no appreciable damage track formed within the glass, and hence very high separation strength or complete inability to separate along the perforated contour.

Typical exemplary cutting rates (speeds) enabled by this process are, for example, 0.25 m/sec and higher. In some embodiments the cutting rates are at least 300 mm/sec. In some embodiments described herein the cutting rates are at least 400 mm/sec, for example 500 mm/sec to 2000 mm/sec, or higher. In some embodiments the picosecond (ps) laser utilizes pulse bursts to produce defect lines with periodicity between 0.5 microns and 13 microns, e.g. 0.5 and 3 microns. In some embodiments the pulsed laser has laser power of 10 W-100 W and the material and/or the laser beam are translated relative to one another at a rate of at least 0.25 m/sec, for example at the rate of 0.25 to 0.35 m/sec, or 0.4 m/sec to 5 m/sec. Preferably, each pulse burst of the pulsed laser beam has an average laser energy measured at the workpiece greater than 40 microJoules per burst mm thickness of workpiece. Preferably, each pulse burst of the pulsed laser beam has an average laser energy measured at the workpiece greater of less than 2500 microJoules per burst per mm thickness of workpiece, and preferably lass than about 2000 microJoules per burst per mm, and in some embodiments less than 1500 microJoules per burst per mm thickness of workpiece, for example not more than 500 microJoules per burst per mm thickness of workpiece.

It has been discovered that much higher (5 to 10 times higher) volumetric pulse energy density ($\mu j/\mu m^3$) is required for perforating alkaline earth boro-aluminosilicate glasses with low or no alkali containing glasses as compared to that for glasses such as Corning Gorilla®. This can be achieved, for example, by utilizing pulse burst lasers, preferably with at least 2 pulses per burst and providing volumetric energy densities within the alkaline earth boro-aluminosilicate glasses (with low or no alkali) of about 0.05 $\mu J/\mu m^3$ or higher, e.g., at least 0.1 $\mu J/\mu m^3$, for example 0.1-0.5 $\mu J/\mu m^3$.

Accordingly, it is preferable that the laser produces pulse bursts with at least 2 pulses per burst. For example, in some embodiments the pulsed laser has laser power of 10 W-150 W (e.g., 10-100 W) and produces pulse bursts with at least 2 pulses per burst (e.g., 2-25 pulses per burst). In some embodiments the pulsed laser has the power of 25 W-60 W, and produces pulse bursts with at least 2-25 pulses per burst, and periodicity or distance between the adjacent defect lines produced by the laser bursts is 2-10 microns. In some embodiments the pulsed laser has laser power of 10 W-100 W, produces pulse bursts with at least 2 pulses per burst, and the workpiece and the laser beam are translated relative to one another at a rate of at least 0.25 m/sec. In some embodiments the workpiece and/or the laser beam are translated relative to one another at a rate of at least 0.4 m/sec.

For example, for cutting 0.7 mm thick non-ion exchanged Corning code 2319 or code 2320 Gorilla glass, it is observed that pitches of 3-7 microns can work well, with pulse burst energies of about 150-250 μJ/burst, and burst pulse numbers that range from 2-15, and preferably with pitches of 3-5 microns and burst pulse numbers (number of pulses per burst) of 2-5.

At 1 m/sec cut speeds, the cutting of Eagle XG® glass typically requires utilization of laser powers of 15-84 Watts, with 30-45 Watts often being sufficient. In general, across a variety of glass and other transparent materials, applicants discovered that laser powers between 10 and 100 W are preferred to achieve cutting speeds from 0.2-1 m/sec, with laser powers of 25-60 Watts being sufficient (and optimum) for many glasses. For cutting speeds of 0.4 m to 5 m/sec, laser powers should preferably be 10 W-150 W, with burst energy of 40-750 μJ/burst, 2-25 bursts per pulse (depending on the material that is cut), and hole separation (or pitch) of 3 to 15 μm, or 3-10 μm. The use of picosecond pulse burst lasers would be preferable for these cutting speeds because they generate high power and the required number of pulses per burst. Thus, according to some exemplary embodiments, the pulsed laser produces 10-100 W of power, for example 25 W to 60 Watts, and produces pulse bursts at least 2-25 pulses per burst and the distance between the defect lines is 2-15 microns; and the laser beam and/or workpiece are translated relative to one another at a rate of at least 0.25 m/sec, in some embodiments at least 0.4 m/sec, for example 0.5 m/sec to 5 m/sec, or faster.

It should now be understood that embodiments described herein provide for systems and methods for separating substrates, such as glass substrates, by application of a laser beam focal line. The systems described herein allow for fast adjustment of a length and/or diameter of the laser beam focal line to account for different types of material as well as different thicknesses of material.

While exemplary embodiments have been described herein, it will be understood by those skilled in the art that various changes in form and details may be made therein without departing from the scope encompassed by the appended claims.

The invention claimed is:

1. A system for processing a transparent material, the system comprising:
   a laser source operable to emit a pulsed laser beam; and
   an optical assembly comprising an axicon disposed within an optical path of the pulsed laser beam and configured to transform the pulsed laser beam into a non-diffracting laser beam having a non-diffracting laser beam focal line having an adjustable length and an adjustable diameter, wherein the axicon is a reflective axicon positioned within the optical path of the pulsed laser beam;
   a ring-shaped reflection assembly axially separated from the reflective axicon by an adjustable distance D, the ring-shaped reflection assembly comprising an angled reflective surface, wherein the pulsed laser beam is reflected by the reflective axicon toward the angled reflective surface, and the pulsed laser beam is then reflected by the angled reflective surface; and a lens element positioned within the optical path of the pulsed laser beam following the ring-shaped reflection assembly, wherein the lens element focuses the pulsed laser beam to form the non-diffracting laser beam focal line;

wherein the pulsed laser beam is converging or diverging prior to the reflective axicon, wherein at least a portion of the non-diffracting laser beam focal line is operable to be positioned within a bulk of the transparent material, such that the non-diffracting laser beam focal line generates an induced multi-photon absorption within the transparent material, the multi-photo induced absorption producing a material modification within the transparent material along the non-diffracting laser beam focal line.

2. The system of claim 1, wherein the axicon is transmissive, and the optical assembly further comprises a variable zoom assembly positioned in the optical path of the pulsed laser beam between the axicon and the transparent material.

3. The system of claim 1, wherein:
the axicon comprises an entrance surface and an emergence surface;
the emergence surface has an angle with respect to the entrance surface; and
the adjustable length and the adjustable diameter of the non-diffracting laser beam focal line is adjusted by varying the angle of the emergence surface of the axicon.

4. The system of claim 3, wherein:
the optical assembly further comprises an axicon assembly comprising a plurality of axicons, each individual axicon comprising a different angle on the emergence surface; and
the angle of the emergence surface of the axicon is varied by selectively positioning a desired individual axicon of the plurality of axicons within the optical path of the pulsed laser beam.

5. The system of claim 4, wherein:
the optical assembly further comprises a first lens element having a first focal length, and a second lens element having a second focal length;
the first lens element and the second lens element are disposed within the optical path of pulsed laser beam after the axicon such that the first lens element is positioned between the axicon and the second lens element; and
the adjustable length and the adjustable diameter of the non-diffracting laser beam focal line is further adjusted by varying the first focal length and/or the second focal length.

6. The system of claim 1, wherein:
the optical assembly further comprises a third lens having a third focal length, and a fourth lens having a fourth focal length; and
at least one of the third focal length and the fourth focal length are adjustable to adjust the diameter of the pulsed laser beam at the entrance surface of the axicon.

7. The system of claim 1, wherein the optical assembly further comprises a variable zoom assembly operable to adjust the diameter of the pulsed laser beam at the entrance surface of the axicon.

8. The system of claim 1, wherein the adjustable diameter of the non-diffracting laser beam focal line or the adjustable length of the non-diffracting laser beam focal line is adjusted by varying the adjustable distance D.

9. The system of claim 1, wherein:
the optical assembly further comprises a second lens element positioned in the optical path of the pulsed laser beam prior to the reflective axicon;
the second lens element causes the pulsed laser beam to converge or diverge prior to the reflective axicon; and
adjusting a focal length of the second lens element adjusts the adjustable length and the adjustable diameter of the non-diffracting laser beam focal line.

* * * * *